United States Patent
Nakajima et al.

(10) Patent No.: US 6,198,626 B1
(45) Date of Patent: *Mar. 6, 2001

(54) PORTABLE APPARATUS REMOVABLE TOP COVER COVERING FUNCTIONAL COMPONENT

(75) Inventors: Yuji Nakajima; Kohei Wada; Kenji Hisano, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/105,177

(22) Filed: Jun. 26, 1998

Related U.S. Application Data

(63) Continuation of application No. 08/688,846, filed on Jul. 31, 1996, now Pat. No. 5,808,861.

(30) Foreign Application Priority Data

Sep. 19, 1995 (JP) .................................... 7-263637

(51) Int. Cl.⁷ ................................. G06F 1/16; H05K 7/00
(52) U.S. Cl. ............................................. 361/686; 361/680
(58) Field of Search ................................. 361/680–683, 361/686

(56) References Cited

U.S. PATENT DOCUMENTS

| | | | |
|---|---|---|---|
| 4,084,213 | 4/1978 | Kirchner et al. | 361/680 |
| 4,497,036 | 1/1985 | Dunn | 361/680 |
| 4,870,604 | * 9/1989 | Tatsuno | 364/708.1 |
| 4,941,841 | 7/1990 | Darden et al. . | |
| 5,091,873 | 2/1992 | Araki | 361/680 |
| 5,132,876 | 7/1992 | Ma | 361/680 |
| 5,144,302 | 9/1992 | Carter et al. | 361/680 |
| 5,195,022 | 3/1993 | Hoppal et al. . | |
| 5,237,486 | 8/1993 | LaPointe et al. . | |
| 5,251,105 | 10/1993 | Kobayashi et al. . | |
| 5,295,089 | * 3/1994 | Ambasz | 364/708.1 |
| 5,305,180 | 4/1994 | Mitchell et al. . | |
| 5,325,262 | 6/1994 | Ma . | |
| 5,331,506 | 7/1994 | Nakajima . | |
| 5,331,509 | 7/1994 | Kikinis . | |
| 5,332,306 | 7/1994 | Babb et al. . | |
| 5,337,998 | 8/1994 | Nemoto . | |
| 5,426,564 | 6/1995 | Hsu | 361/707 |
| 5,448,446 | 9/1995 | Honda et al. | 361/680 |
| 5,453,013 | * 9/1995 | Billings et al. | 434/169 |
| 5,455,737 | 10/1995 | Ogami et al. | 361/680 |
| 5,483,253 | 1/1996 | Suganuma et al. | 361/680 |
| 5,510,806 | * 4/1996 | Busch | 345/87 |
| 5,510,953 | 4/1996 | Merkel | 361/680 |
| 5,537,343 | 7/1996 | Kikinis et al. | 364/708.1 |
| 5,546,334 | 8/1996 | Hsieh et al. | 364/709.1 |
| 5,572,399 | * 11/1996 | Shirato et al. | 361/680 |
| 5,576,929 | * 11/1996 | Uchiyama et al. | 361/680 |
| 5,604,663 | 2/1997 | Shin et al. | 361/686 |
| 5,764,131 | * 6/1998 | Twining et al. | 340/311.1 |

* cited by examiner

Primary Examiner—Lynn D. Feild
(74) Attorney, Agent, or Firm—Pillsbury Madison & Sutro LLP

(57) ABSTRACT

A portable apparatus comprises a box-shaped housing body. The housing body includes a lower housing and an upper housing coupled to the lower housing. The upper housing includes a component attachment portion opened upward. A functional component such as a speaker is removably supported on the component attachment portion of the upper housing. A top cover is removably supported on the housing body. The top cover covers the component attachment portion and the functional component supported on the component attachment portion.

1 Claim, 35 Drawing Sheets

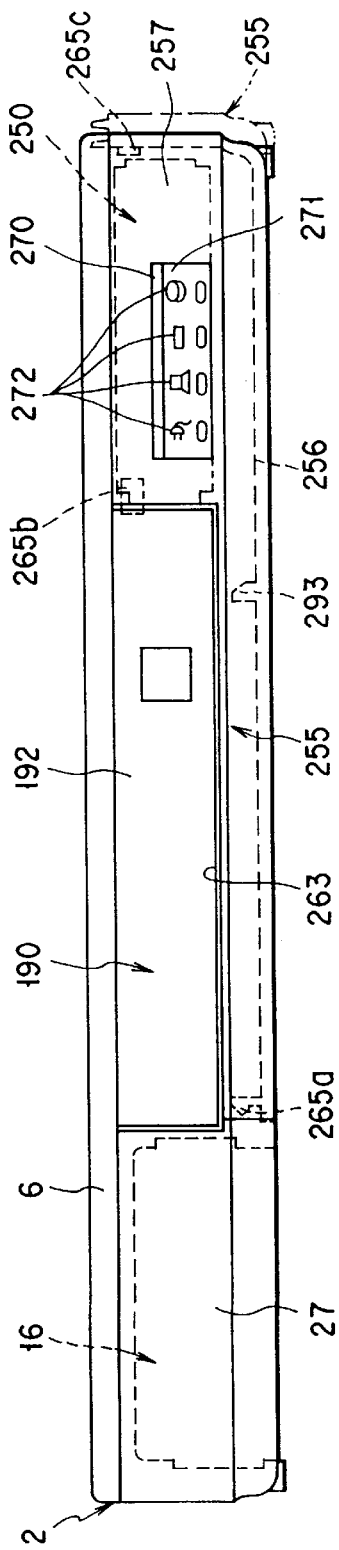
FIG. 4
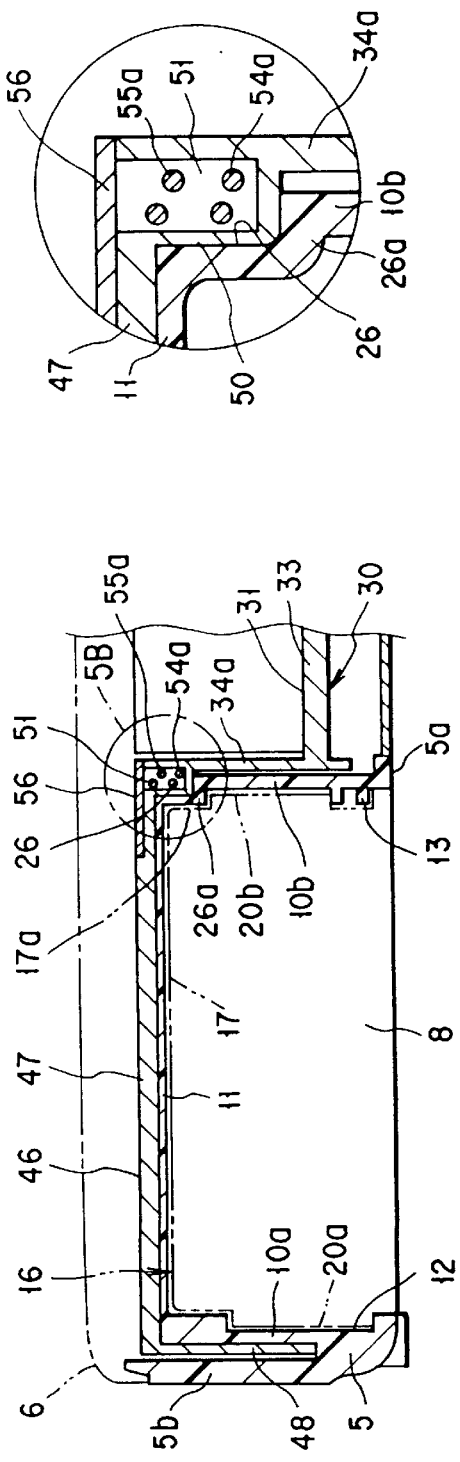
FIG. 5B
FIG. 5A

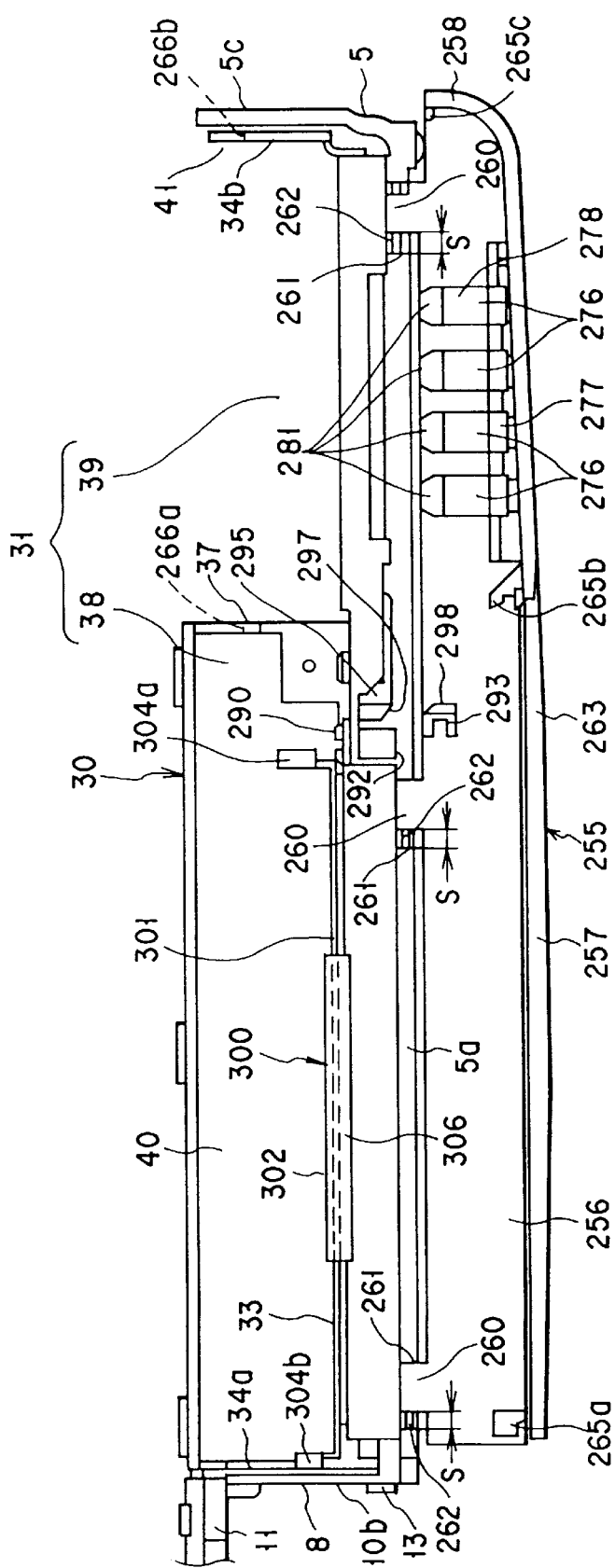
F I G. 10

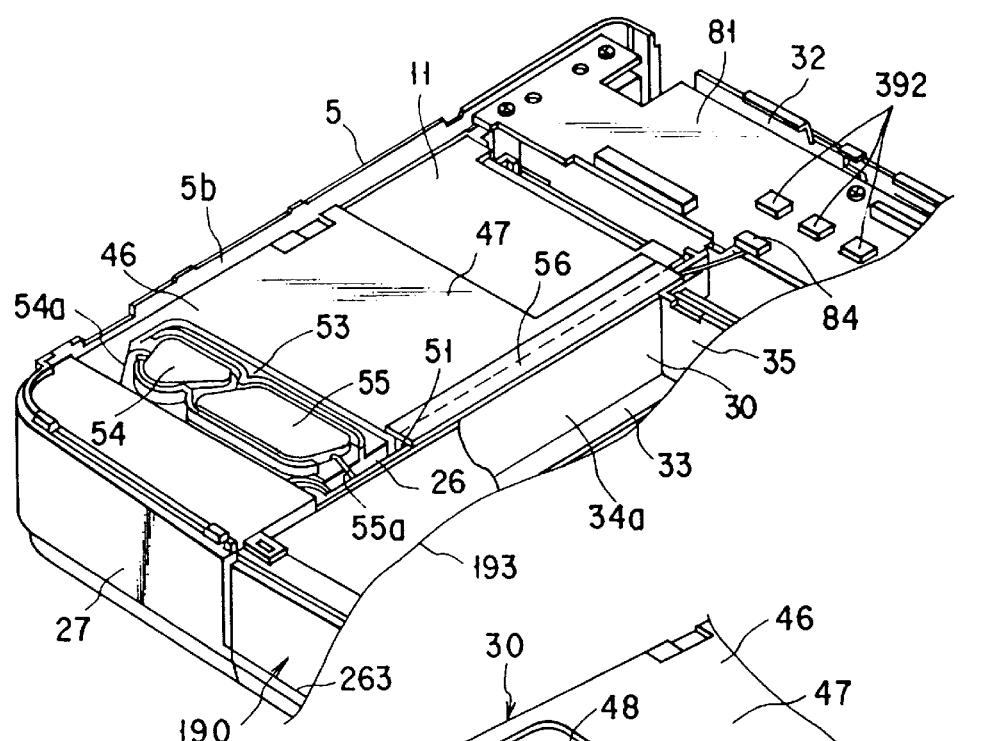
FIG. 11
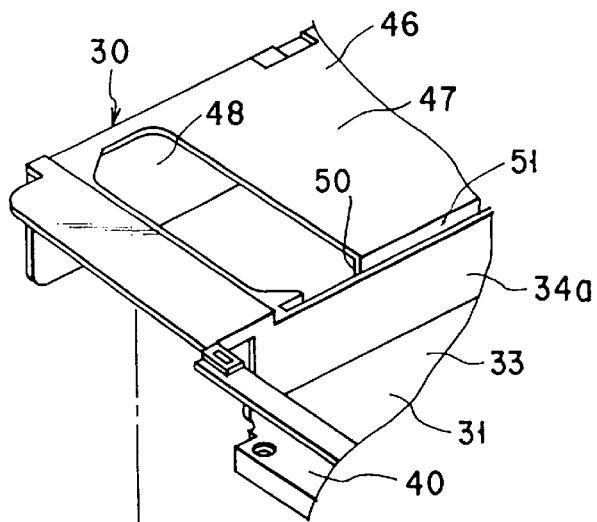
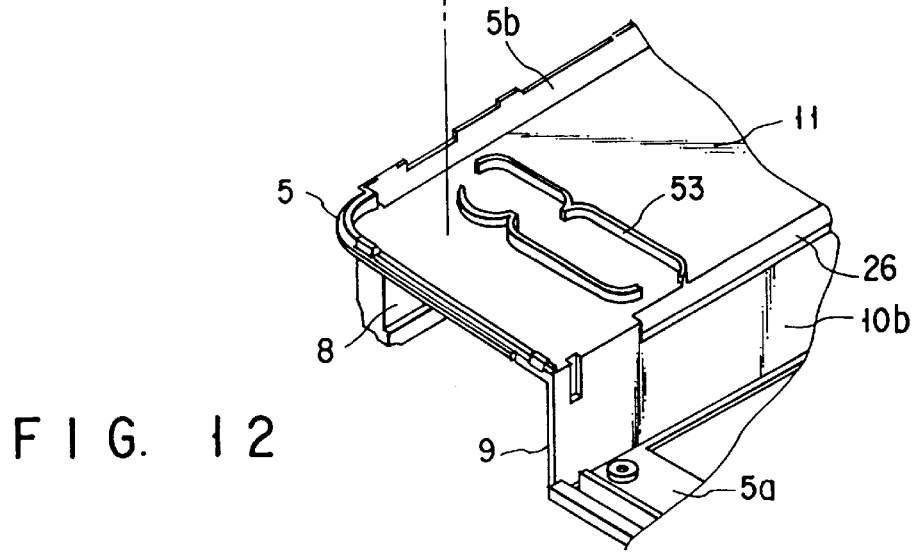
FIG. 12

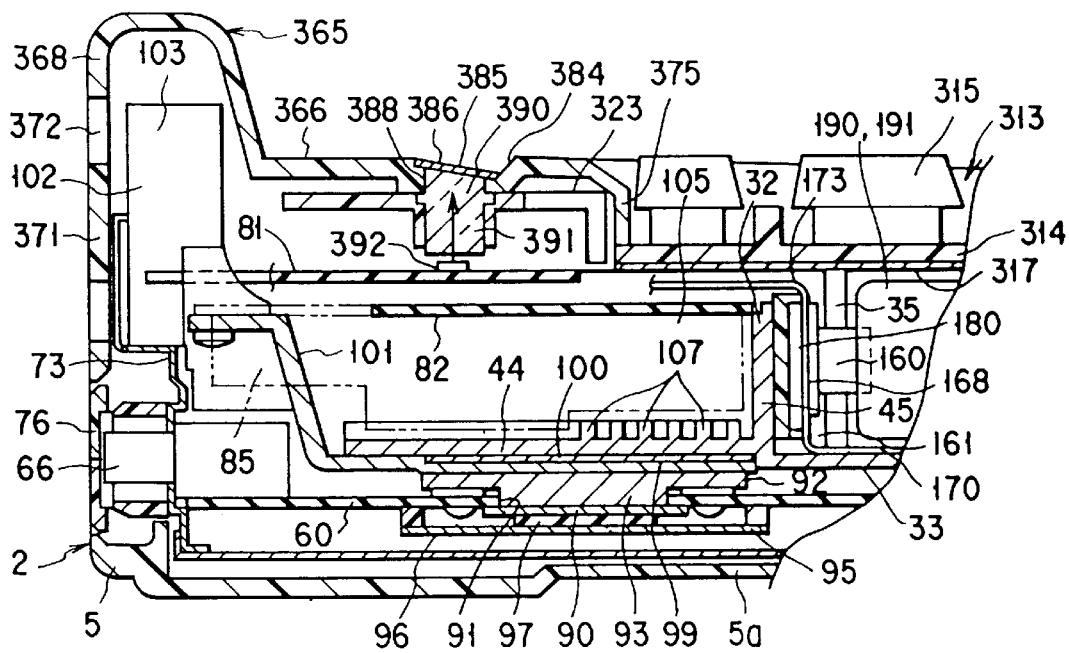
F I G. 17
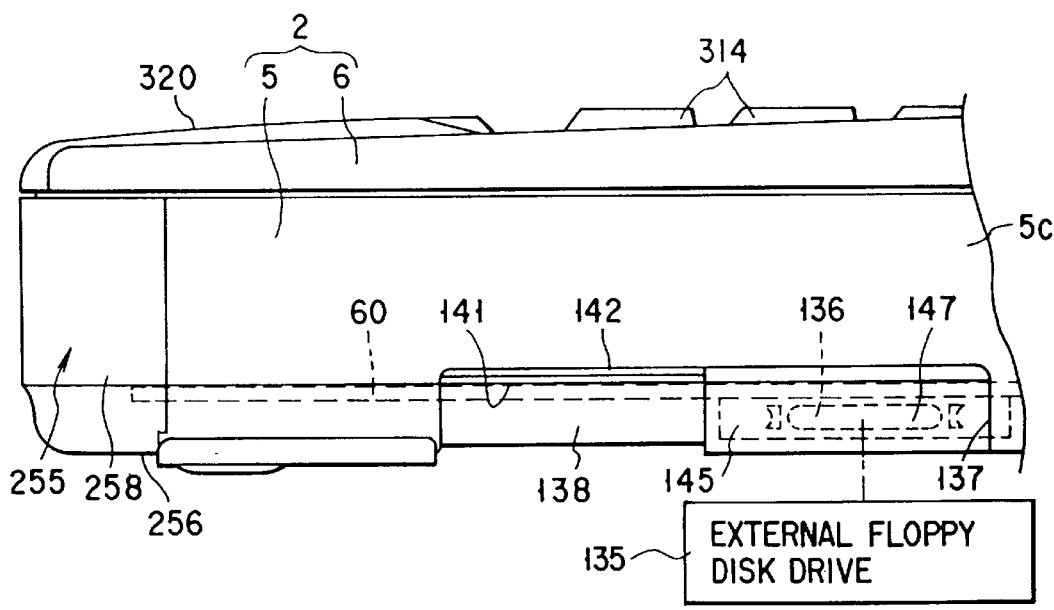
F I G. 20

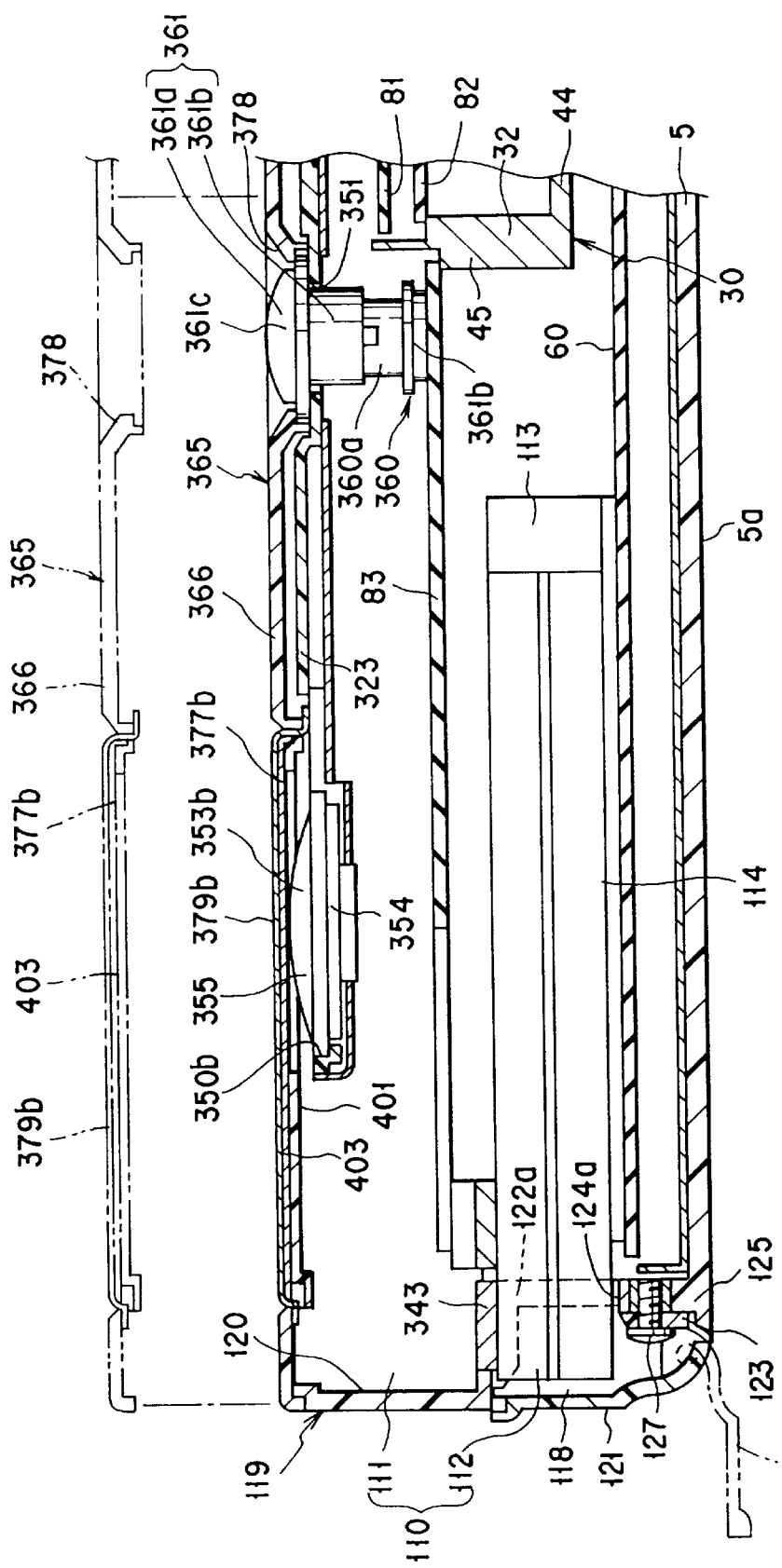
F I G. 18

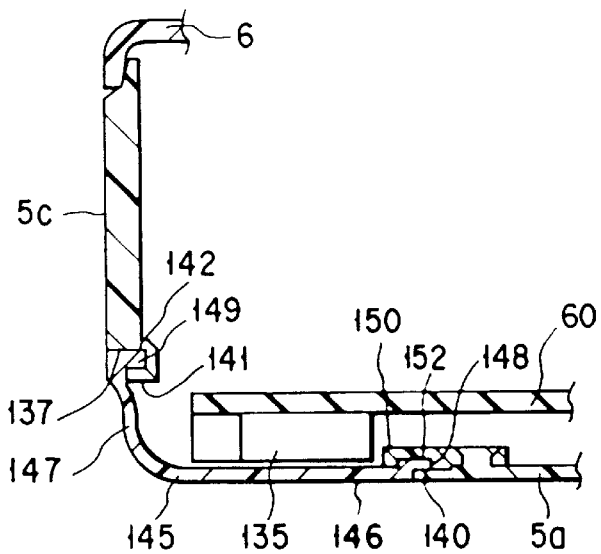
F I G. 21 A
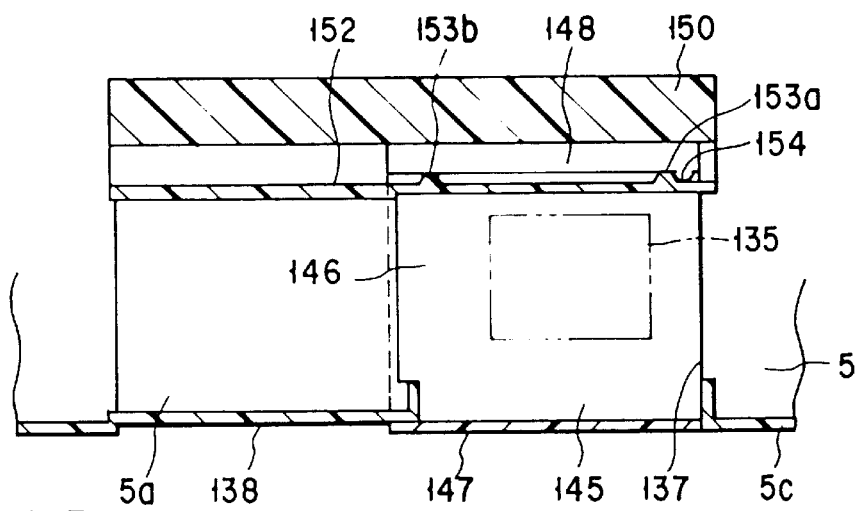
F I G. 21 B
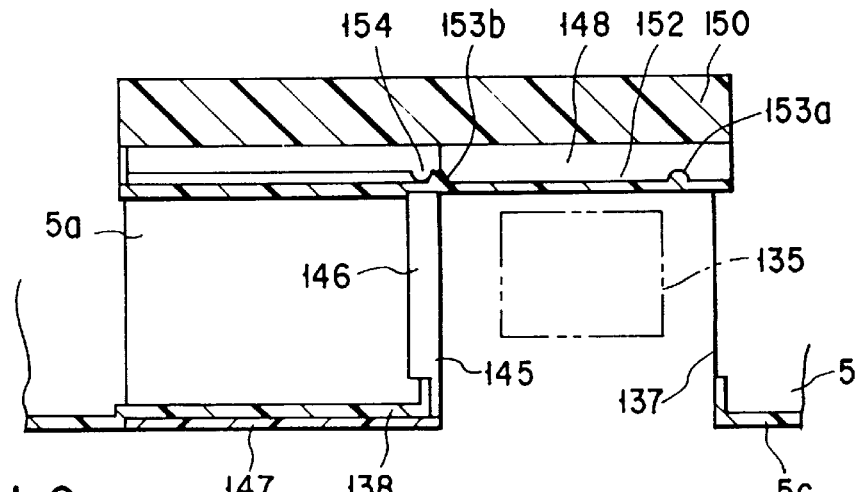
F I G. 21 C

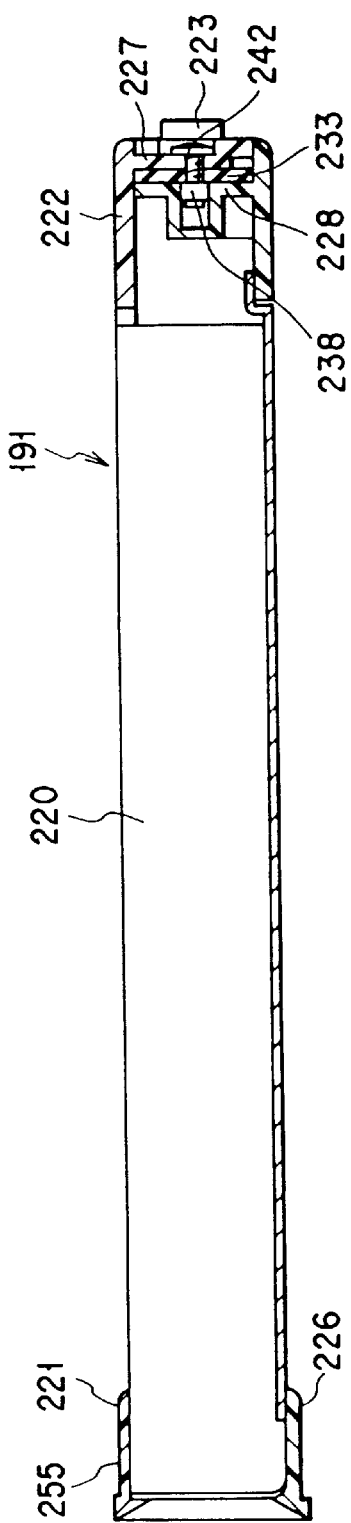
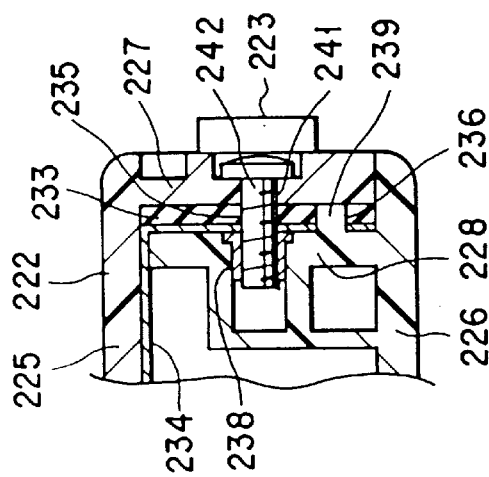
FIG. 29A
FIG. 29B

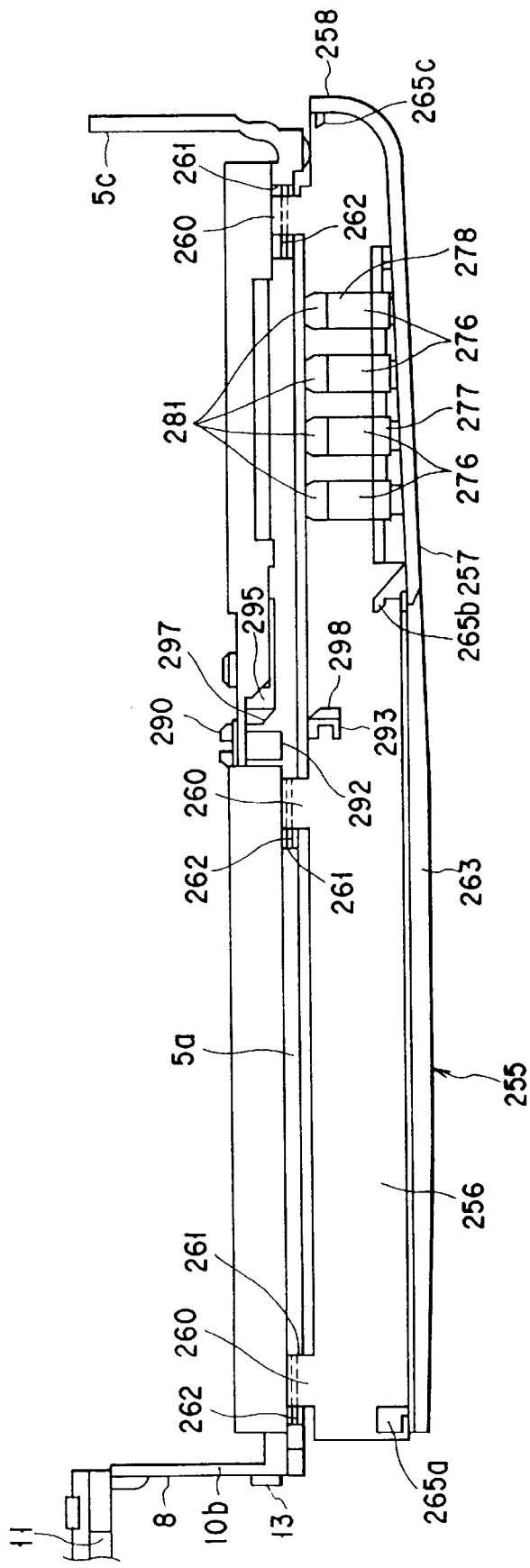
F I G. 32

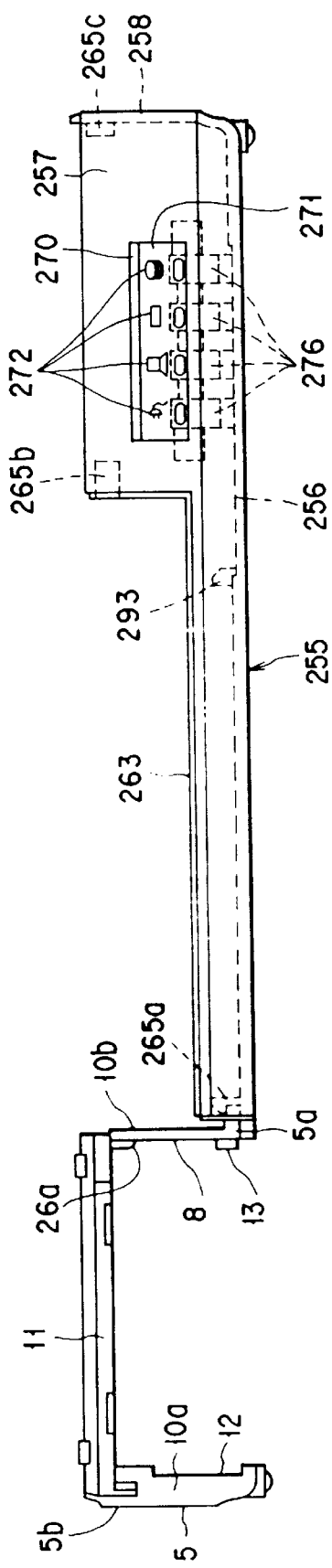
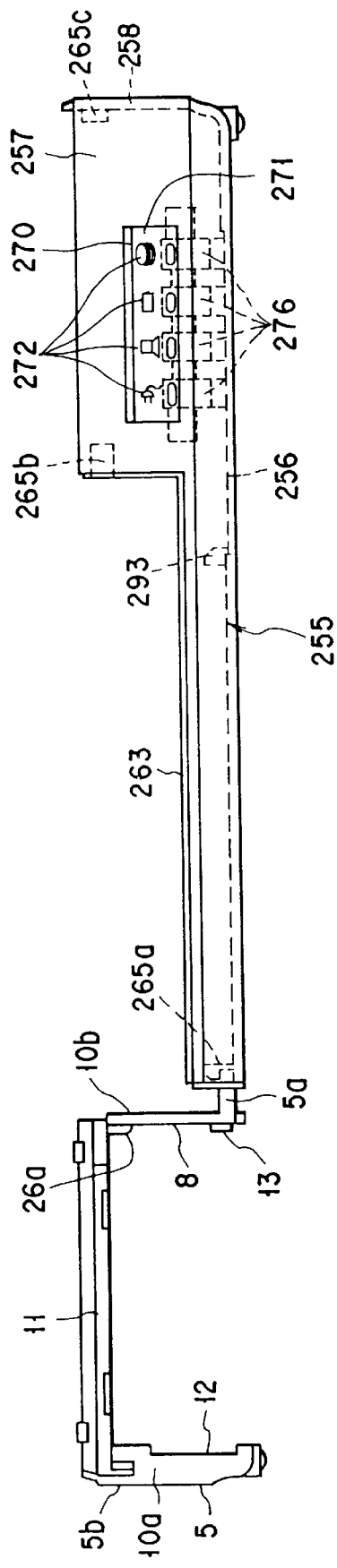
FIG. 33A
FIG. 33B

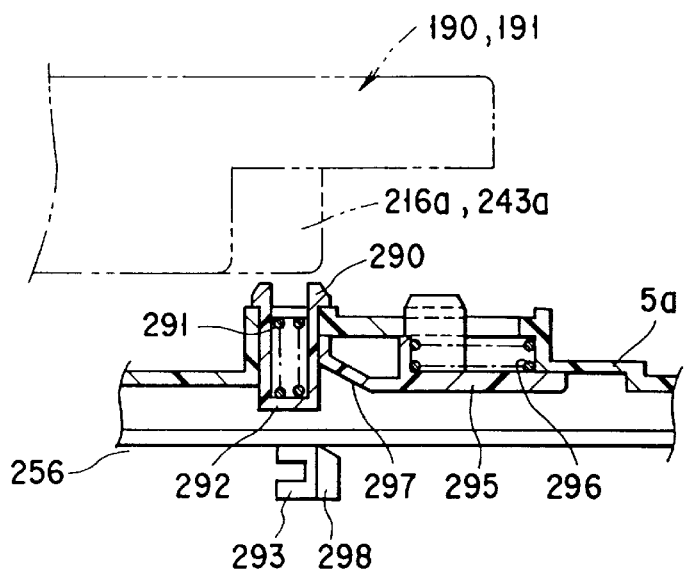
F I G. 38A
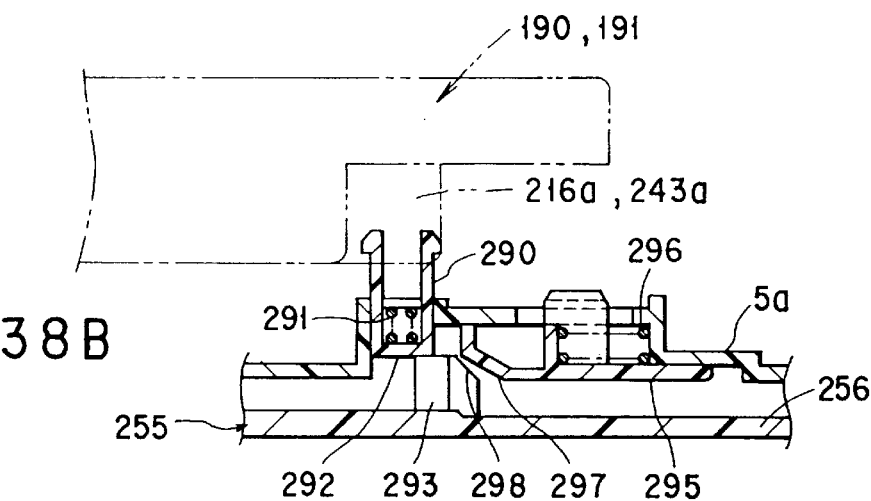
F I G. 38B
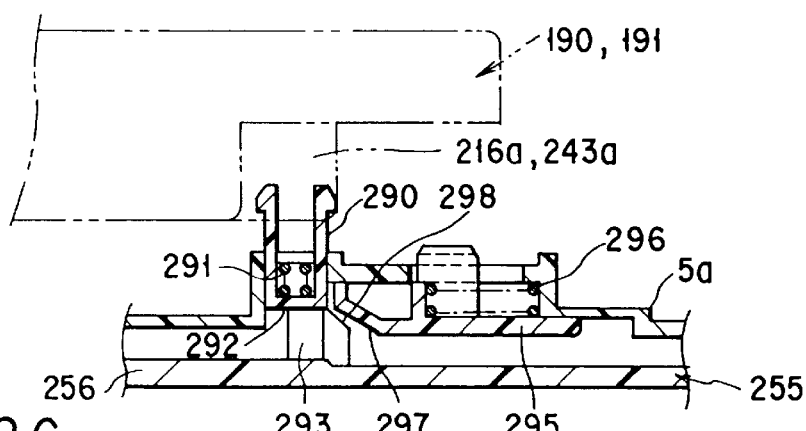
F I G. 38C
LOCKED POSITION ⟵ ⟶ UNLOCKED POSITION

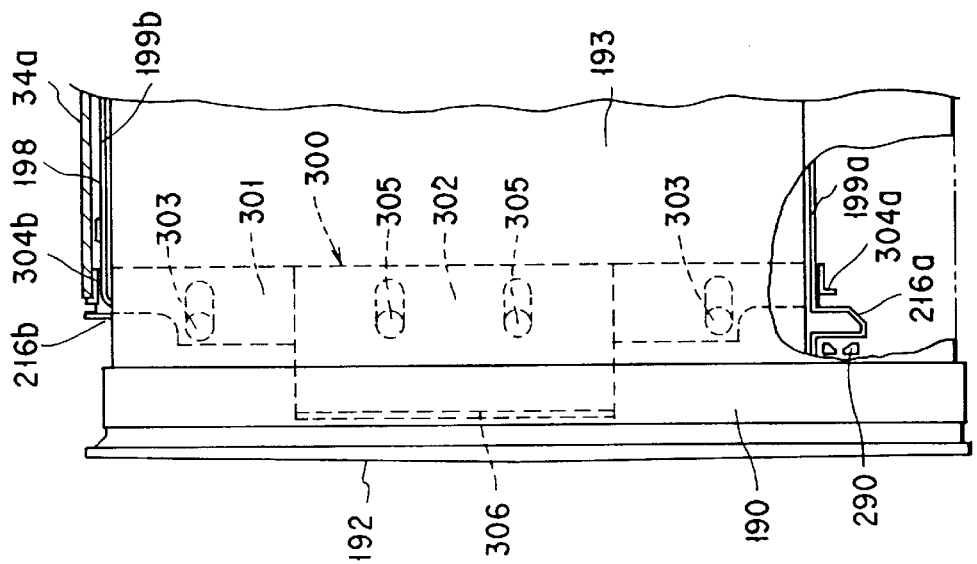
FIG. 41
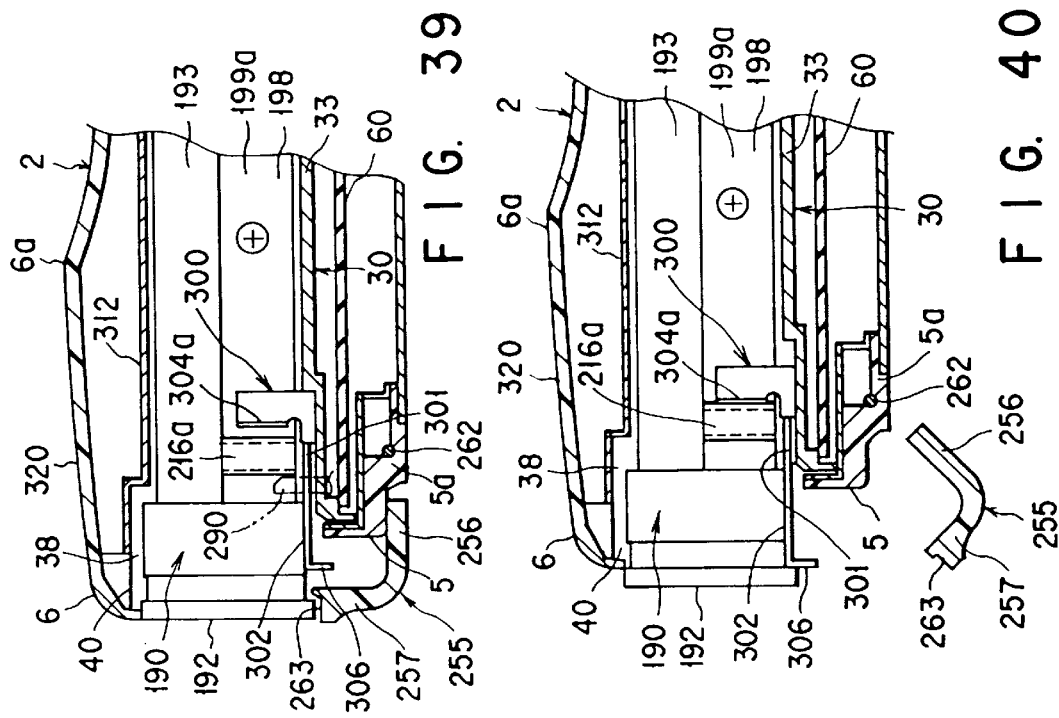
FIG. 39
FIG. 40

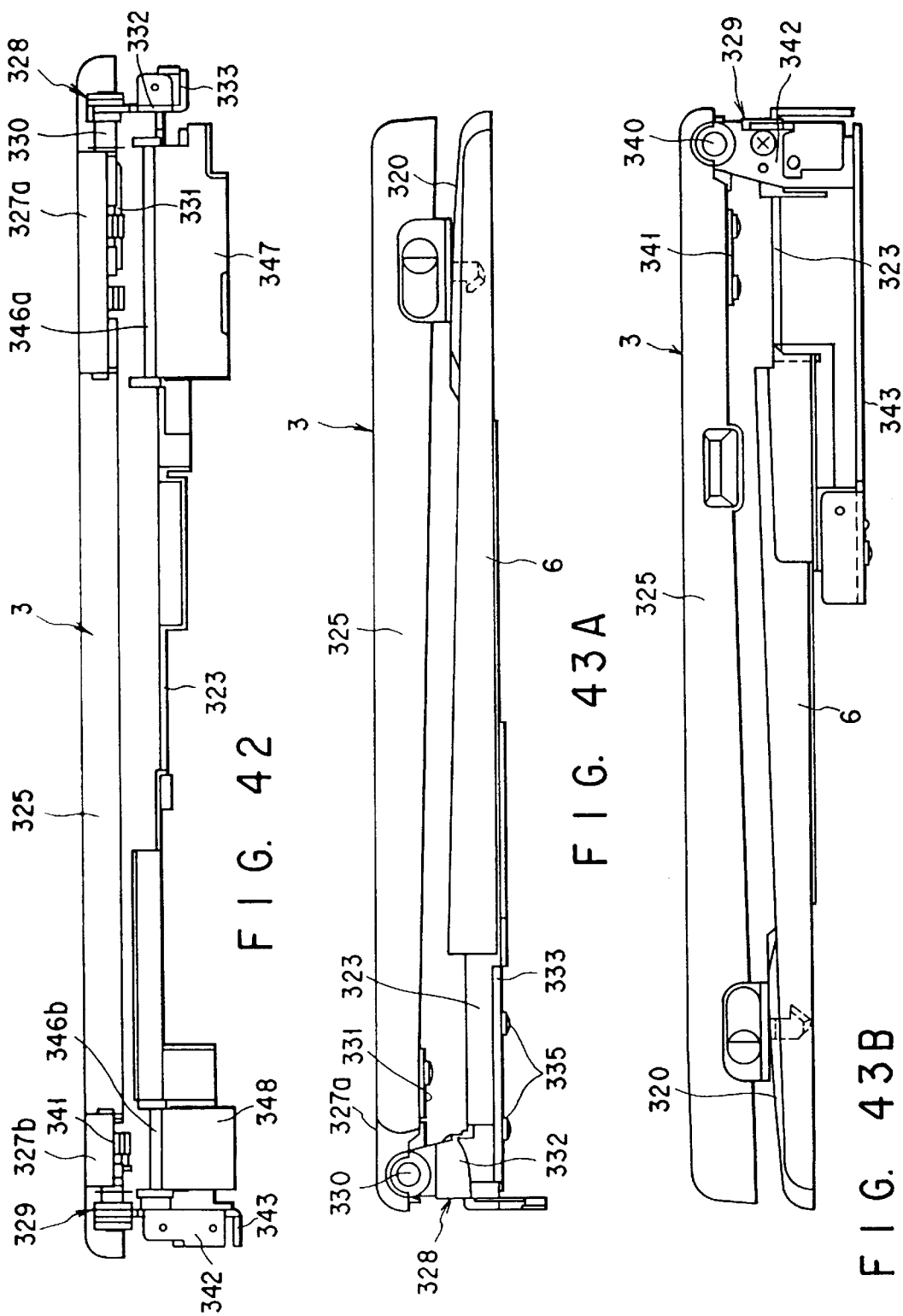

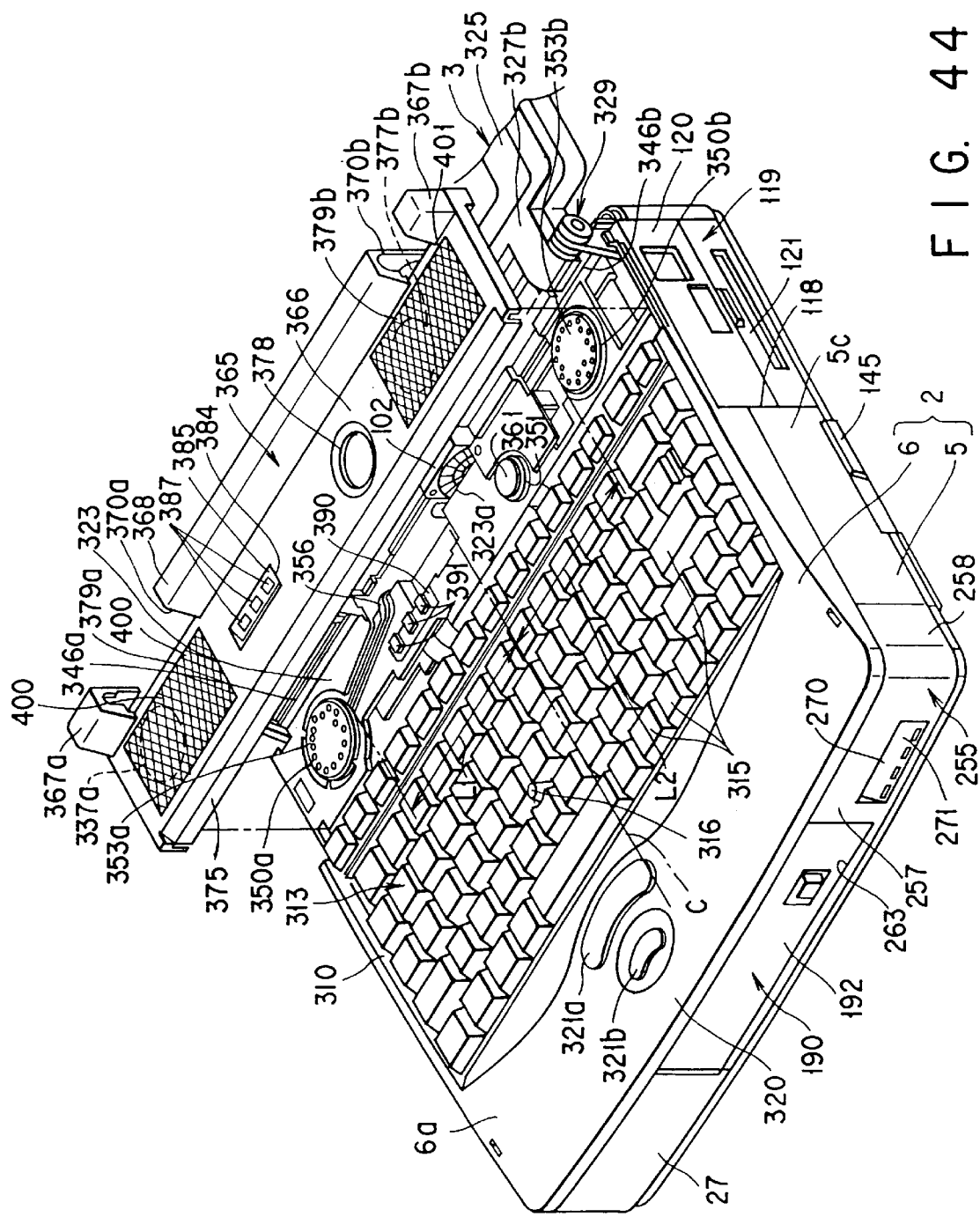

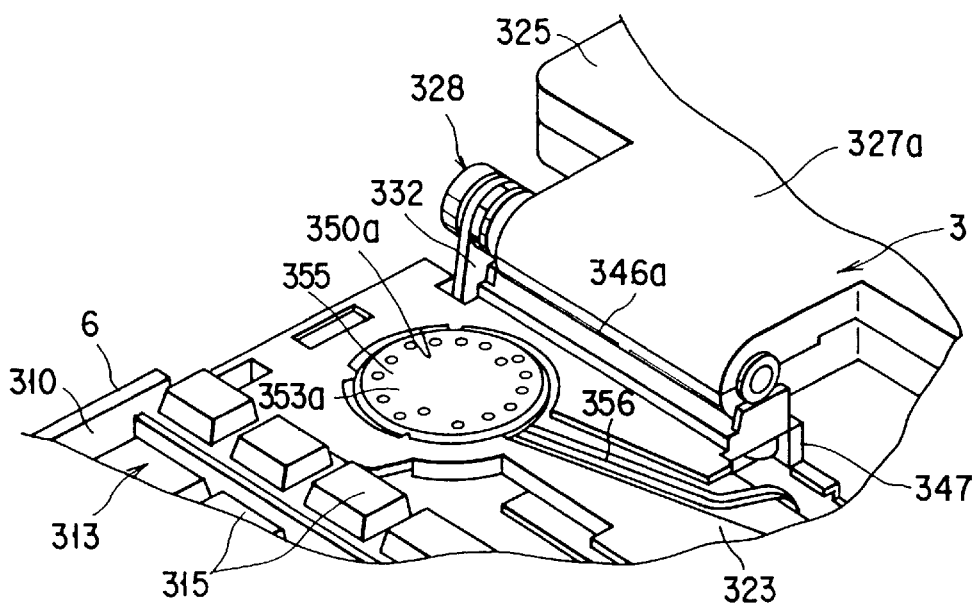
F I G. 45
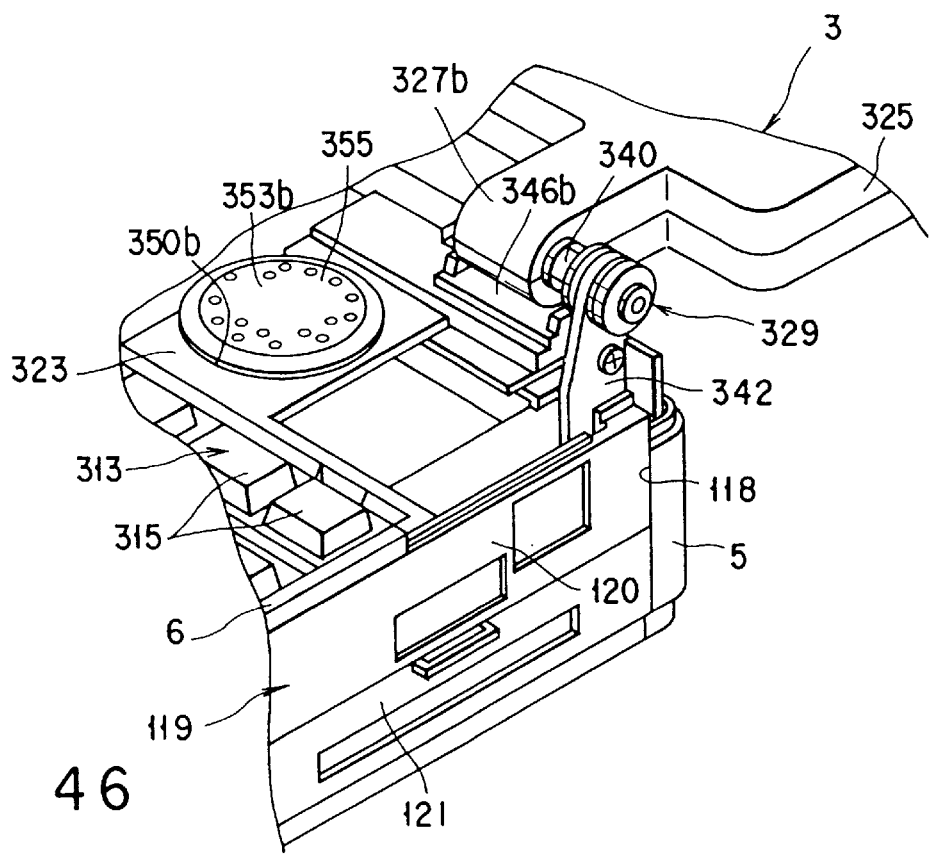
F I G. 46

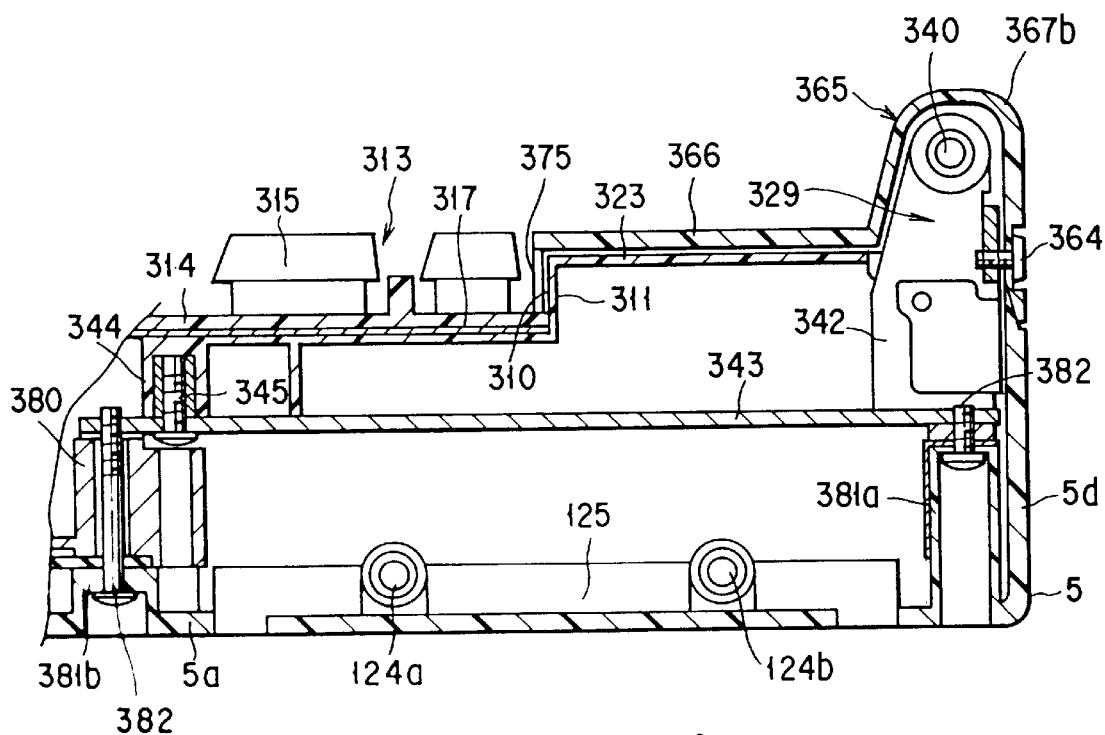
F I G. 49
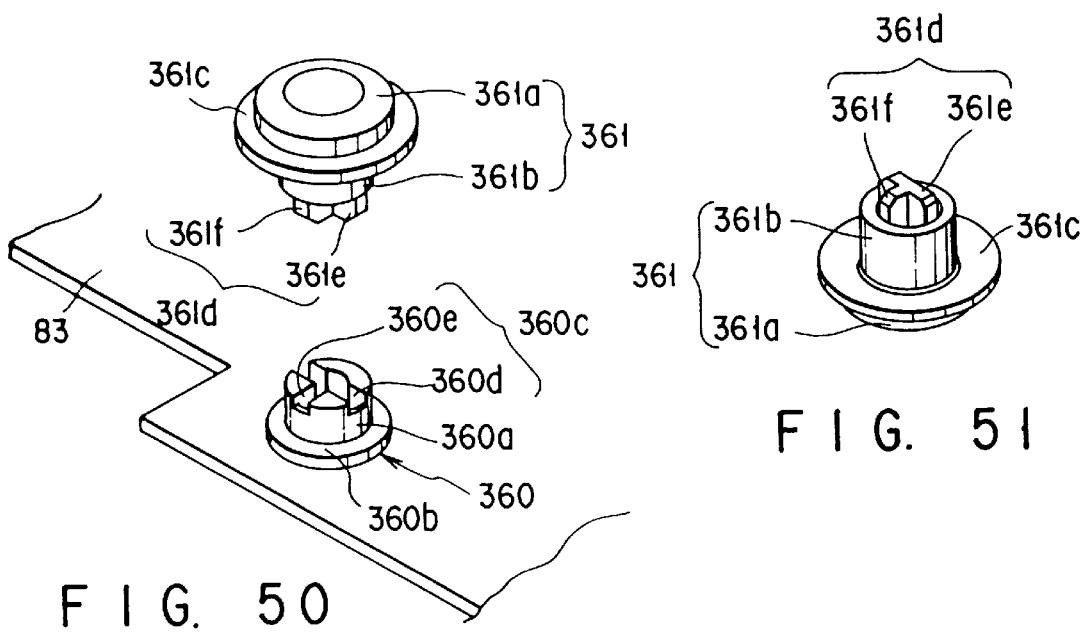
F I G. 50
F I G. 51

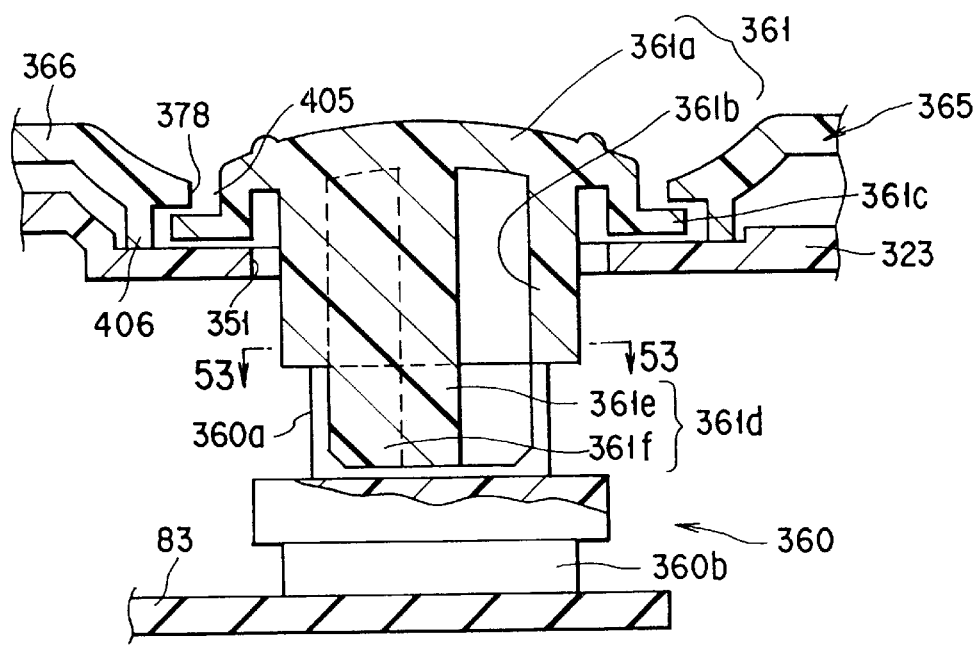
F I G. 52
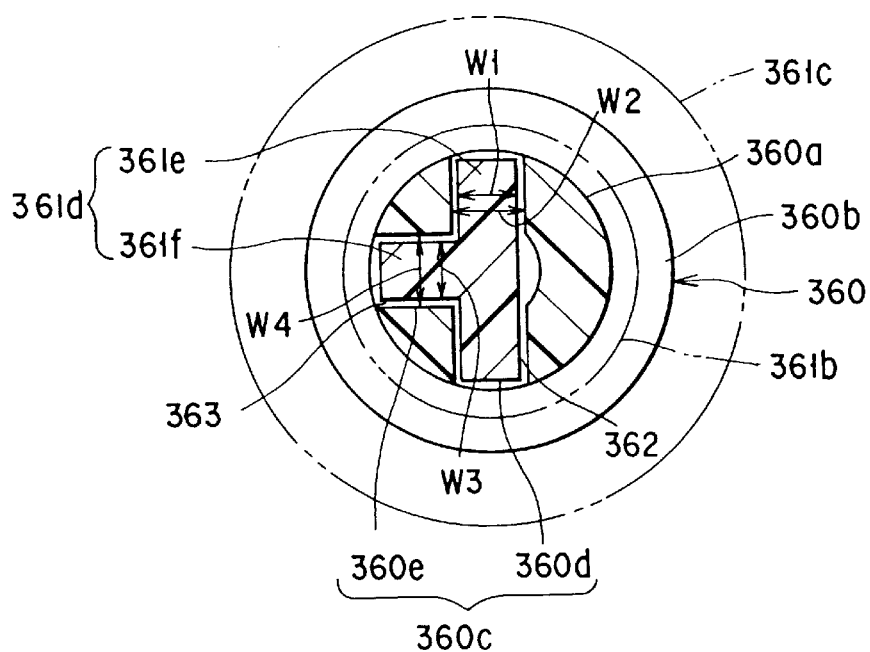
F I G. 53

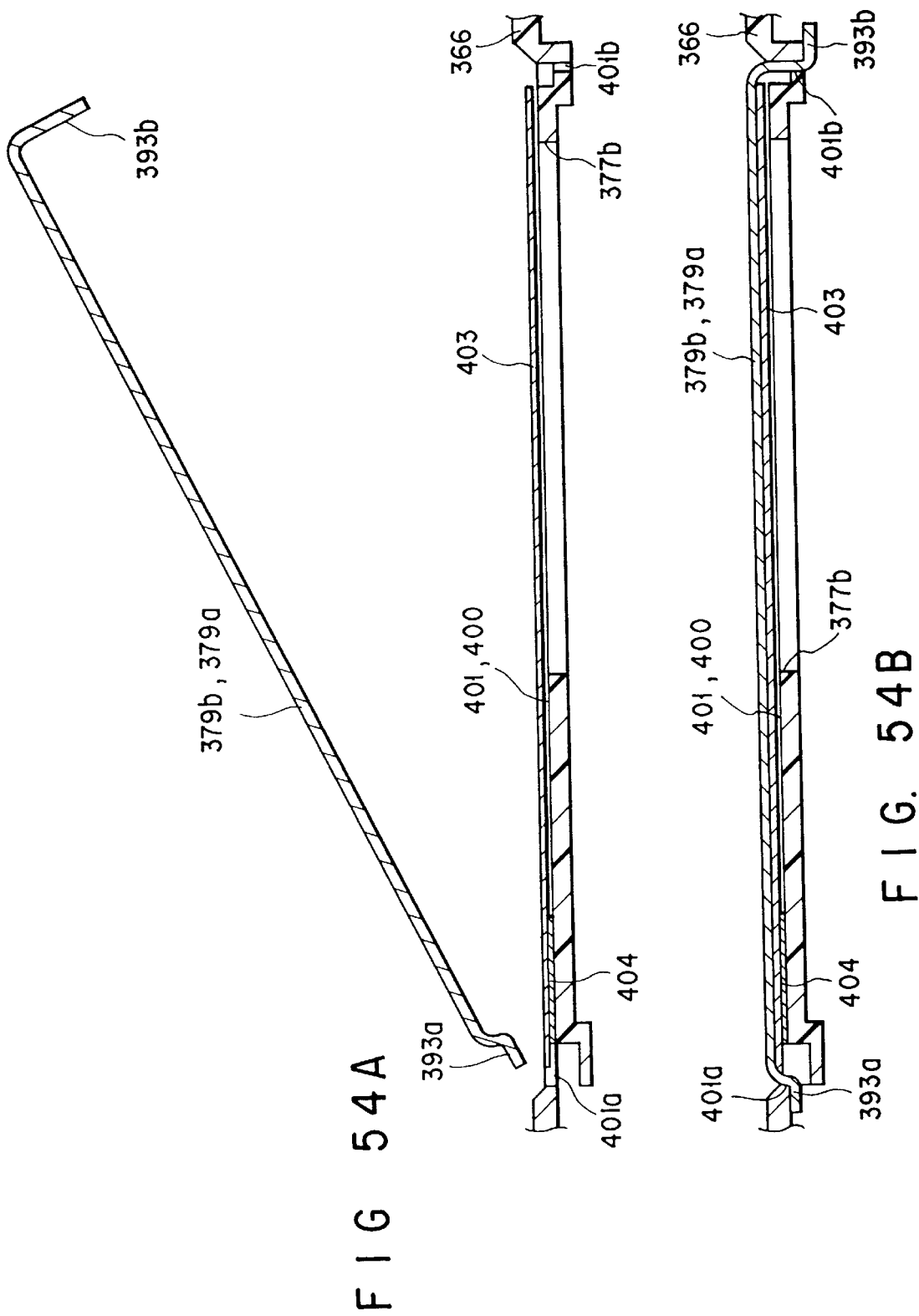

PORTABLE APPARATUS REMOVABLE TOP COVER COVERING FUNCTIONAL COMPONENT

This is a continuation of application Ser. No. 08/688,846, filed Jul. 31, 1996 is now U.S. Pat. No. 5,808,861.

BACKGROUND OF THE INVENTION

1. Field of the Invention

The present invention relates to a portable apparatus such as a book-type portable computer, and more particularly to a structure having a housing containing a functional component such as a speaker.

2. Description of the Related Art

In the field of conventional portable computers dealing mainly with character information and graphic information, there is a tendency that such portable computers should be applied to multimedia wherein moving pictures, sounds, etc. are integrated. The amount of data processed in multimedia is much greater than that of data processed when character information alone is used. It is thus necessary to record data by using a large-capacity optical disk. To meet the demand, portable computers have been marketed, which comprise CD-ROM drives for reading out data from optical disks.

This type of portable computer includes a box-shaped housing body and a display unit supported by the housing body. The CD-ROM driver is contained within the housing body. The portable computer including the CD-ROM drive is provided with various functional parts, e.g. a loudspeaker outputting a sound and a volume switch for controlling the volume of sound. These functional parts are contained within the housing body.

In the conventional portable computer, the housing body comprises a lower housing and an upper housing coupled to the lower housing. The lower housing supports the CD-ROM drive and functional parts. Thus, after the CD-ROM drive and functional parts are built in the lower housing, the upper housing is removably coupled to the lower housing. The CD-ROM drive and functional parts are covered by the upper housing.

In the field of computers having CD-ROM drives, there is a demand that the built-in loudspeaker be replaced with one having higher quality. Besides, the contact of the volume switch for controlling the sound volume may be deteriorated with the passing of use time of the computer. Thus, the frequency of replacement of functional parts such as the loudspeaker and volume switch is relatively higher than that of the CD-ROM drive or other circuit elements contained within the housing body.

In the conventional computer, however, the functional parts such as a loudspeaker and a volume switch are contained within the housing body along with the CD-ROM drive and other circuit elements. When such functional parts need to be replaced or maintained, it is necessary to disassembling the entire housing body by removing the upper housing from the lower housing. Consequently, a great deal of time and labor is needed for replacement and maintenance of the functional parts.

SUMMARY OF THE INVENTION

An object of the present invention is to provide a portable apparatus with high workability capable of easily replacing or maintaining a functional component, without disassembling a housing body.

Another object of the invention is to provide a portable apparatus capable of having such an external appearance that first and second speakers are arranged symmetrically with respect to a center line of a housing body.

In order to achieve the above objects, there is provided a portable apparatus comprising:

a box-shaped housing body including a lower housing and an upper housing coupled to said lower housing, said upper housing including a component attachment portion opened upward;

a functional component removably supported on said component attachment portion of said upper housing; and a top cover removably supported on said housing body, said top cover covering the component attachment portion and the functional component supported on said component attachment portion.

According to this structure, the functional component is supported on the component attachment portion of the upper housing. The functional component is situated on an upper part of the housing body and not in a deep region of the housing body. Since the functional component supported on the component attachment portion is covered by the removable top cover, after the top cover is removed from the housing body and the functional component is exposed to the upper part of the housing body it can be replaced or maintained. Thereby, there is no need to perform time-consuming works such as disassembling the housing body at each time of replacing or maintaining the functional component.

According to this invention, there is also provided a portable apparatus comprising:

a box-shaped housing body including a lower housing having a bottom wall and a rear wall continuous with the bottom wall, and an upper housing coupled to the lower housing, said upper housing including a component attachment portion opened upward;

a functional component removably supported on said component attachment portion of said housing body;

a display unit having a support portion extending toward the component attachment portion of said housing body;

hinge means for rotatably supporting the display unit on said housing body, said hinge means being situated adjacent to said component attachment portion; and a top cover removably attached to said housing body, said top cover covering the component attachment portion and the functional component supported on said component attachment portion, wherein said component attachment portion of the housing body includes a cover portion covering the support portion of the display unit from below, and being continuous with the rear wall of the lower housing, and said top cover includes a hinge cover portion covering the hinge means, said hinge cover portion being continuous with said cover portion when said top cover is attached to said housing body.

According to this structure, the functional component is supported on the component attachment portion of the upper housing. The functional component is situated on an upper part of the housing body and not in a deep region of the housing body. Since the functional component supported on the component attachment portion is covered by the removable top cover, after the top cover is removed from the housing body and the functional component is exposed to the upper part of the housing body it can be replaced or maintained. Thereby, there is no need to perform time-consuming works such as disassembling the housing body at each time of replacing or maintaining the functional component.

In addition, the cover portion of the component attachment portion extends below the leg portion of the display unit and is continuous with the rear wall of the lower housing. In the state in which the component attachment portion is covered by the top cover, the hinge means can be covered by the hinge cover portion of the top cover and the cover portion. Thus, there is no need to provide an exclusive-use cover for covering the hinge means, and the number of structural parts can be reduced. In addition, since the cover portion is integrated with the component attachment portion, the cover portion can be exactly positioned in relation to the support portion and top cover.

According to this invention, there is also provided a portable apparatus comprising:
- a box-shaped housing body having an upper wall, said upper wall of the housing body having a component attachment portion opened upward;
- first and second speakers removably supported on said component attachment portion of the housing body, said speakers being arranged on both sides of a center line extending in the depth direction of the housing body through the center of the housing body in the width direction, and a distance between said first speaker and said center line being different from a distance between said second speaker and said center line; and
- a top cover removably supported on said housing body, said top cover covering the component attachment portion and the first and second speakers;
- wherein said top cover includes a panel having a pair of holes facing said first and second speakers, and first and second speaker covers attached to the panel and covering said holes, each of said first and second speaker covers having a shape greater than an opening shape of each of said holes and extending in the width direction of said housing body, and a distance between said first speaker cover and said center line being equal to a distance between said second speaker cover and said center line.

According to this structure, if the top cover is removed from the housing body, the first and second speakers are exposed to the upper side of the housing body. Thus, there is no need to disassemble the entire housing at each time of replacing or maintaining the speakers, and the workability is enhanced.

In addition, since the speaker covers covering the first and second speakers are arranged symmetrical with respect to the center line of the housing body, the speakers may be apparently viewed to be arranged symmetrical with respect to the center line although the speakers are actually arranged asymmetrical.

According to this invention, there is also provided a portable apparatus comprising:
- a box-shaped housing body including a lower housing and an upper housing coupled to said lower housing, said upper housing including a component attachment portion opened upward and a keyboard attachment portion;
- a keyboard mounted on said keyboard attachment portion;
- a functional component removably supported on said component attachment portion; and
- a top cover removably supported on said housing body, said top cover covering the component attachment portion and the functional component supported on said component attachment portion.

According to this structure, the functional component is situated on the upper part of the housing body, and not in a deep region of the housing body. After the top cover is removed, the functional component is exposed to the upper side of the housing body and the functional component can be replaced or maintained. Thereby, there is no need to disassemble the housing body at each time of replacing or maintaining the functional component, and the workability is enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4 is a front view of the housing body, showing the state in which the front cover is rotated to a first position;

FIG. 5A is a cross-sectional view of the battery storage section of the housing body;

FIG. 5B is a cross-sectional view of a region A in FIG. 5A;

FIG. 10 is a front view of the lower housing, showing the state in which the front cover is rotated to the second position;

FIG. 11 is a perspective view of the battery storage section in which an auxiliary battery and a clock battery are mounted;

FIG. 12 is a perspective view showing the relationship between the battery storage section and a reinforcement portion of the frame in an exploded manner;

FIG. 17 is a cross-sectional view of the portable computer, showing a TCP mounting portion and a second icon attachment portion;

FIG. 18 is a cross-sectional view of the portable computer, showing an extension area of the housing body and the loudspeaker attachment portion;

FIG. 20 is a side view of the portable computer, showing an attachment portion for a connector cover;

FIG. 21A is a cross-sectional view of the housing body, showing the attachment portion for the connector cover;

FIG. 21B is a cross-sectional view of the housing body, showing the state in which the connector cover is slid to a closed position;

FIG. 21C is a cross-sectional view of the housing body, showing the state in which the connector cover is slid to an open position;

FIG. 29A is a cross-sectional view of the floppy disk drive;

FIG. 29B is an enlarged cross-sectional view of the attachment portion of the interface connector;

FIG. 32 is a front view of the lower housing, showing the state in which the front cover is rotated to the second position;

FIG. 33A is a front view of the lower housing, showing the state in which the front cover is slid to a locked position;

FIG. 33B is a front view of the lower housing, showing the state in which the front cover is slid to an unlocked position;

FIG. 38A is a cross-sectional view showing the state in which the front cover is rotated to the second position and the pushing projection is disengaged from the stopper;

FIG. 38B is a cross-sectional view showing the state in which the front cover is rotated to the first position and the pushing projection pushes up the stopper;

FIG. 38C is a cross-sectional view showing the state in which the front cover is slid to the locked position;

FIG. 39 is a cross-sectional view showing the state in which an ejector is covered by the front cover rotated to the first position;

FIG. 40 is a cross-sectional view showing the state in which the front cover is rotated to the second position and the CD-ROM drive is pulled out by the ejector;

FIG. 41 is a plan view showing the positional relationship between the CD-ROM drive and the ejector;

FIG. 42 is a rear view showing the state in which a display unit is attached to a component attachment portion of the upper housing;

FIG. 43A is a left-hand side view showing the state in which the display unit is attached to the component attachment portion of the upper housing;

FIG. 43B is a right-hand side view showing the state in which the display unit is attached to the component attachment portion of the upper housing;

FIG. 44 is a perspective view of the portable computer, showing the state in which a top cover is removed from the component attachment portion of the upper housing;

FIG. 45 is a perspective view showing a coupling portion between a first leg portion of the display unit and the component attachment portion;

FIG. 46 is a perspective view showing a coupling portion between a second leg portion of the display unit and the component attachment portion;

FIG. 49 is a cross-sectional view of a region corresponding to the component attachment portion of the housing body;

FIG. 50 is a perspective view showing in an exploded manner the state in which a volume dial is removed from a volume switch;

FIG. 51 is a perspective view of the volume dial;

FIG. 52 is a cross-sectional view showing the relationship between the volume dial and a panel of the top cover;

FIG. 53 is a cross-sectional view taken along line 53—53 in FIG. 52;

FIG. 54A is a cross-sectional view showing the relationship between the panel of the top cover and a loudspeaker cover; and FIG. 54B is a cross-sectional view showing the state in which the loudspeaker cover is attached to the panel of the top cover.

DETAILED DESCRIPTION OF THE PREFERRED EMBODIMENTS

An embodiment of the present invention, which is applied to a portable computer, will now be described with reference to the accompanying drawings.

Figure 1:
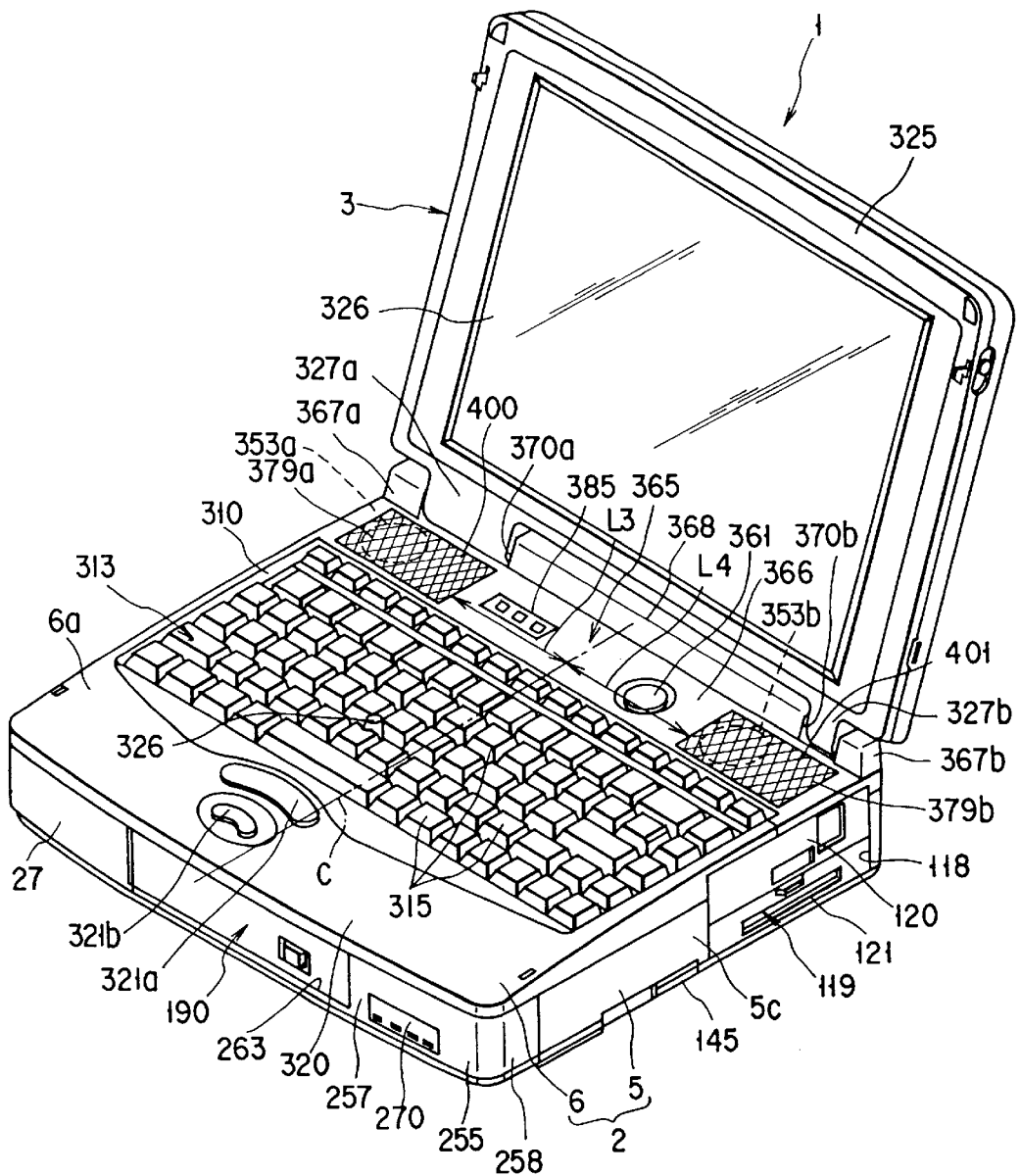
FIG. 1 is a perspective view showing a portable computer according to the present invention.
Figure 2:
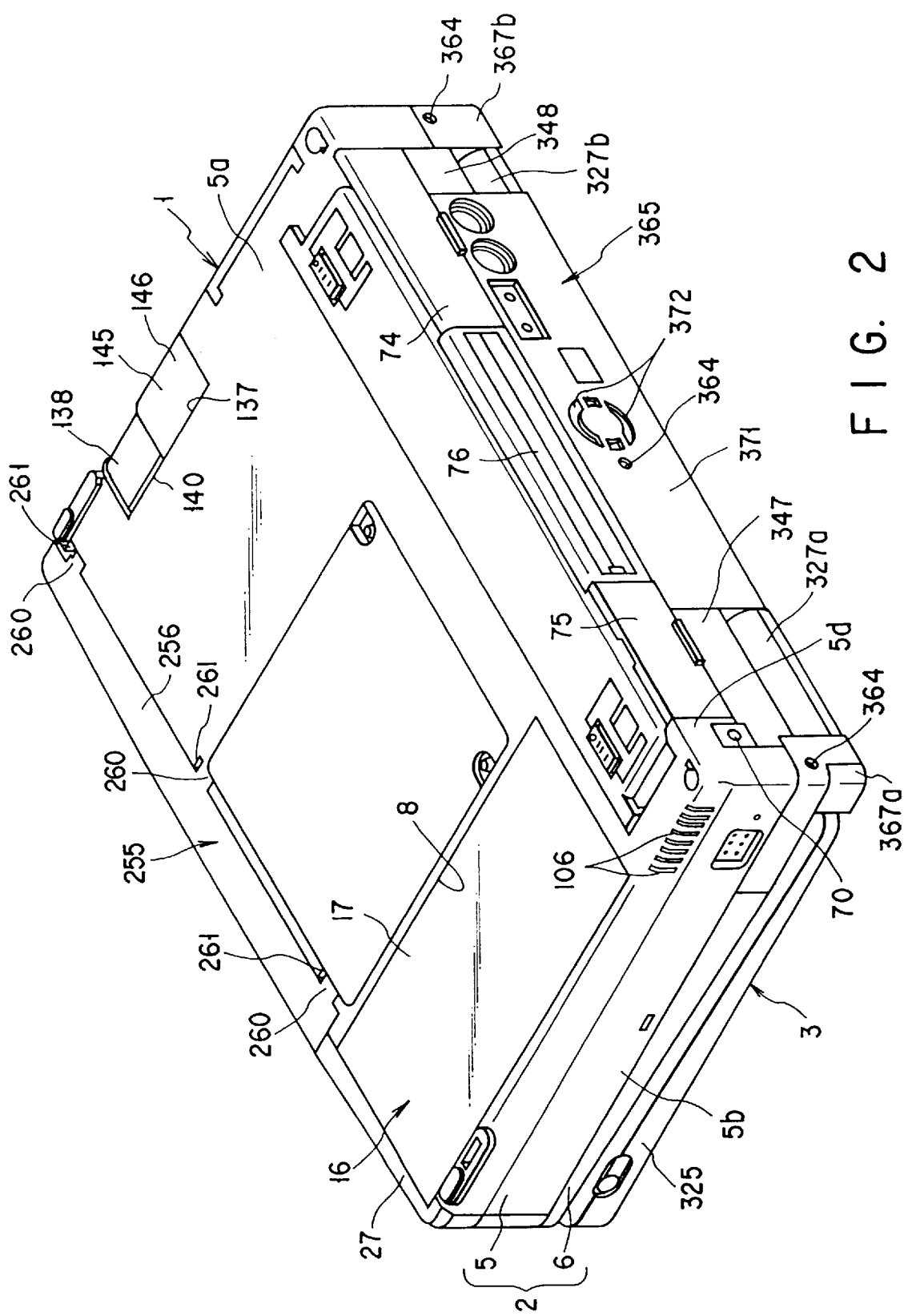
FIG. 2 is a perspective view of the portable computer, showing the bottom side of a housing body thereof.
Figure 8:
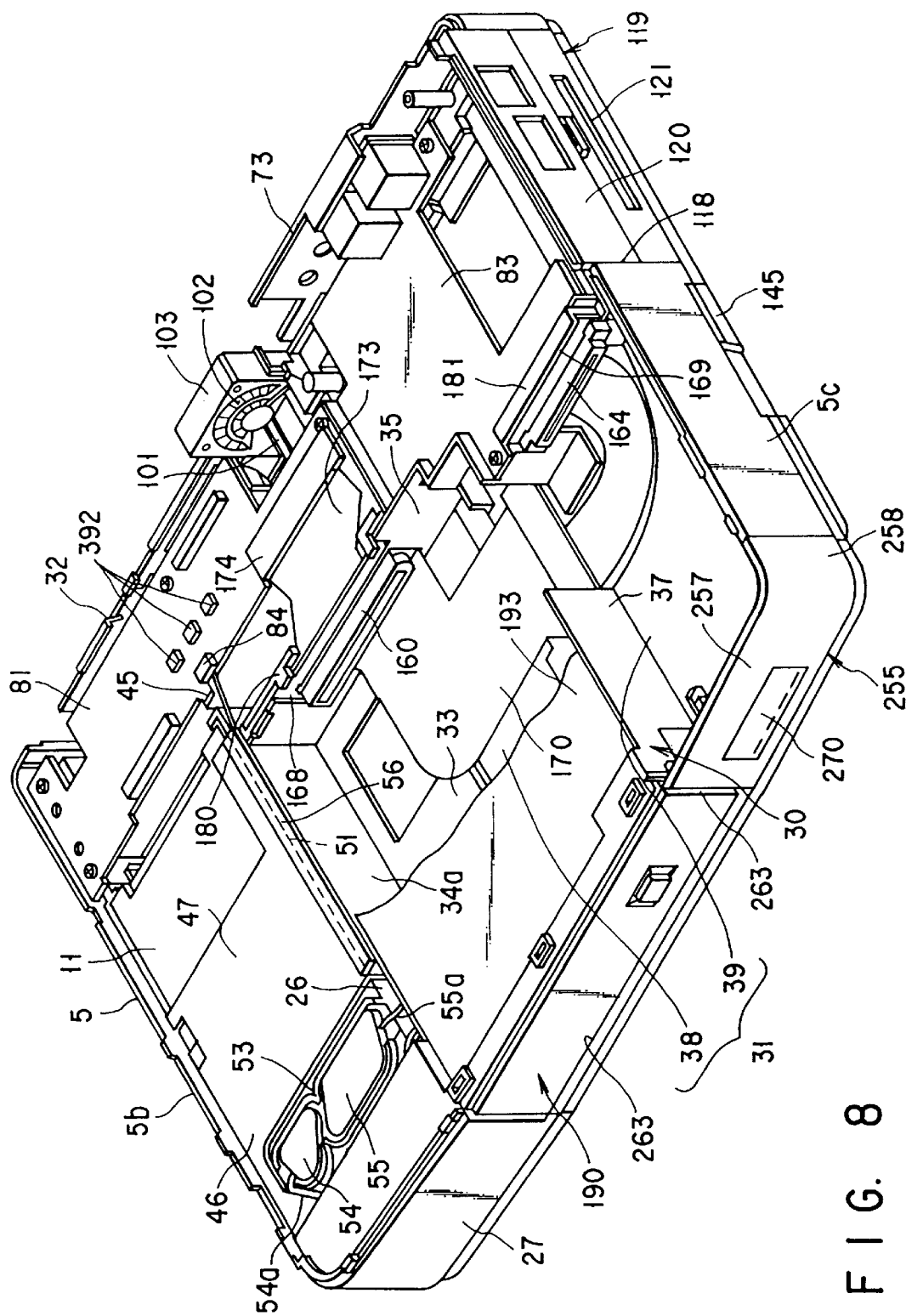
FIG. 8 is a perspective view showing the state in which a frame is mounted on a lower housing.

FIG. 1 shows a book-type portable computer 1 of "A4" size. The computer 1 comprises a housing body 2 of a synthetic resin and a display unit 3 supported on the housing body 2. The housing body 2 comprises a lower housing 5 opening upward and an upper housing 6 detachably coupled to an upper end portion of the lower housing 5. As is shown in FIGS. 2 and 8, the lower housing 5 has a flat bottom wall 5a, side walls 5b and 5c, and a rear wall 5d. The side walls 5b and 5c and rear wall 5d extend upward from a peripheral portion of the bottom wall 5a.

The upper housing 6 has a plate shape and includes a substantially flat upper wall 6a. The upper wall 6a faces the bottom wall 5a of the lower housing 5. Side edge portions of the upper wall 6a are continuous with the upper end portions of the side walls 5b and 5c of lower housing 5. Thus, the housing body 2 has a flat rectangular box-like shape with an opening on the front side.

As is shown in FIGS. 2, 4 and 5A, the lower housing 5 has a battery storage section 8. The battery storage section 8 is formed as a recess opening to the bottom wall 5a. The battery storage section 8 extends in the depth direction of the lower housing 5 in a left-hand region of the lower housing 5. The battery storage section 8 has an insertion hole 9 opening to the front side of the lower housing 5.

Figure 14:
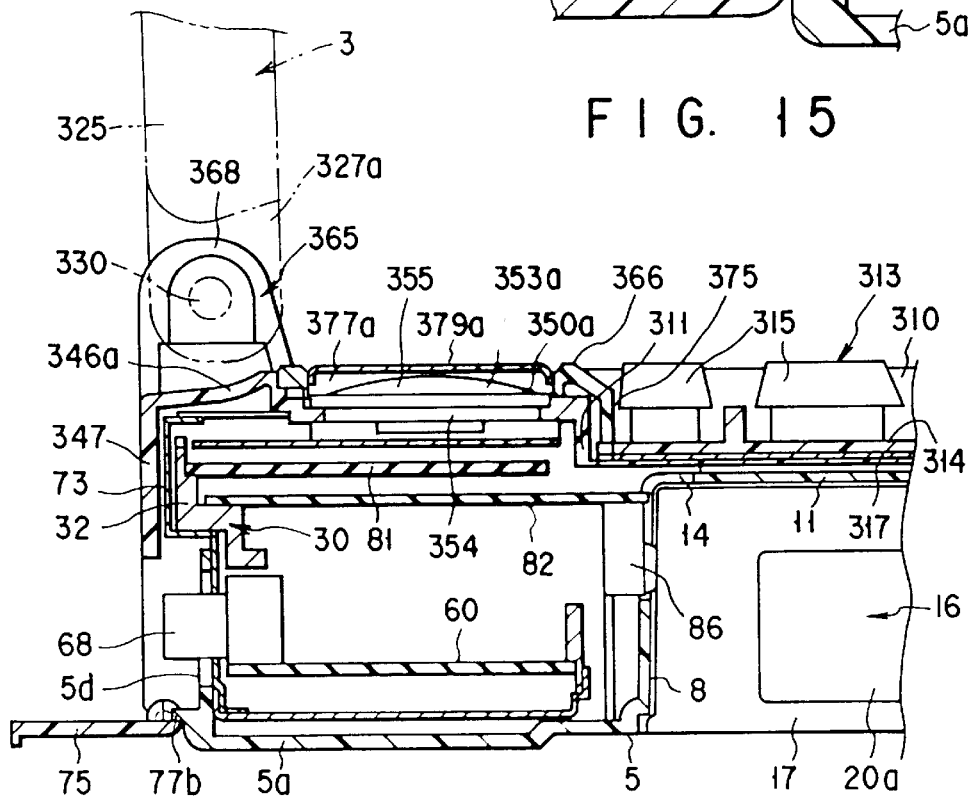
FIG. 14 is a cross-sectional view of the portable computer, showing a loudspeaker attachment portion.

The battery storage section 8, as shown in FIG. 5A, is defined by a pair of upright walls 10a and 10b extending in the depth direction of the lower housing 5, and a ceiling wall 11 connecting the upper end portions of the upright walls 10a and 10b. The upright walls 10a and 10b are spaced apart from each other in the width direction of the housing body 2. The upright walls 10a and 10b extend upward from the bottom wall 5a and project within the lower housing 5. The ceiling wall 11 is horizontally situated at an upwardly opening end of the lower housing 5 in parallel to the bottom wall 5a. The upright walls 10a and 10b have mutually facing inner surfaces. A guide recess 12 is formed in the inner surface of one of the upright walls, i.e. upright wall 10a. A guide rail 13 is formed on a lower part of the inner surface of the other upright wall 10b. The guide recess 12 and guide rail 13 extend in the depth direction of the lower housing 5. In addition, as shown in FIG. 14, a connector lead-out port 14 opens at a terminal end portion of the battery storage section 8. The connector lead-out port 14 communicates with the inside of the lower housing 5.

Figure 3:
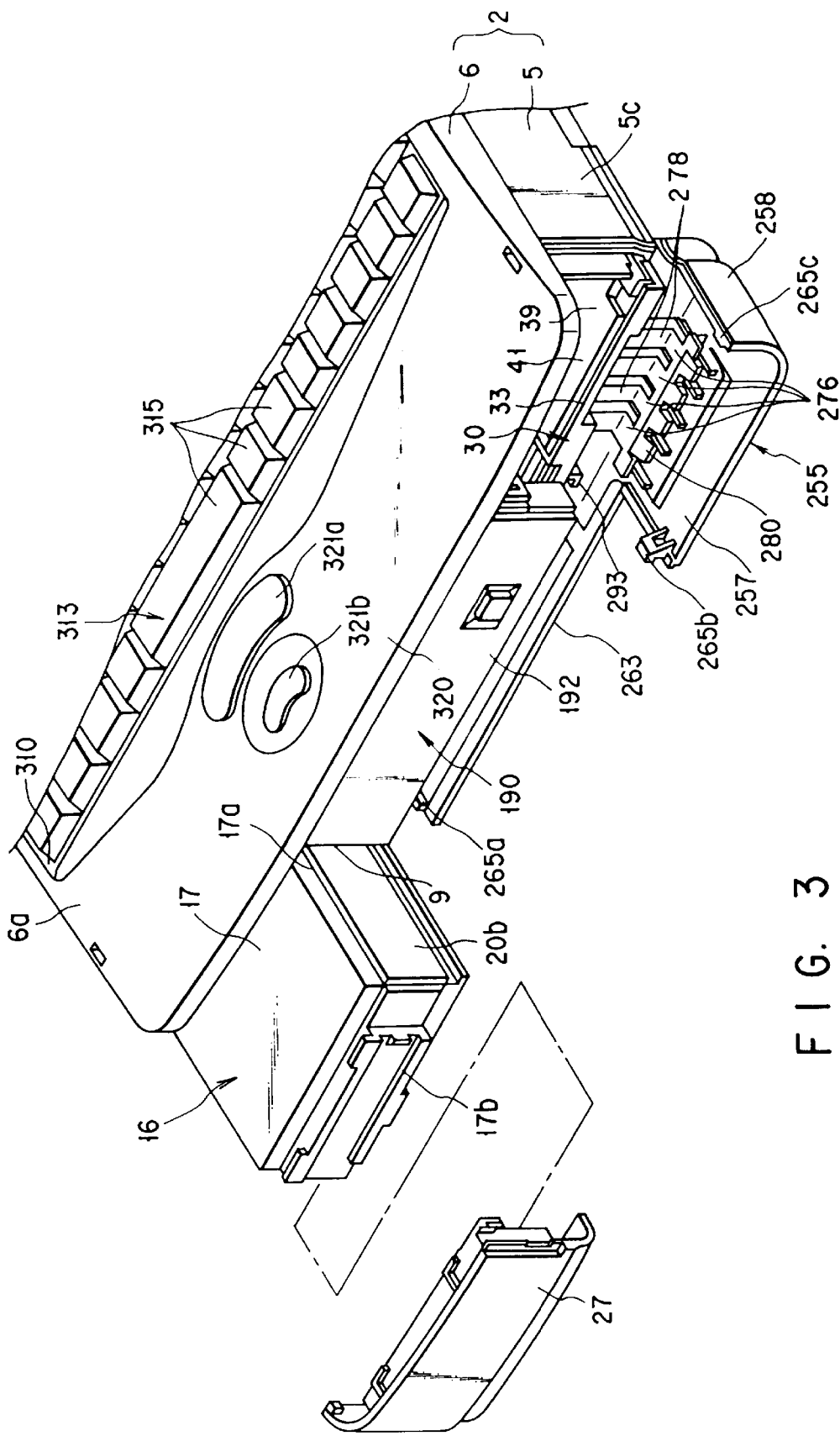
FIG. 3 is a perspective view of the portable computer, showing the state in which a front cover is rotated to a second position and a battery pack is drawn out of a battery storage section.
Figure 6:
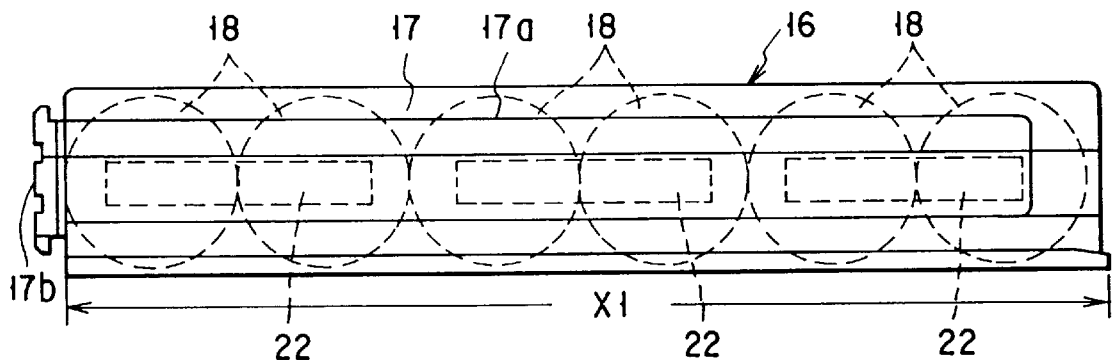
FIG. 6 is a side view of the battery pack.

As is shown in FIG. 3, a battery pack 16 is removably mounted in the battery storage section 8. The battery pack 16 serves as a drive power supply for the computer 1 when the computer 1 is used at a place where no commercial power supply is available. As is shown in FIGS. 6 and 7, the battery pack 16 comprises a battery case 17 of a synthetic resin and a plurality of secondary batteries 18 contained in the battery case 17.

The battery case 17 has a rectangular box shape having a longitudinal axis X1 extending in the depth direction of the lower housing 5 and a transverse axis X2 extending in the width direction of the lower housing 5. The battery case 17 is removably inserted into the battery storage section 8 via the insertion hole 9. The battery case 17 has such a size that it can be fitted in the battery storage section 8. Each secondary battery 18 has a cylindrical shape extending in the direction of the transverse axis X2 of the battery case 17. The secondary batteries 18 are arranged in the direction of the longitudinal axis X1 of the battery case 17. Each secondary battery 18 has a first end provided with a positive terminal 18a and a second end provided with a negative terminal 18b. The secondary batteries 18 are contained within the battery case 17 such that their positive terminals 18a and negative terminals 18b are alternately arranged in opposite directions.

The battery case 17 has a pair of side surfaces opposed to each other with the secondary batteries 18 interposed. The side surfaces of the battery case 17 extend along the longitudinal axis X1, and are provided with laterally protruding projections 20a and 20b. The projections 20a and 20b serve as guides when the battery case 17 is inserted into the battery storage section 8. One of the projections, i.e. projection 20a, is slidably engageable in the guide recess 12 in the upright wall 10a. The other projection 20b is engageable with the guide rail 13 on the upright wall 10b. Thus, the battery case 17 is held in the battery storage section 8 by the engagement between the projection 20a and guide recess 12 and the engagement between the projection 20b and guide rail 13. When the battery case 17 is held in the battery storage section 8, the bottom surface of the battery case 17 is situated in the same plane as the bottom wall 5a of the lower housing 5.

Figure 7:
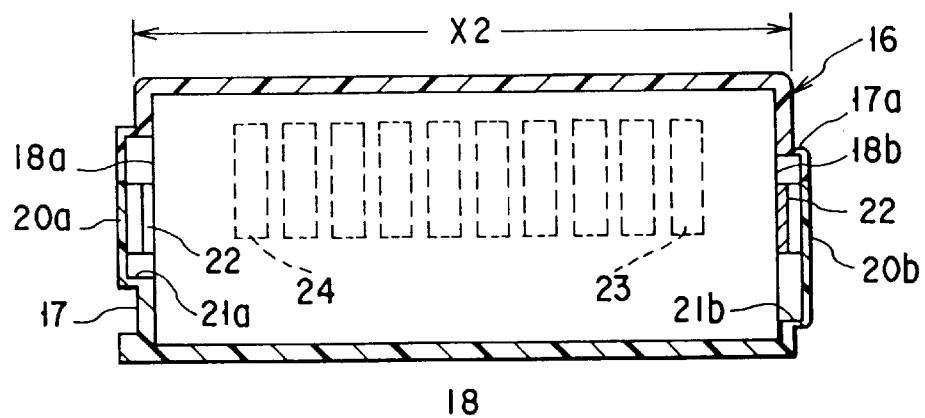
FIG. 7 is a cross-sectional view of the battery pack.

As is shown in FIG. 7, the insides of the projections 20a and 20b are open to the inside of the battery case 17. The insides of the projections 20a and 20b define terminal storage sections 21a and 21b extending in the direction of the longitudinal axis X1. The terminal storage sections 21a and 21b face the positive terminals 18a and negative terminals 18b of the secondary batteries 18. A plurality of connection terminals 22 are disposed in the terminal storage sections 21a and 21b. The connection terminals 22 function to electrically connect the positive terminal 18a and negative terminal 18b of two adjacent secondary batteries 18. The secondary batteries 18 are connected in series via the connection terminals 22. The secondary batteries 18 are connected to a positive (+) electrode 23 and a negative (−) electrode 24. These electrodes 23 and 24 are disposed on one end face of the battery case 17 in the direction of the longitudinal axis X1. When the battery case 17 is inserted in the battery storage section 8, the electrodes 23 and 24 face the connector lead-out port 14.

As is shown in FIGS. 5A and 5B, a recess portion 26 is formed at a corner defined by the right-hand upright wall 10b and the ceiling wall 11 of the battery storage section 8. The recess portion 26 extends in the depth direction of the lower housing 5. The recess portion 26 has a projection 26a protruding to the inside of the battery storage section 8. The projection 26a is engaged in a stepped portion 17a defined by the right-hand side surface and right-hand projection 20b of the battery case 17.

As is shown in FIGS. 3 and 6, a cover attachment portion 17b is formed on an end face of the battery case 17, which is opposed to the end face thereof on which the electrodes 23 and 24 are disposed. A battery cover 27 is detachably attached to the cover attachment portion 17b. When the battery pack 16 is completely inserted in the battery storage section 8, the battery cover 27 is located on the front end portion of the lower housing 5. The battery cover 27 is slidable between an engaged position where it is engaged with the front end portion of the lower housing 5 and a disengaged position where it is disengaged from the front end portion of the lower housing 5. Thus, when the battery cover 27 is slid to the engaged position, the battery pack 16 is held in the battery storage section 8 in a locked manner. In the state in which the battery cover 27 is slid to the engaged position, the battery cover 27 is continuous with the bottom wall 5a and left-hand side wall 5b of the lower housing 5 and the insertion hole 9 of the battery storage section 8 is hidden from the front.

As is shown in FIG. 8, a frame 30 is contained within the lower housing 5. The frame 30 is formed of a light-weight, heat-conductive metallic material such as a magnesium alloy. The frame 30 has such a size that it is fitted in the lower housing 5. The frame 30 integrally comprises a pack storage section 31 and a board support portion 32. The pack storage section 31 is situated adjacent to the battery storage section 8 in front half part of the frame 30. As is shown in FIGS. 8 and 10, the pack storage section 31 includes a bottom wall 33, a pair of side walls 34a and 34b continuous with the bottom wall 33, and a rear wall 35 continuous with the bottom wall 33 and side walls 34a and 34b. The pack storage section 31 has a box shape, opening upward and forward of the lower housing 5.

Figure 23:
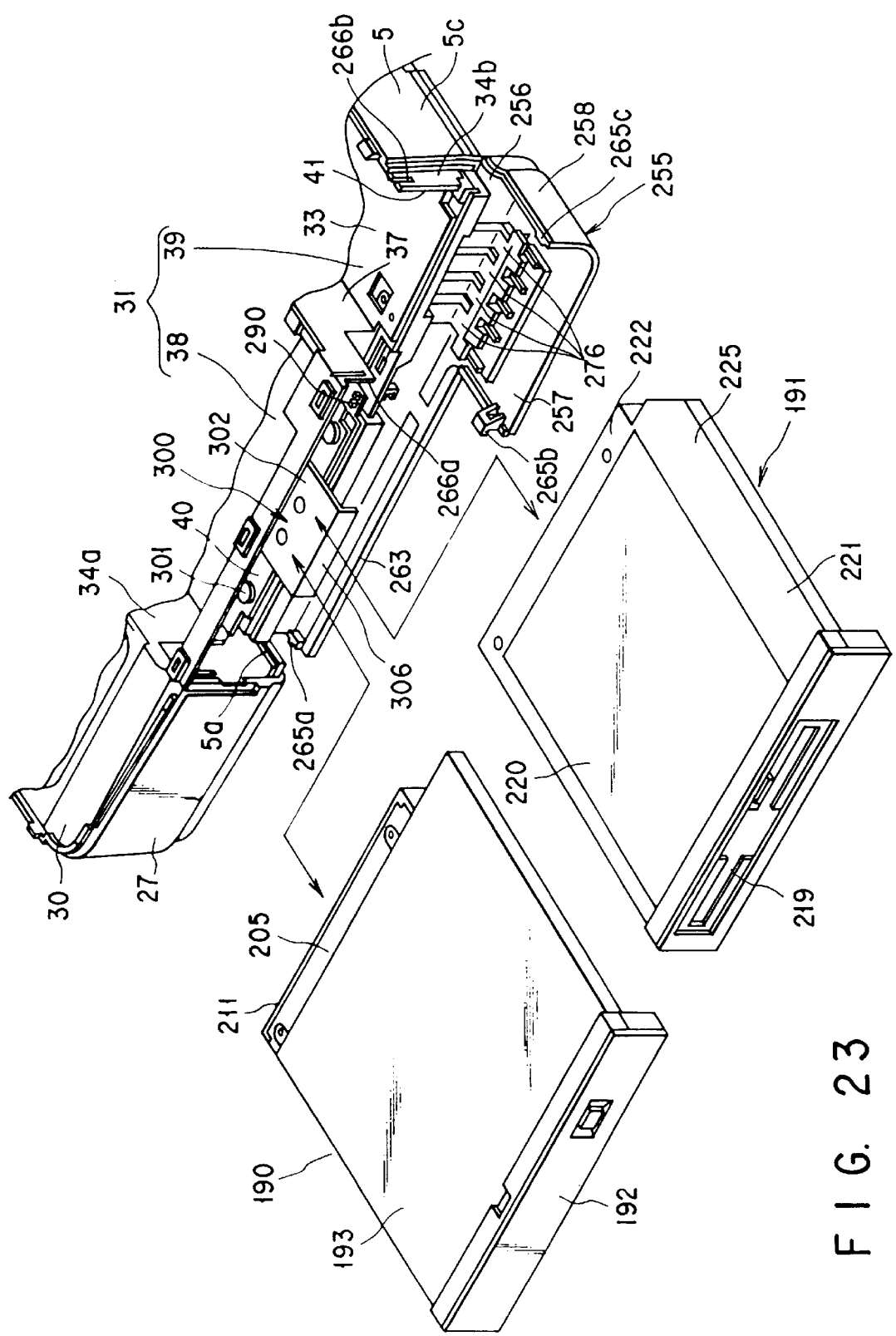
FIG. 23 is a perspective view showing the state in which a CD-ROM drive and a floppy disk drive are removed from a pack storage section of the housing body.

The pack storage section 31 is divided into a first section 38 and a second section 39 by means of a partition wall 37. The first section 38 and second section 39 are arranged in the width direction of the lower housing 5. The first section 38 is adjacent to the battery storage section 8. The first and second sections 38 and 39 have insertion holes 40 and 41 opening to the front side, as shown in FIGS. 10 and 23. The insertion holes 40 and 41 are located at the front end of the lower housing 5.

Figure 22:
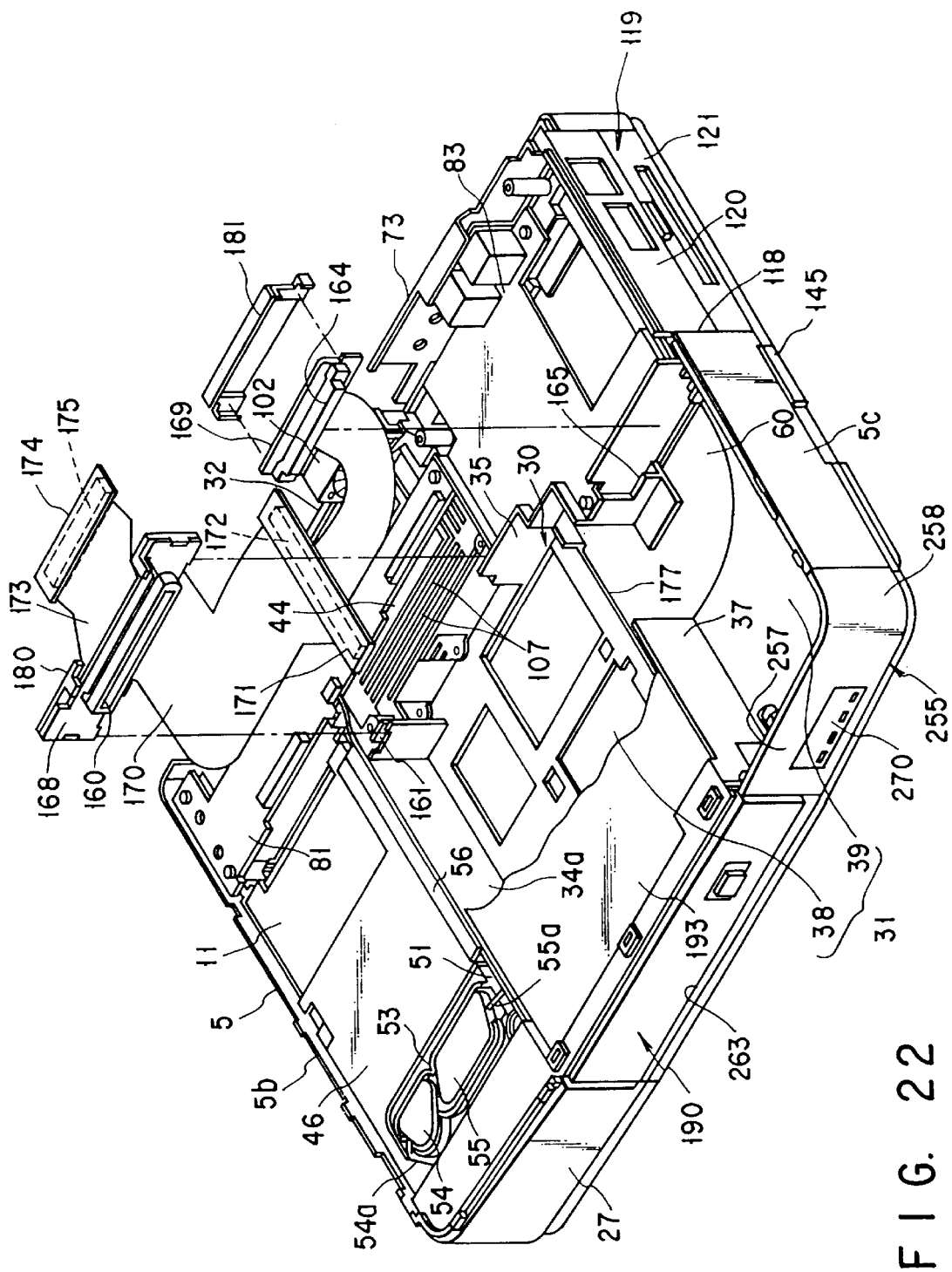
FIG. 22 is a perspective view showing in an exploded manner the state in which first and second relay connectors are removed from the frame.

As is shown in FIGS. 8 and 22, the board support portion 32 of the frame 30 extends in the width direction of the lower housing 5 in rear of the battery storage section 8 and pack storage section 31. As is clear from FIG. 17, the board support portion 32 has a bottom wall 44 and a support wall 45 continuous with the bottom wall 44. The bottom wall 44 is continuous with the bottom wall 33 of pack storage section 31, and the support wall 45 is continuous with the rear wall 35 of pack storage section 31.

The frame 30, as shown in FIGS. 5A and 12, has a reinforcement wall 46 integrally. The reinforcement wall 46 comprises a first wall portion 47 extending horizontal and continuous with the left-hand side wall 34a of the pack storage section 31, and a second wall portion 48 extending downward from a distal end of the first wall portion 47. The first wall portion 47 is superposed on the ceiling wall 11 of the battery storage section 8. The second wall portion 48 extends in the depth direction of the lower housing 5 and a rear end portion thereof is continuous with the support wall 45 of the board support portion 32. The second wall portion 48 is fitted between the upright wall 10a of the battery storage section 8 and the side wall 5b of the lower housing 5. Thus, the reinforcement wall 46 surrounds the battery storage section 8 within the lower housing 5.

As shown in FIGS. 5A and 5B, the left-hand side wall 34a of the pack storage section 31 is adjacent to the upright wall 10b of the battery storage section 8. An inwardly protruding projection 50 is formed at a corner portion defined by the side wall 34a and the first wall portion 47 of reinforcement wall 46. The projection 50 extends in the depth direction of the lower housing 5. The projection 50 enters the recess portion 26 of the battery storage section 8. The projection 50 has a groove-like wiring passage 51 opening to the upper surface of the first wall portion 47. The wiring passage 51 extends in the depth direction of the lower housing 5, and a rear end portion thereof is continuous with the board support portion 32.

Figure 9:
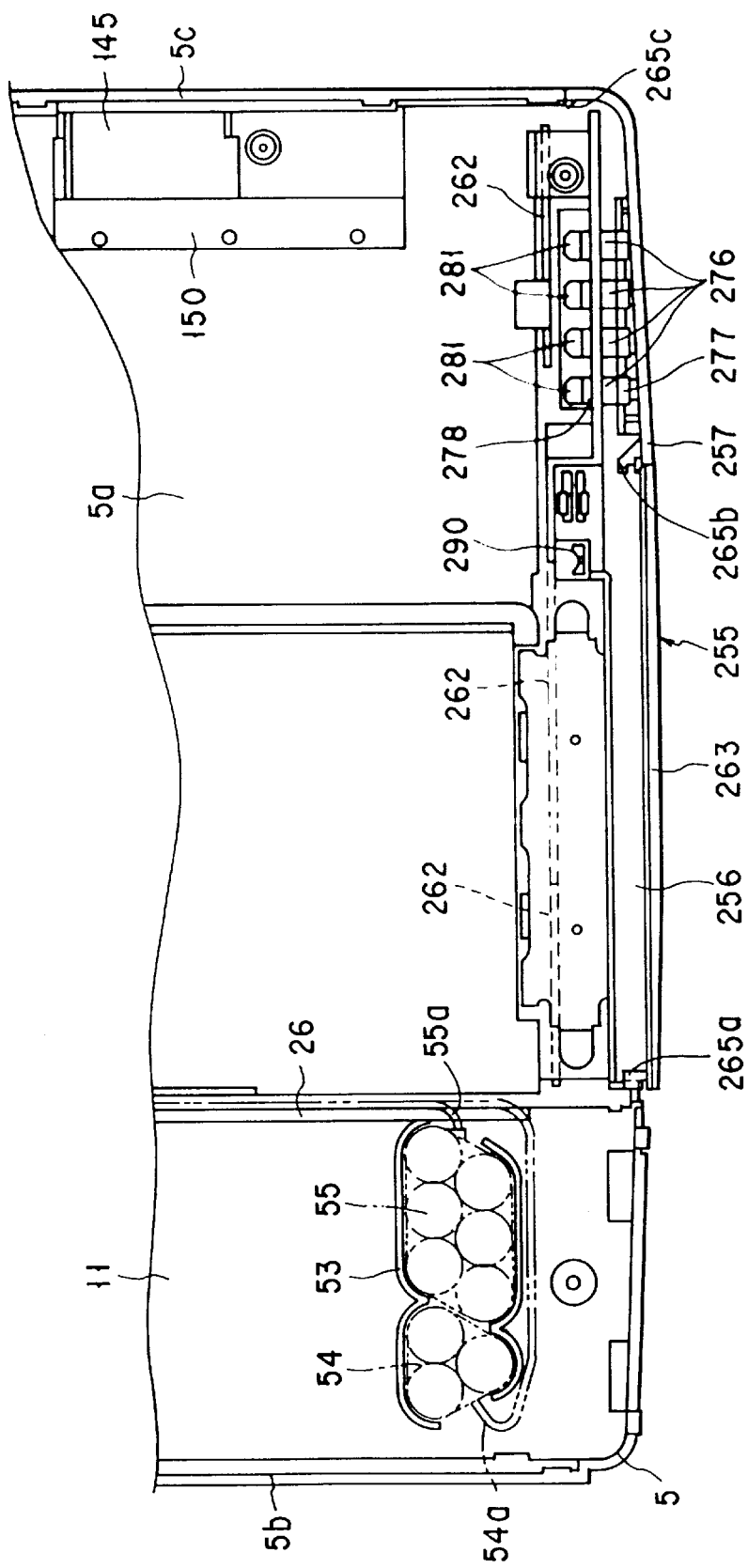
FIG. 9 is a plan view of the lower housing, showing the state in which the front cover is rotated to the first position.

As is shown in FIGS. 8, 9 and 11, a battery hold section 53 is formed on the upper surface of the ceiling wall 11 of the battery storage section 8. The battery hold section 53 is continuous with the wiring passage 51. An auxiliary battery 54 and a clock battery 55 are held by the battery hold section 53. The auxiliary battery 54 and clock battery 55 have lead lines 54a and 55a respectively. The lead lines 54a and 55a are led to the board support portion 32 via the wiring passage 51. An opening end portion of the wiring passage 51 is covered with a synthetic-resin insulating sheet 56. The insulating sheet 56 is attached on the upper surface of the first wall portion 47. The presence of the insulating sheet 56 prevents the lead lines 54a and 55a from being removed from the wiring passage 51.

Figure 13:
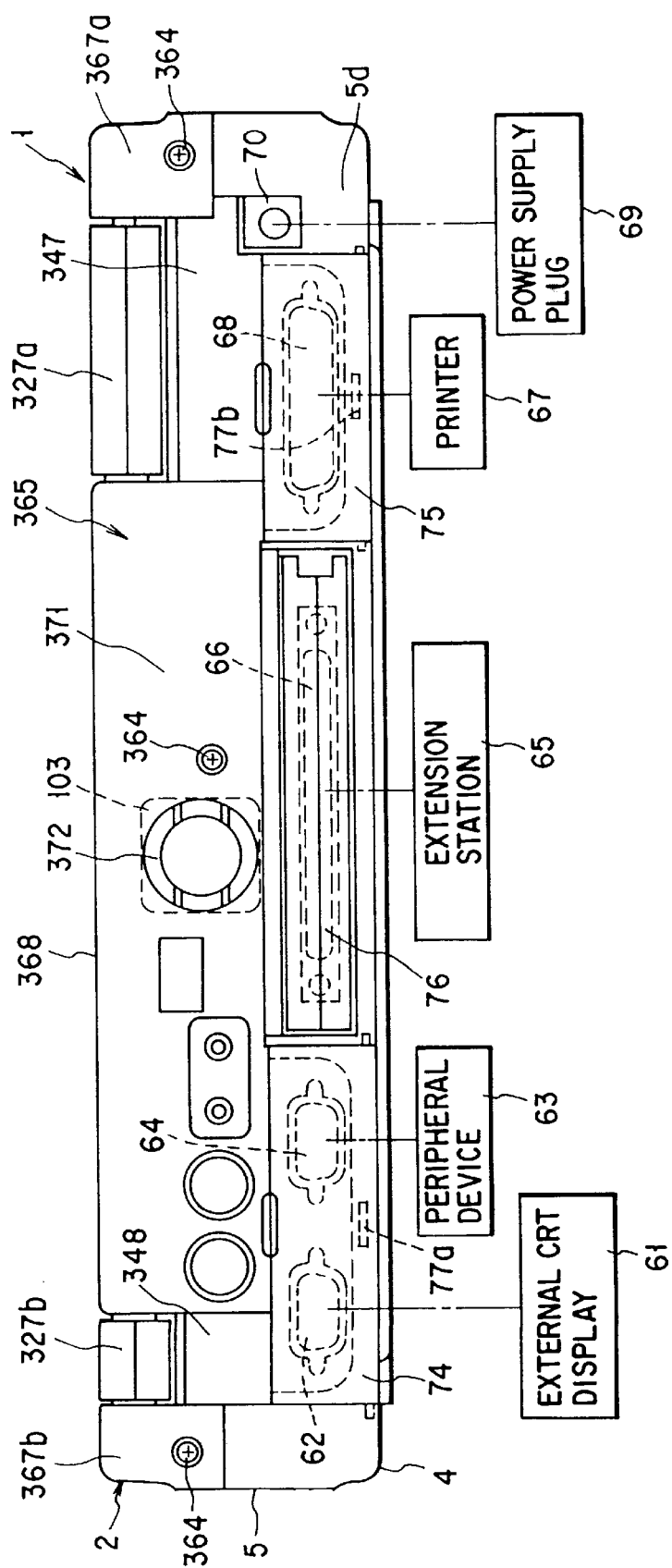
FIG. 13 is a rear view of the portable computer.
Figure 15:
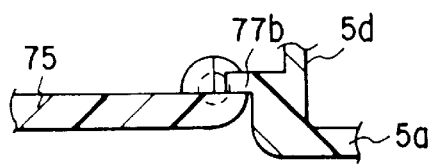
FIG. 15 is a cross-sectional view showing the relationship between a second connector cover and a stopper.

As is shown in FIGS. 14 and 17, a first circuit board 60 is supported at a lower end of the frame 30. The first circuit board 60 has such a size that it covers the bottom side of the pack storage section 31 and board support portion 32. The first circuit board 60 is contained within the lower housing 5 in parallel to the bottom wall 5a of the lower housing 5. A rear end portion of the first circuit board 60 is adjacent to the rear wall 5d of the lower housing 5. As is shown in FIG. 13, the rear end portion of the first circuit board 60 is provided with an RGB connector 62 for connection with an external CRT display 61; a COMMS connector 64 for connection with a peripheral device 63 of RS-232C Standard; an extension connector 66 for connection with an extension station 65; a parallel connector 68 for connection with a printer 67; and a power supply connector 70 for connection with a power supply plug 69. The connectors 62, 64, 66, 68 and 70 are arranged substantially linearly in the width direction of the lower housing 5.

A metallic shield plate 73 is provided on the rear end portion of the first circuit board 60. The shield plate 73 covers, from the rear side, the connection portion between the connectors 62, 64, 66, 68 and 70 and the first circuit board 60. The connectors 62, 64, 66, 68 and 70 are exposed to the rear wall 5d of lower housing 5. A first connector cover 74 and a second connector cover 75 are attached to the rear wall 5d. The first connector cover 74 is situated in a position corresponding to the RGB connector 62 and COMMS connector 64. The second connector cover 75 is situated in a position corresponding to the parallel connector 68. The first and second connector covers 74 and 75 are formed of a synthetic resin and have rectangular plate-like shapes. The connector covers 74 and 75 are supported on the lower housing 5 so as to be rotatable between a closed position where they cover, from the rear side, the connectors 62, 64 and 68 and an open position where they turn rearward of the lower housing 5 and expose the connectors 62, 64 and 68. A third connector cover 76 is disposed between the first connector cover 74 and second connector cover 75. The third connector cover 76 is associated with the extension connector 66 and is openably supported on the shield plate 73.

As is shown in FIGS. 13 to 16, the rear wall 5d of lower housing 5 is provided with a pair of rearwardly projecting stoppers 77a and 77b. The stoppers 77a and 77b are disposed in positions corresponding to the first and second connector covers 74 and 75 respectively. When the first and second connector covers 74 and 75 are rotated about 90° from the closed position to the open position, the stoppers 77a and 77b abut upon the lower end portions of the connector covers 74 and 75, thereby limiting further rotation of the first and second connector covers 74 and 75.

Thus, when the first and second connector covers 74 and 75 are rotated to the open position and situated substantially horizontal, the rotation thereof is stopped. For example, when the computer 1 is placed on the top plate of the desk, the first and second connector covers 74 and 75 are not caught between the computer 1 and the top plate of the desk, thus preventing breakage of the connector covers 74 and 75.

According to this structure, what is required is only to form the stoppers 77a and 77b integral with the rear wall 5d of the lower housing 5, and there is no need to provide special parts for limiting the rotation of the connector covers 74 and 75. The structure of the housing body 2 is not complicated.

As is shown in FIGS. 8, 14 and 17, second to fourth circuit boards 81, 82 and 83 are screwed down to the board support portion 32 of the frame 30. The second circuit board 81 and third circuit board 82 are situated behind the battery storage section 8 and the first section 38 of the pack storage section 31. The second and third circuit boards 81 and 82 are arranged above the first circuit board 60 substantially in parallel to the first circuit board 60. The second circuit board 81 is disposed substantially in the same plane as the ceiling wall 11 of battery storage section 8 and the reinforcement wall 46 of frame 30. The lead lines 54a and 55a passed through the wiring passage 51 are connected to the second circuit board 81 via a connector 84.

As is shown in FIG. 17, the third circuit board 82 is a power supply board and interposed between the second circuit board 81 and the bottom wall 44 of the frame 30. A power supply circuit component 85, which generates heat in operation, and a battery connector 86 are mounted on the bottom surface of the third circuit board 82. The battery connector 86 is exposed to the inside of the battery storage section 8 via the connector lead-out port 14. The battery connector 86 is put in contact with the positive (+) electrode 23 and negative (−) electrode 24 of the battery pack 16.

As is shown in FIG. 8, the fourth circuit board 83 is disposed behind the second section 39 of the pack storage section 31. The fourth circuit board 83 is situated above the first circuit board 60 substantially in parallel to the first circuit board 60.

A TCP (Tape Carrier Package) 90 functioning as CPU is mounted on the lower surface of the first circuit board 60, as shown in FIG. 17. The amount of heat generated by the TCP 90 in operation is very great because of high-speed, large-capacity processing of the computer 1. A rectangular through-hole 91 is formed in the first circuit board 60 in a region facing the TCP 90. A cold plate 92 for enhancing the heat radiation performance of the TCP 90 is attached to the first circuit board 60. The cold plate 92 is formed of a copper alloy with high heat conductivity and is screwed down to the upper surface of the first circuit board 60. The cold plate 92 has a heat receiving portion 93 fitted in the through-hole 91. The lower surface of the heat receiving portion 93 is located substantially in the same plane as the lower surface of the first circuit board 60. The TCP 90 is attached to the lower surface of the heat receiving portion 93 by means of a heat-conductive adhesive.

A TCP cover 95 is attached to the lower surface of the first circuit board 60. The TCP cover 95 has a metallic cover panel 96 with excellent heat conductivity. The cover panel 96 is put in contact with the TCP 90 with a heat-conductive, elastic sheet 97 interposed therebetween. If the TCP 90 generates heat, the heat of the TCP 90 is escaped to the cold plate 92 and TCP cover 95.

The cold plate 92 faces the bottom wall 44 of the board support portion 32. A heat radiation plate 99 is attached to the bottom wall 44. The radiation plate 99 is formed of an aluminum alloy with excellent heat conductivity. The radiation plate 99 is in contact with the cold plate 92 without gap. The radiation plate 99 is put in contact with the bottom wall 44 with a heat-conductive, elastic sheet 100 interposed. Thus, the heat of the TCP 90 transmitted to the cold plate 92 is escaped to the radiation plate 99 and then diffused to the frame 30 via the radiation plate 99.

As is shown in FIG. 17, the radiation plate 99 integrally includes a fan support portion 101. The fan support portion 101 is a rear extension of the radiation plate 99 traveling in a substantially inclined upward direction. The distal end portion of the fan support portion 101 is located substantially on the same level as the third circuit board 82. A motor fan 102 is attached to the fan support portion 101. The motor fan 102 forcibly cools the radiation plate 99. The motor fan 102 has a fan casing 103 formed of an aluminum alloy. The fan casing 103 is in contact with the fan support portion 101 and serves also as heat sink.

If the motor fan 102 is driven, the fan casing 103 and radiation plate 99 are forcibly cooled by air by means of the motor fan 102, and the heat radiation of the radiation plate 99 is facilitated. As a result, the heat of the TCP 90 transmitted to the cold plate 92 can be efficiently dissipated to the outside via the radiation plate 99. Since the radiation plate 99 is in contact with the metallic frame 30, the heat of the TCP 90 transmitted to the radiation plate 99 is dissipated to the frame 30 and naturally radiated via the housing body 2. Thus, in combination with the forcible air-cooling function of the motor fan 102, the heat of the TCP 90 can be efficiently radiated.

Figure 16:
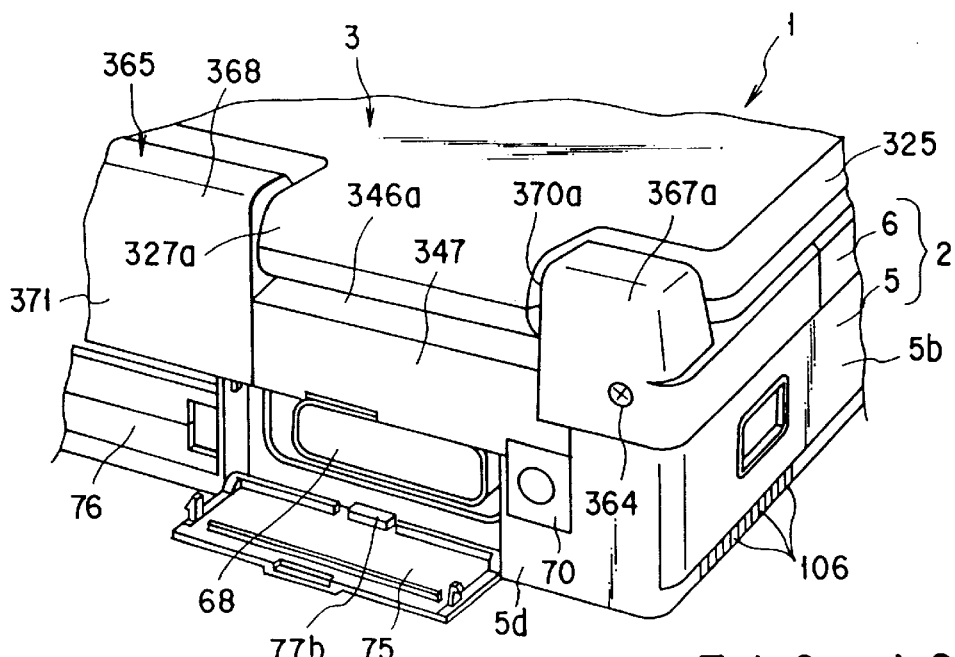
FIG. 16 is a perspective view of the portable computer showing the state in which the second connector cover is opened.

As is shown in FIG. 17, a cooling air passage 105 is defined between the bottom wall 44 of board support portion 32 and the third circuit board 82. The cooling air passage 105 extends from a central region toward a left-hand end of the board support portion 32. The aforementioned power supply circuit component 85 is contained within the cooling air passage 105. The cooling air passage 105 has one end portion communicating with the installation portion of the motor fan 102 and the other end portion reaching the left-hand side wall 5b of the lower housing 5. The side wall 5b of the lower housing 5 has a plurality of air holes 106, as shown in FIG. 16. The air holes 106 communicate with the cooling air passage 105.

As is shown in FIG. 17, a plurality of cooling fins 107 are formed on the upper surface of the bottom wall 44 facing the cooling air passage 105. The cooling fins 107 extend in the direction of extension of the cooling air passage 105.

In the above structure, if the motor fan 102 is driven, the cooling air passage 105 is set at a negative pressure level and thus the air outside the housing body 2 is sucked into the cooling air passage 105 via the air holes 106. The air flows as cooling wind through the cooling air passage 105, while forcibly cooling the power supply circuit component 85. The cooling wind flows along the bottom wall 44 receiving heat of the radiation plate 99, thus facilitating the heat radiation of the bottom wall 44. In addition, since the bottom wall 44 has the cooling fins 107, the heat radiation area of the bottom wall 44 increases and the heat of the TCP 90 transmitted from the radiation plate 99 is efficiently radiated.

As is shown in FIG. 18, an extension area 110 is provided within the housing body 2. The extension area 110 is located on the right-hand part of the board support portion 32. The extension area 110 is divided into a MODEM storage section 111 and a card storage section 112. The MODEM storage section 111 and card storage section 112 are arranged such that they are stacked on each other in the thickness direction of the housing body 2. The MODEM storage section 111 stores a MODEM pack (not shown) constructed as a module unit. The MODEM storage section 111 is located above the fourth circuit board 83. The card storage section 112 removably contains an extension card such as a PCMCIA (Personal Computer Memory Card International Association) or an interface card. The card storage section 112 is located between the first circuit board 60 and the fourth circuit board 83. The card storage section 112 has a card connector 113 for connection with the extension card and a card guide 114 for guiding the extension card to the card connector 113. The card connector 113 and card guide 114 are mounted on the first circuit board 60.

Figure 19A:
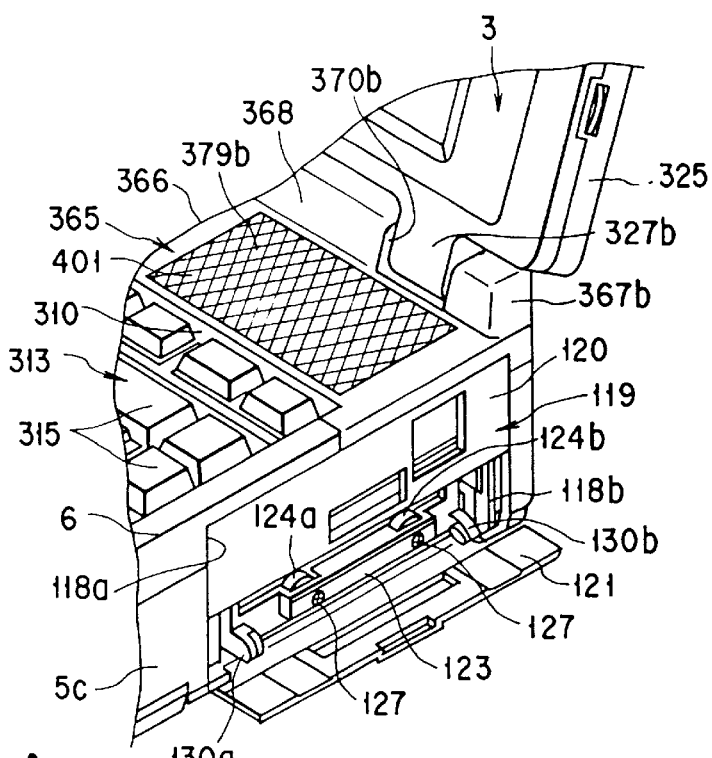
FIG. 19A is a perspective view of the portable computer, showing an attachment portion for a cover unit.
Figure 19B:
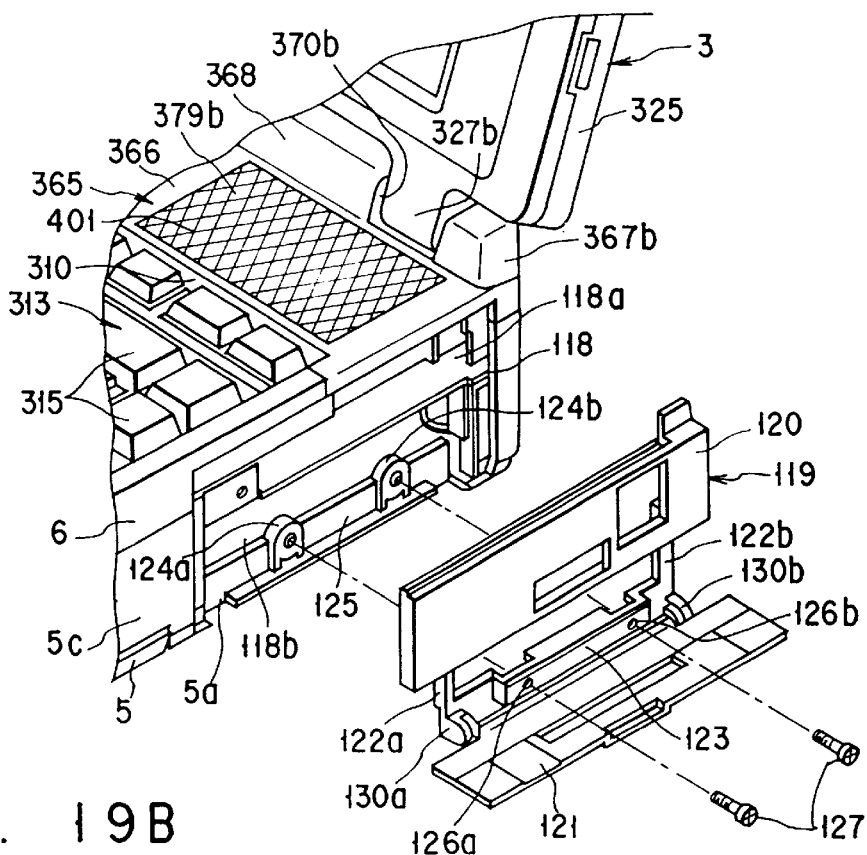
FIG. 19B is a perspective view of the portable computer, showing in an exploded manner the state in which the cover unit is removed from the housing body.

As is shown in FIG. 19B, an opening portion 118 communicating with the extension area 110 is formed in the right-hand side wall 5c of the lower housing 5. The opening portion 118 includes a MODEM insertion port 118a associated with the MODEM storage section 111 and a card insertion port 118b associated with the card storage section 112. The lower housing 5 is provided with a cover unit 119 of a synthetic resin covering the opening portion 118.

The cover unit 119 has a MODEM cover 120 and a card cover 121. The MODEM cover 120 has a rectangular plate-like shape with a size corresponding to the MODEM insertion port 118a. The MODEM cover 120 comprises a pair of stays 122a and 122b extending downward, and a bracket portion 123 coupling lower end portions of the stays 122a and 122b. The bracket portion 123 of MODEM cover 120 is supported on the bottom wall 5a of lower housing 5.

Specifically, as shown in FIG. 19B, the bottom wall 5a of lower housing 5, which faces the opening portion 118, is provided with a cover attachment portion 125 having a pair of boss portions 124a and 124b. The cover attachment portion 125 faces the card insertion portion 118b. The bracket portion 123 of MODEM cover 120 is abutted upon the cover attachment portion 125. Screw holes 126a and 126b associated with the boss portions 124a and 124b are formed in the bracket portion 123. Screws 127 are inserted into the screw holes 126a and 126b. The screws 127 are turned and driven into the boss portions 124a and 124b. Thereby, the MODEM cover 120 is fixed on the lower housing 5, and the MODEM insertion port 118a is covered by the MODEM cover 120.

The card cover 121 has a rectangular plate-like shape with a size corresponding to the card insertion port 118b. The card cover 121 is supported on the bracket portion 123 of the MODEM cover 120. The bracket portion 123 has a pair of cover support portions 130a and 130b which are spaced apart from each other in the depth direction of the lower housing 5.

The card cover 121 is rotatably supported between the cover support portions 130a and 130b. Thus, the card cover 121 is rotatably supported on the bracket portion 123 between a closed position where the card cover 121 is turned up to be substantially flush with the side wall 5c, and an open position where the card cover 121 is turned down to the right side of the lower housing 5 to expose the card insertion port 118b. In the state in which the card cover 121 is rotated to the closed position, the card cover 121 is continuous with the MODEM cover 120 and covers the bracket portion 123 of MODEM cover 120 and screws 127 in the lateral direction.

According to the cover unit 119 having the above structure, since the card cover 121 is rotatably supported on the MODEM cover 120, there is no need to provide the lower housing 5 with a support member for supporting the card cover 121. Thus, the structure of the lower housing 5 is simplified and the number of parts is reduced, as compared to the case where the MODEM cover 120 and card cover 121 are individually attached to the lower housing 5.

Furthermore, the fixing portion of the MODEM cover 120 and lower housing 5 can be covered by using the card cover 121, and there is no need to provide special parts for covering the bracket portion 123 or screws 127.

As is shown in FIG. 20, an FDD connector 136 is mounted on the lower surface of the first circuit board 60. The FDD connector 136 is used for connection with an external floppy disk drive 135. The FDD connector 136 is located in a lower region of the second section 39 of pack storage section 31 and is adjacent to a corner portion defined by the bottom wall 5a and right-hand side wall 5c of lower housing 5. The lower housing 5 has a connector lead-out port 137 facing the FDD connector 136. As shown in FIG. 21A, the connector lead-out port 137 is open in a space from the bottom wall 5a to side wall 5c of the lower housing 5. A cover storage section 138 having a recess shape is formed in the bottom wall 5a and side wall 5c of the lower housing 5. The cover storage section 138 is continuous with the front end of the connector lead-out port 137.

The connector lead-out port 137 has a first opening edge portion 140 and a second opening edge portion 141. The first opening edge portion 140 extends in the depth direction of the lower housing 5 on the bottom wall 5a. The second opening edge portion 141 extends in the depth direction of the lower housing 5 on the side wall 5c. A guide groove 142 is formed in the side wall 5c along the second opening edge portion 141. The opening edge portions 140 and 141 and guide groove 142 extend to the region of the cover storage section 138.

A connector cover 145 for opening/closing the connector lead-out port 137 is attached to the lower housing 5. The connector cover 145 comprises a bottom plate portion 146 continuous with the bottom wall 5a and a side plate portion 147 continuous with the side wall 5c. The bottom plate portion 146 has an engaging portion 148 slidably engaged with the first opening edge portion 140. An inwardly projecting engaging portion 149 is formed on an upper end portion of the side plate portion 147. The engaging portion 149 is slidably engaged with the guide groove 142 in the side wall 5c.

A plate-like cover holder 150 is fixed on the inner surface of the bottom wall 5a, as shown in FIGS. 21A to 21C. The cover holder 150 is disposed along the first opening edge portion 140 of the connector lead-out port 137, and one side portion of the cover holder 150 projects inside the connector lead-out port 137. A guide groove 152 is formed in the lower surface of said one side portion of the cover holder 150. The guide groove 152 extends along the first opening edge portion 140, and the engaging portion 148 of the bottom plate portion 146 is slidably engaged in the guide groove 152. By this engagement, the engaging portion 148 is irremovably held on the first opening edge portion 140 and the connector cover 145 is not displaced to the lateral side.

The connector cover 145 is slidably held on the lower housing 5 by guide means comprising engagement portions between the engaging portion 148 and guide groove 152 and between the engaging portion 149 and guide groove 142. Thus, as shown in FIGS. 21B and 21C, the connector cover 145 is slidable between a closed position where the connector lead-out port 137 is closed and an open position where the connector lead-out port 137 is opened. In the state in which the connector cover 145 is slid to the opening position, the connector cover 145 is stored in the cover storage portion 138.

As is shown in FIGS. 21B and 21C, a pair of positioning projections 153a and 153b are provided on one side portion of the guide groove 152. The positioning projections 153a and 153b are spaced apart from each other in the direction of sliding movement of the connector cover 145. One of the position projections, i.e. projection 153a, is disposed in a position associated with the closed position of the connector cover 145, and the other positioning projection 153b is disposed in a position associated with the open position of the connector cover 145. An engaging projection 154 is provided on one end portion of the engaging portion 148 of connector cover 145. The engaging projection 154 is put in slidable contact with said one side portion of the guide groove 152.

When the connector cover 145 is slid from the open position to the closed position, the engaging projection 154 moves beyond the the positioning projection 153a just before the connector cover 145 reaches the closed position. At this time, the operator feels a click. Similarly, when the connector cover 145 is slid from the closed position to the open position, the engaging projection 154 moves beyond the the other positioning projection 153b just before the connector cover 145 reaches the open position. At this time, the operator feels a click. Accordingly, the operator can recognize that the connector cover 145 has reached the closed position or open position, and the sliding operation of the connector cover 145 is ensured.

As is shown in FIGS. 8 and 22, a first relay connector 160 is disposed in the first section 38 of the pack storage section 31. The first relay connector 160 is located at the terminal end portion of the first section 38 and opposed to the insertion hole 40 of the first section 38. The terminal end portion of the first section 38 is constituted by the rear wall 35 of the pack storage section 31. A connector attachment portion 161 is formed on the rear wall 35. The connector attachment portion 161 has a groove shape and is opened upward of the pack storage section 31.

A second relay connector 164 is disposed in the second section 39 of the pack storage section 31. The second relay connector 164 is located at the terminal end portion of the second section 39 and opposed to the insertion hole 41 of the second section 39. The terminal end portion of the second section 39 is constituted by the rear wall 35 of the pack storage section 31. A connector attachment portion 165 is formed on the rear wall 35. The connector attachment portion 165 has a groove shape and is opened upward of the pack storage section 31.

The first relay connector 160 and second relay connector 164 are mounted on a flexible wiring board 170 with reinforcement plates 168 and 169 interposed. A first stacking connector 172 is mounted on a middle portion of the wiring board 170 with use of a reinforcement plate 171. The wiring board 170 has an extension part 173 continuous with the mounting portion of the first relay connector 160. A second stacking connector 175 is mounted on a distal end portion of the extension part 173 with use of a reinforcement plate 174. Thus, the first relay connector 160, second relay connector 174, first stacking connector 172 and second stacking connector 175 are integrated by the wiring board 170.

The wiring board 170 is disposed on the upper surface of the bottom wall 33 of the pack storage section 31. The bottom wall 33 has an opening portion 177 facing the stacking connector 172. The stacking connector 172 is connected to the first circuit board 60 via the opening portion 177.

As is shown in FIGS. 17 and 22, a first connector holder 180 of a synthetic resin is attached to the reinforcement plate 168 of first relay connector 160. The first connector holder 180, along with the reinforcement plate 168, is tightly fitted in the connector attachment portion 161 from the above region of the frame 30. Thereby, the first relay connector 160 is held on the terminal end portion of the first section 38.

Figures 30A, 30B:
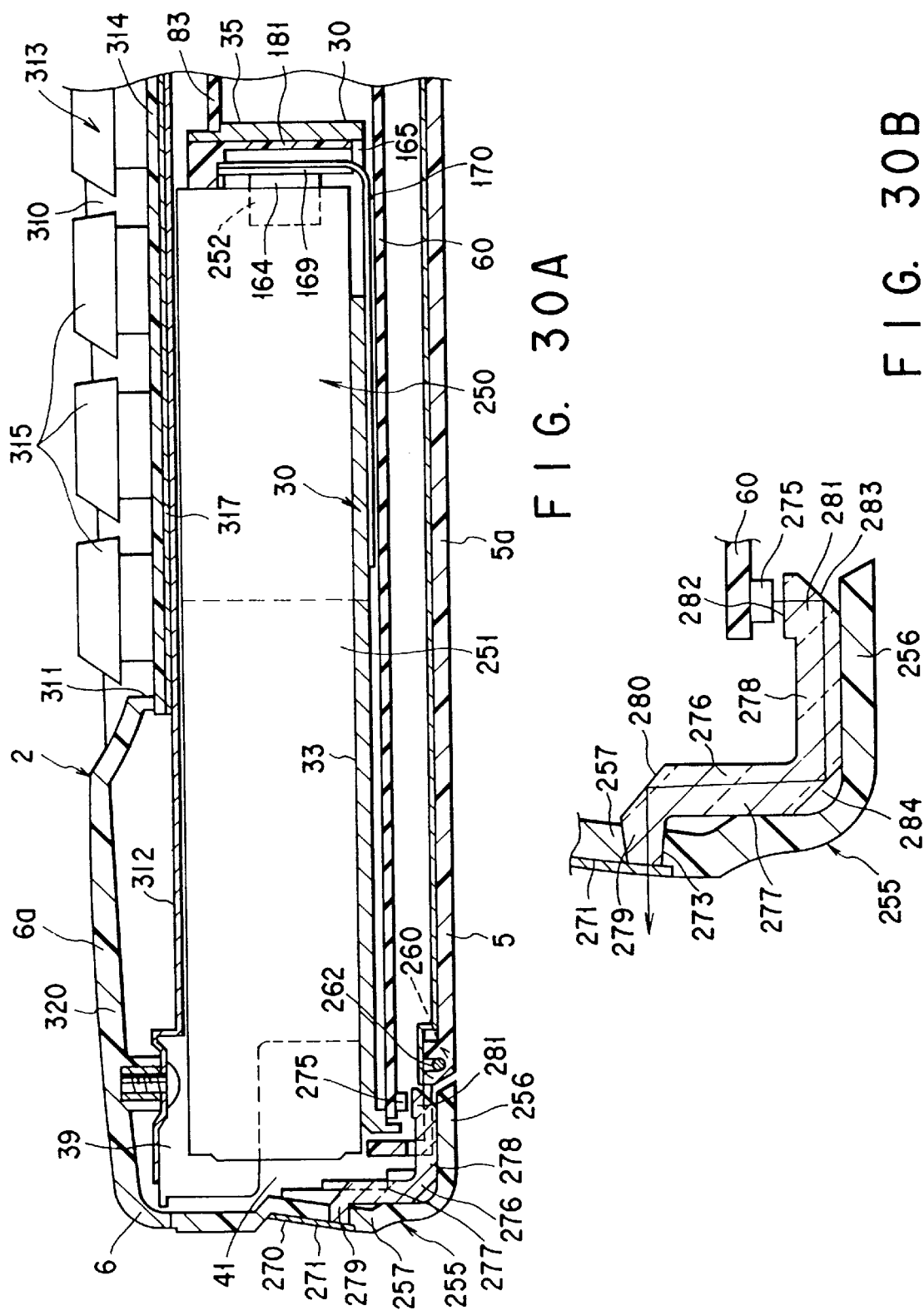
FIG. 30A is a cross-sectional view of a front half portion of the portable computer.
FIG. 30B is an enlarged cross-sectional view of an attachment portion for a first icon.

As is shown in FIGS. 22 and 30A, the second relay connector 164 is mounted in the connector attachment portion 165 with use of a second connector holder 181 of a synthetic resin. Specifically, the second connector holder 181 is superposed on the reinforcement plate 169 and, in this state, tightly fitted into the connector attachment portion 165 from the above region of the frame 30. Thereby, the second relay connector 164 is held on the terminal end portion of the second section 39.

The extension part 173 of the wiring board 170 is led to the upper region of the board support portion 32 from the terminal end portion of the first section 38, and the second stacking connector 175 is connected to the second circuit board 81.

According to the above structure, the first and second relay connectors 160 and 164 are held in the pack storage section 31 of frame 30 by the tight-fitting method. There is no need to perform time-consuming works such as fixing the relay connectors 160 and 164 on the first circuit board 60 by means of screws or soldering. The assembling work of the computer 1 is improved.

As is shown in FIG. 23, one of a CD-ROM drive 190 and a floppy disk drive (FDD) 191 is detachably mounted, as a pack-type device, in the first section 38 of pack storage section 31 in a selective manner. The CD-ROM drive 190 and FDD 191 are constructed as module packs having individual functions and have the same size.

Figure 24:
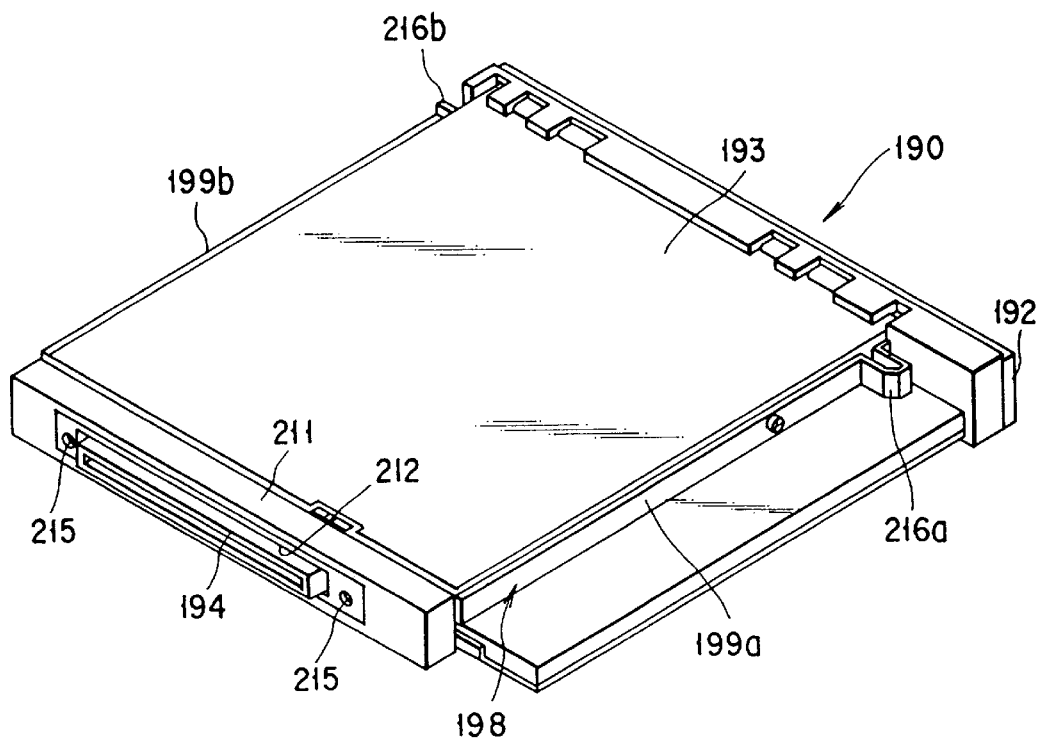
FIG. 24 is a perspective view of the CD-ROM drive.
Figure 25:
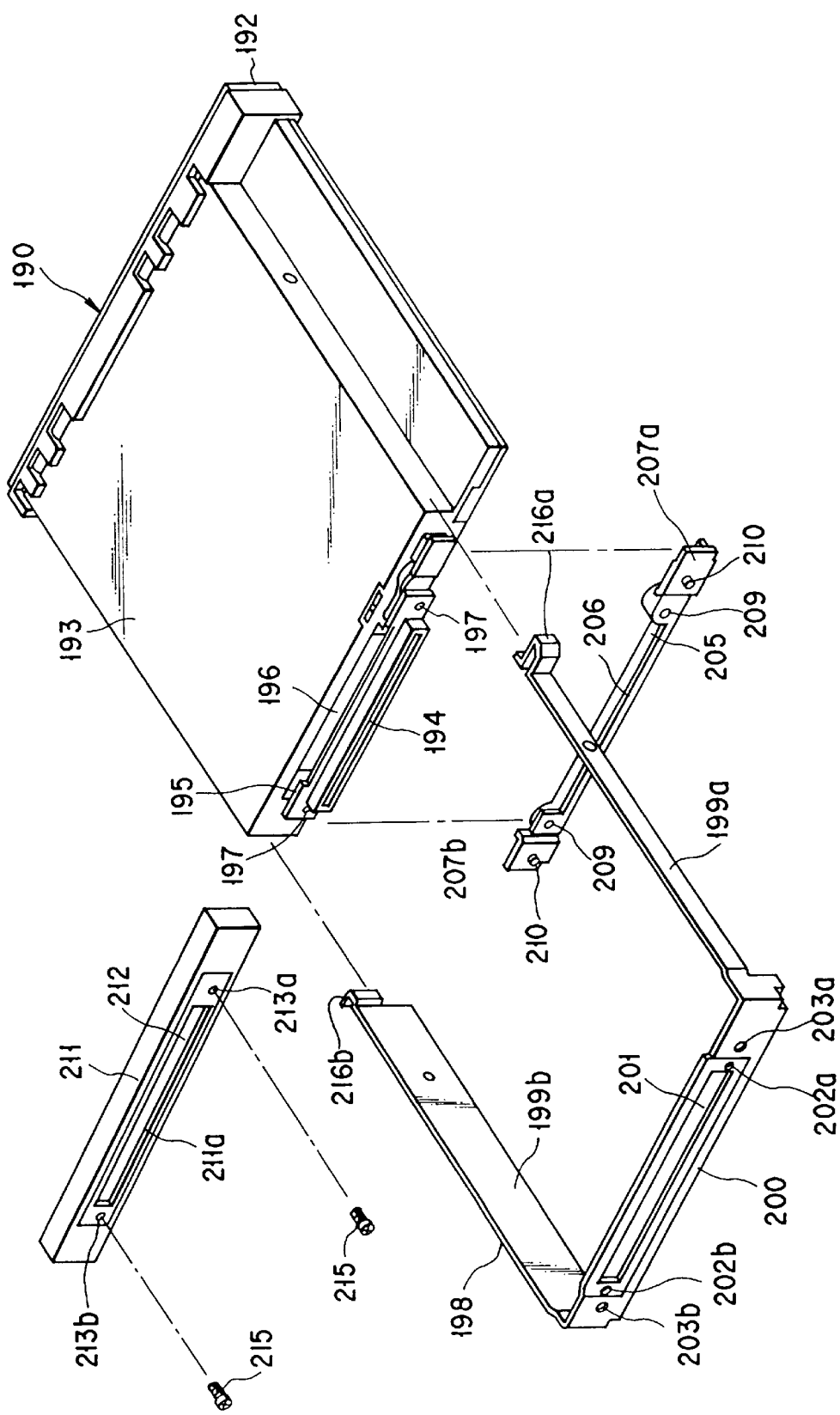
FIG. 25 is a perspective view showing in an exploded manner the state in which a connector hold frame, a connector holder and an outer cover are removed from a cabinet of the CD-ROM drive.

The CD-ROM drive 190, as shown in FIGS. 24 and 25, comprises a tray 192 for receiving an optical disk, and a metallic cabinet 193 for holding the tray 192 such that the tray 192 can be pulled out. The cabinet 193 has a flat box-like shape. An interface connector 194 is disposed on an end portion of the cabinet 193, which is located opposite to the tray 192. The interface connector 194 is mounted on one end portion of a flexible wiring board 196 with a reinforcement plate 195 interposed. The other end portion of the wiring board 196 is detachably connected to a control circuit unit provided inside the cabinet 193 via a connector (not shown). The reinforcement plate 195 has first and second end portions projecting outward of the interface connector 194. The end portions of the reinforcement plate 195 have through-holes 197 respectively.

A connector hold frame 198 formed of a metallic plate is attached to the cabinet 193. The connector hold frame 198 integrally comprises a pair of support stays 199a and 199b attached by screws on the side faces of the cabinet 193, and a hold plate 200 for coupling the support stays 199a and 199b to each other. The hold plate 200 includes an opening portion 201, through which the interface connector 194 is passed, a pair of through-holes 202a and 202b communicating with the through-holes 197a and 197b in the reinforcement plate 196, and a pair of engaging holes 203a and 203b located outside of the through-holes 202a and 202b. The hold plate 200 is superposed on the reinforcement plate 195.

Figures 26, 28:
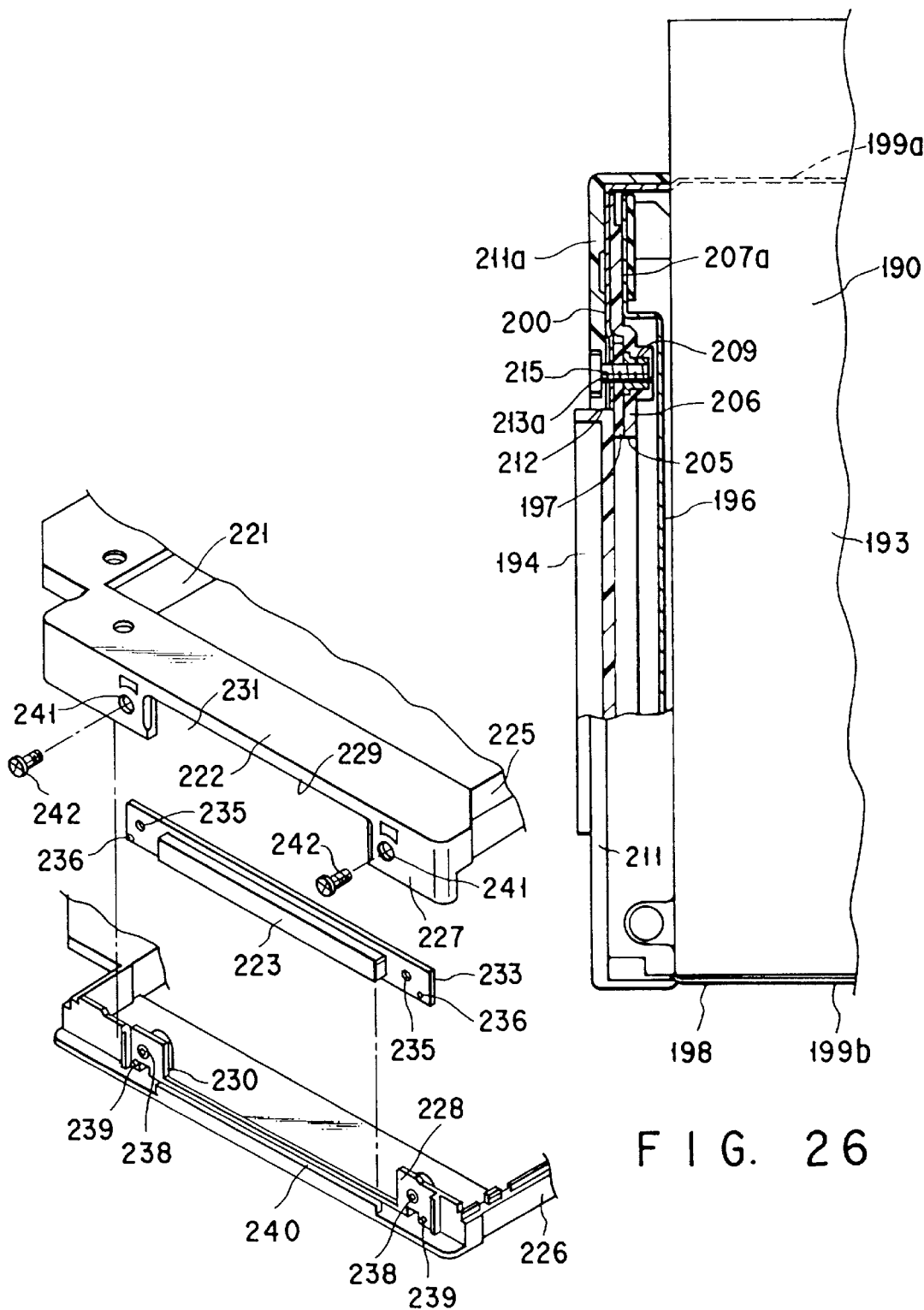
FIG. 26 is a plan view of the CD-ROM drive, showing an attachment portion for an interface connector in cross section.
FIG. 28 is a perspective view of the floppy disk drive, showing the attachment portion for the interface connector in an exploded manner.

Referring to FIGS. 25 and 26, a connector holder 205 of a synthetic resin is interposed between the reinforcement plate 195 and cabinet 193. The connector holder 205 integrally comprises a flat support face 206 overlapping the reinforcement plate 195, and a pair of flat seat portions 207a and 207b continuous with the support face 206. A pair of nuts 209 are buried in the support face 206. The nuts 209 face the through-holes 197 in the reinforcement plate 196. The seat portions 207a and 207b have engaging projections 210 respectively. The engaging projections 210 are engaged in the associated engaging holes 203a and 203b in the hold plate 200, thereby positioning the connector holder 205 and hold plate 200.

The hold plate 200 and connector holder 205 are covered by an outer cover 211 of a synthetic resin. The outer cover 211 has a panel portion 211a overlapping the hold plate 200. The panel portion 211a has a connector lead-out port 212 for leading out the interface connector 194, and a pair of screw holes 213a and 213b communicating with the through-holes 202a and 202b in the hold plate 200. Screws 215 are inserted into the screw holes 213a and 213b. The screws 215 are driven into the nuts 209 through the through-holes 202a and 202b and the through-holes 197. Thereby, the connector holder 205 and reinforcement plate 195 are clamped between the hold plate 200 of the connector hold frame 198 and the cabinet 193 and the interface connector 194 is irremovably held on the cabinet 193.

As is shown in FIGS. 24 and 25, the support stays 199a and 199b of connector hold frame 198 have engaging portions 216a and 216b. The engaging portions 216a and 216b protrude laterally from side surfaces of the cabinet 193 at a draw-out-side end portion of the tray 192 of cabinet 193.

The CD-ROM drive 190 is inserted into the first section 38 through the front-end insertion hole 40 of the lower housing 5. While the CD-ROM drive 190 is being inserted into the first section 38, the outer cover 211 and cabinet 193 are guided by the inner faces of the first section 38, thus aligning the interface connector 194 and first relay connector 160. In the state in which the interface connector 194 is connected to the first relay connector 160, the front face of the tray 192 is located at the opening portion of the insertion hole 40 so as to be continuous with battery cover 27.

Figure 27:
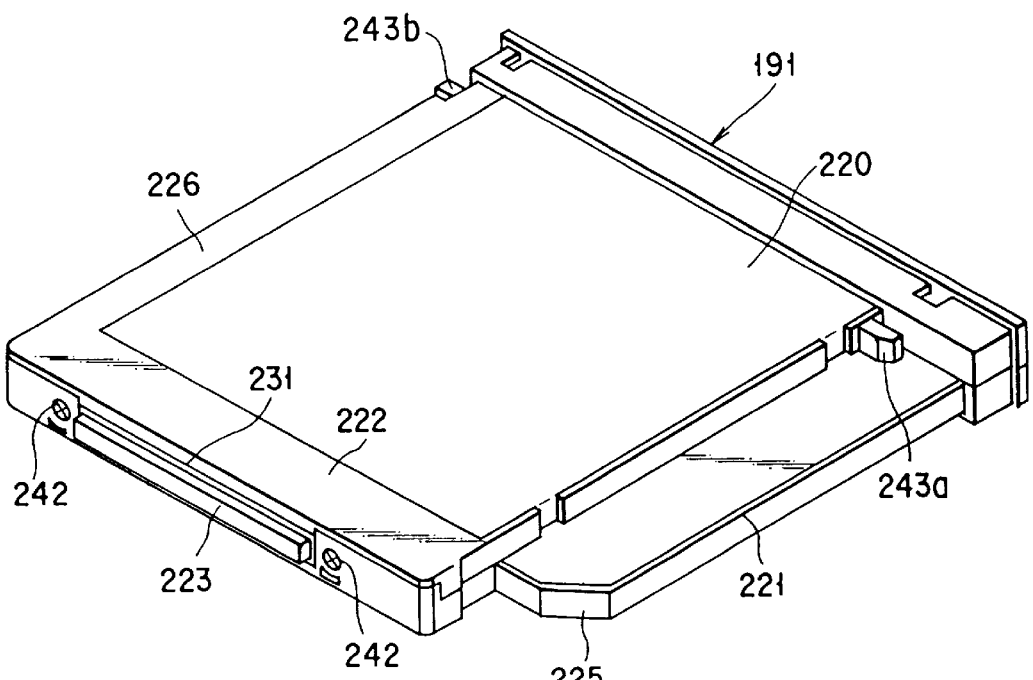
FIG. 27 is a perspective view of the floppy disk drive.

The FDD 191, as shown in FIGS. 23 and 27, comprises a flat box-shaped floppy disk drive (FDD) body 220 having a floppy disk insertion hole 219, and an outer cover 221 of a synthetic resin covering the FDD body 220. The outer cover 221 has substantially the same shape and size as the cabinet 193 of the CD-ROM drive 190. The outer cover 221 has a connector attachment portion 222 at an end portion thereof opposed to the floppy disk insertion hole 219. An interface connector 223 is disposed on the connector attachment portion 222.

As is shown in FIG. 28, the outer cover 221 comprises an upper cover 225 and a lower cover 226. The connector attachment portion 222 has an outer wall 227 extending downward from the upper cover 225 and an inner wall 228 extending upward from the lower cover 226. The outer wall 227 and inner wall 228 face each other at a predetermined distance therebetween, as shown in FIGS. 29A and 29B. The outer wall 227 and inner wall 228 have elongated notches 229 and 230 facing each other. The notches 229 and 230 define a connector lead-out port 231 in an end face of the connector attachment portion 222.

As is shown in FIGS. 28 and 29B, the interface connector 223 is mounted on an elongated circuit board 233. The circuit board 233 is connected to the internal control circuit section in the FDD body 220 via a flexible wiring board 234. The circuit board 233 has first and second end portions projecting outward of the interface connector 223. The end portions of the circuit board 233 have through-holes 235 and engaging holes 236 respectively.

The first and second end portions of the circuit board 233 are clamped between the outer wall 227 and inner wall 228. Portions of the inner wall 228, which face the first and second end portions, have nuts 238 and engaging projections 239 respectively. The nuts 238 are buried in the inner wall 228 and face the through-holes 235 in the circuit board 233. The engaging projections 239 are located near the nuts 238. The engaging projections 239 are fitted in the engaging holes 236 in the circuit board 233, and thereby the circuit board 233 and lower cover 226 are positioned. An engaging groove 240 opening to the connector lead-out port 231 is formed in the lower cover 226, and a lower edge portion of the circuit board 233 is fitted in the engaging groove 240.

As is shown in FIG. 28, a pair of screw holes 241 are formed in the outer wall 227 of the upper cover 225. The screw holes 241 communicate with the through-holes 235 in the circuit board 233. Screws 242 are passed through the screw holes 241. The screws 242 are driven into the nuts 238 through the through-holes 235 in the circuit board 233, as shown in FIG. 29B. Thereby, the circuit board 233 are clamped between the outer wall 227 and inner wall 228 and the interface connector 223 is irremovably held on the connector attachment portion 222.

The lower cover 226 has a pair of engaging portions 243a and 243b, as shown in FIG. 27. The engaging portions 243a and 243b protrude laterally from side surfaces of the FDD body 220 at the floppy disk insertion hole (219) side end portion of the body 220.

The floppy disk drive (FDD) 191 is inserted into the first section 38 through the front-end insertion hole 40 of the lower housing 5. While the FDD 191 is being inserted into the first section 38, the outer cover 221 is guided by the inner faces of the first section 38, thus aligning the interface connector 223 and first relay connector 160. In the state in which the interface connector 223 is connected to the first relay connector 160, the floppy disk insertion hole 219 is located at the opening portion of the insertion hole 40.

As is shown in FIGS. 4 and 30A, a hard disk drive (HDD) 250 is removably mounted in the second section 39 of the pack storage section 31. The HDD 250 has a flat housing 251 containing a magnetic head, a disk-shaped magnetic recording medium, etc., though these are not shown. An HDD connector 252 is disposed at one end portion of the housing 251. The HDD 250 is inserted into the second section 39 from the insertion hole 41 in the front end portion of the lower housing 5. Thereby, the HDD connector 252 is connected to the second relay connector 164.

As is shown in FIGS. 3 and 30A, a front cover 255 of a synthetic resin is attached to the front end portion of the lower housing 5. The front cover 255 comprises a bottom wall portion 256, a front wall portion 257 continuous with the bottom wall portion 256, and a side wall portion 258 continuous with the bottom wall portion 256 and front wall portion 257. The bottom wall portion 256 and front wall portion 257 extend in the width direction of the lower housing 5. The side wall portion 258 is located at the right-hand end portions of the bottom wall portion 256 and front wall portion 257.

As is shown in FIGS. 2 and 10, the bottom wall portion 256 of front cover 255 has three boss portions 260. The boss portions 260 project from an edge of the bottom wall portion 256 and are arranged at intervals in the width direction of the lower housing 5. Three recess portions 261 are formed in a front end portion of the bottom wall 5a of the lower housing 5. The recess portions 261 are arranged at intervals in the width direction of the lower housing 5. The boss portions 260 are put in the recess portions 261. The boss portions 260 are rotatably coupled to the recess portions 261 by means of pins 262 extending in the width direction of the lower housing 5.

Thus, the front cover 255 is supported on the lower housing 5 rotatably between a first position where the front wall portion 257 thereof faces the insertion holes 40 and 41 of the pack storage section 31 and a second position where the front wall portion 257 is turned down in front of the insertion holes 40 and 41. When the front cover 255 is rotated to the first position, the bottom wall portion 256 is continuous with the bottom wall 5a of lower housing 5 and the side wall portion 258 is continuous with the right-hand side wall 5c of lower housing 5.

As is shown in FIG. 3, the front wall portion 257 of the front cover 255 has a rectangular notched opening portion 263. The opening portion 263 extends in the width direction of lower housing 5. The opening portion 263 has a size corresponding to the front face of each of the CD-ROM drive 190 and FDD 191. Even in the state in which the front cover 255 is rotated to the first position, the tray 192 of the CD-ROM drive 190 or the floppy disk insertion hole 219 of the FDD 191 is exposed to the front of the housing body 2 through the opening portion 263.

As is shown in FIG. 10, gaps S extending in the width direction of the lower housing 5 are defined between the boss portions 260 of front cover 255 and the recess portions 261 of lower housing 5. By virtue of the gaps S, when the front cover 255 is rotated to the first position, the front cover 255 is supported on the lower housing 5 slidably between a locked position where the side wall portion 258 is continuous with the right-hand side wall 5c of lower housing 5 and an unlocked position where the side wall portion 258 is displaced to the right side from the side wall 5c.

As is shown in FIGS. 9, 10 and 23, a first engaging projection 265a and a second engaging projection 265b are formed on the inner surface of the front wall portion 257 of front cover 255. The first and second engaging projections 265a and 265b are spaced apart in the width direction of the lower housing 5 in a position adjacent to the opening edge of the opening portion 263. In addition, a third engaging projection 265c is formed on an edge portion of the side wall portion 258.

Figure 34A:
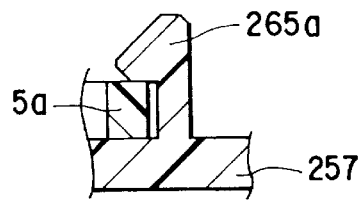
FIG. 34A is a cross-sectional view showing the state in which a first engaging projection is hooked on the lower housing.
Figure 34B:
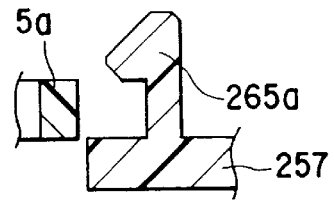
FIG. 34B is a cross-sectional view showing the state in which the first engaging projection is unhooked from the lower housing.
Figure 35A:
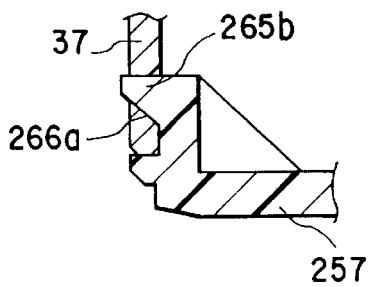
FIG. 35A is a cross-sectional view showing the state in which a second engaging projection is hooked in an engaging hole in the frame.
Figure 35B:
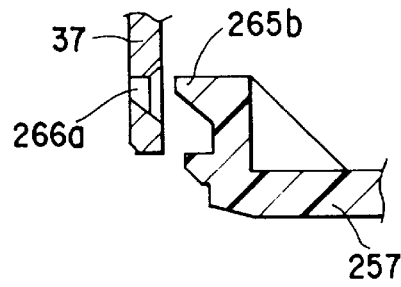
FIG. 35B is a cross-sectional view showing the state in which the second engaging projection is unhooked from the engaging hole in the frame.
Figure 36A:
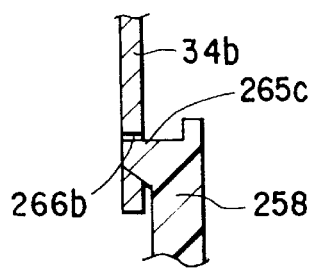
FIG. 36A is a cross-sectional view showing the state in which a third engaging projection is hooked in an engaging hole in the frame.
Figure 36B:
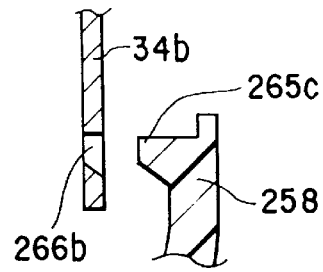
FIG. 36B is a cross-sectional view showing the state in which the third engaging projection is unhooked from the engaging hole in the frame.

When the front cover 255 is slid to the locked position, the first engaging projection 265a is disengageably engaged with the front end portion of the bottom wall 5a, as shown in FIG. 34A. When the front cover 255 is slid to the locked position, the second and third engaging projections 265b and 265c advance to the front end portion of the partition wall 37 of pack storage section 31 and the front end portion of the right-hand side wall 34b, as shown in FIGS. 35A and 36A. The front end portions of the partition wall 37 and side wall 34b have engaging holes 266a and 266b in which the second and third engaging projections 265b and 265c are disengageably engaged.

As is clear from FIG. 33A, if the front cover 255 is rotated to the first position and then slid to the locked position, the first to third engaging projections 265a to 265c engage the front edge portion of the bottom wall 5a and engaging holes 266a and 266b. Thus, the front cover 255 is held in the first position. When the front cover 255 is held in the first position, the HDD 250 stored in the second section 39 is covered by the front wall portion 257 of front cover 255.

As is shown in FIGS. 1 and 4, a first icon 270 is provided on the front wall portion 257 of front cover 255. The first icon 270 has a light-transmissive icon board 271. The icon board 271 has a rectangular shape, extending in the width direction of the lower housing 5. The icon board 271 is attached to the front face of the front wall portion 257 of front cover 255. Four display marks 272 relating to the power supply of computer 1 are arranged linearly on the icon board 271.

As is shown in FIGS. 30A and 30B, the front wall portion 257 of front cover 255 has four holes 273 (only one shown) facing the display marks 272. These holes 273 are located near the front edge portion of the first circuit board 60. Four light emitting diodes (LEDs) 275 (only one shown) functioning as light source of the first icon 270 are mounted on the lower surface of the front edge portion of the first circuit board 60. When the front cover 255 is held in the first position, the LEDs 275 face the bottom wall portion 256 of front cover 255. The LEDs 275 radiate light downward of the first circuit board 60.

As is shown in FIGS. 3, 30B and 32, four optical waveguides 276 are attached to the inner surface of the front cover 255. The optical waveguides 276 guide light from the LEDs 275 to the display marks 272 and are formed of transparent synthetic resin material. Each of the optical waveguides 276 comprises a first waveguide portion 277 extending in the height direction of lower housing 5 along the front wall portion 257 of front cover 255, and a second waveguide portion 278 extending in the depth direction of lower housing 5 along the bottom wall portion 256 of front cover 255. The first and second waveguide portions 277 and 278 are formed as one piece.

A forwardly bent lens portion 279 is formed at an upper end portion of the first waveguide portion 277. A distal end portion of the lens portion 279 enters the hole 273 and comes into contact with the rear face of the icon board 271. As is clear from FIG. 30B, a corner portion defined by the first waveguide portion 277 and lens portion 279 has a first light guide face 280 which is downwardly inclined as it extends rearward.

A rear end portion of the second waveguide portion 278 is located below the first circuit board 60. A light receiving portion 281 is formed on the rear end portion of second waveguide portion 278. The light receiving portion 281 has a flat light receiving surface 282 opposed to the LED 275, and a second light guide face 283 opposed to the light receiving surface 282. The second light guide face 283 is forwardly inclined as it extends away from the light receiving surface 282. Accordingly, when light is made incident on the light receiving surface 282 from the LED 275, the light is reflected by the second light guide face 283 and then guided through the second waveguide portion 277.

A third light guide face 284 is formed on a corner portion defined by the first and second waveguide portions 277 and 278. The third light guide face 284 is downwardly inclined as it extends rearwards. The third light guide face 284 is located in front of the second light guide face 283. The third light guide face 284 reflects the light, which has been guided from the second light guide face 283, upward to the first light guide face 280. Thus, as is indicated by the arrow in FIG. 30B, light radiated downward from the LED 275 is made incident on the light receiving surface 282 of optical waveguide 276 and it is reflected successively by the second light guide face 283, third light guide face 284, and first light guide face 280. The light reflected by the first light guide face 280 reaches the lens portion 279. Accordingly, the display mark 272 associated with the LED 275 which is emitting light is lighted up to effect display relating to the power supply.

Figure 31:
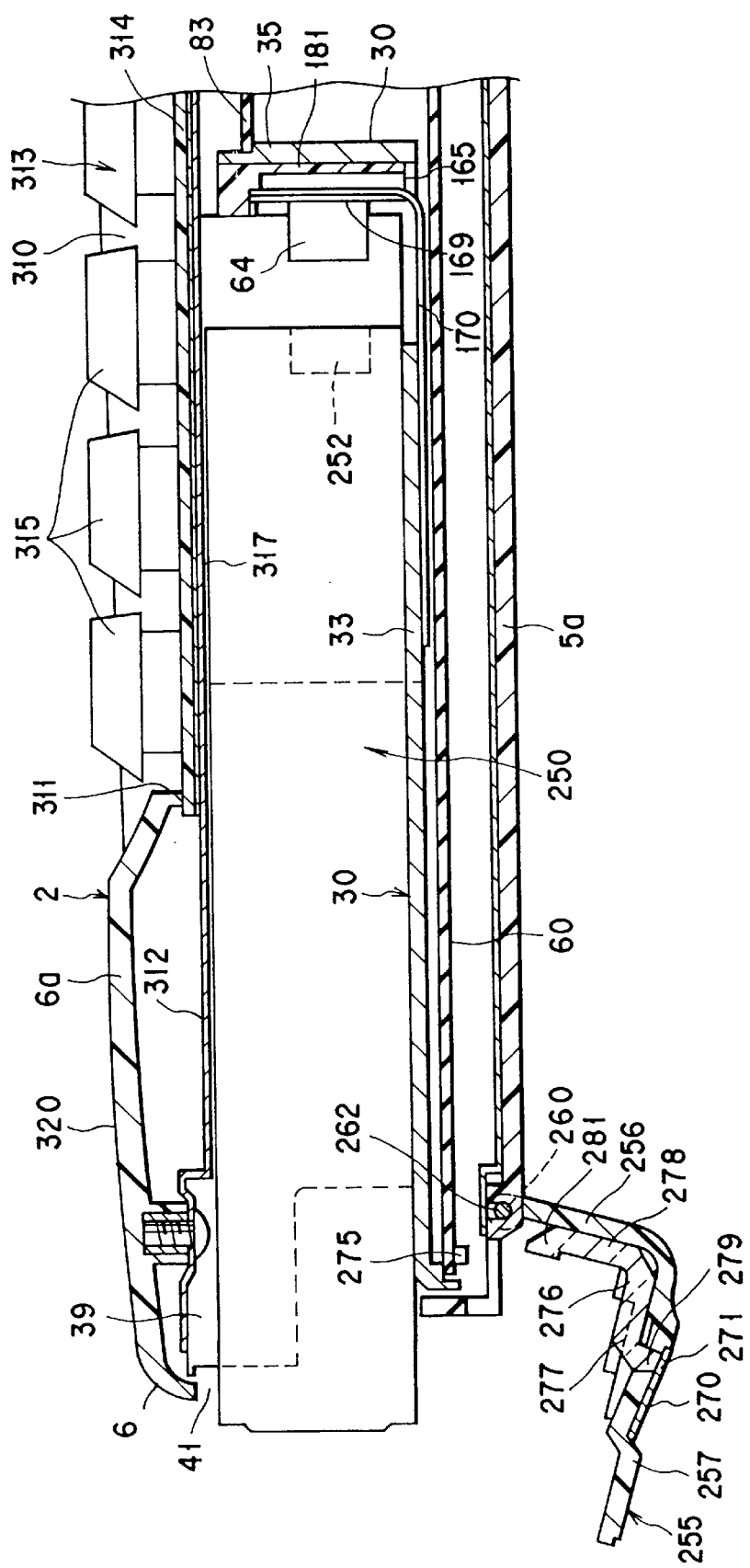
FIG. 31 is a cross-sectional view showing the state in which the front cover is rotated to the second position and a hard disk drive is drawn out.

As is shown in FIGS. 23 and 31, when the front cover 255 is rotated to the second position, the optical waveguide 276 is rotated forwardly along with the front cover 255 and is exposed to the front side of the lower housing 5. At this time, the light receiving portion 281 of optical waveguide 276 moves downward away from the LED 275.

The first section 38 has a stopper 290, as shown in FIGS. 10, 23 and 39, which is engaged with the CD-ROM drive 190 or floppy disk drive (FDD) 191. As is clear from FIGS. 37 and 41, the stopper 290 is disposed on a front end portion of the bottom wall 5a of lower housing 5. When the CD-ROM drive 190 or FDD 191 is mounted in the first section 38, the stopper 290 is located immediately in front of the engaging portion 216a or 243a thereof.

As is shown in FIGS. 38A to 38C, the stopper 290 is supported on the bottom wall 5a so as to be vertically movable between a locked position where the stopper 290 projects into the first section 38 and engages the front face of the engaging portion 216a or 243a, and an unlocked position where the stopper is pulled down from the first section 38 and disengaged from the front face of the engaging portion 216a or 243a. The stopper 290 is always urged by a spring 291 toward the unlocked position.

Figure 37:
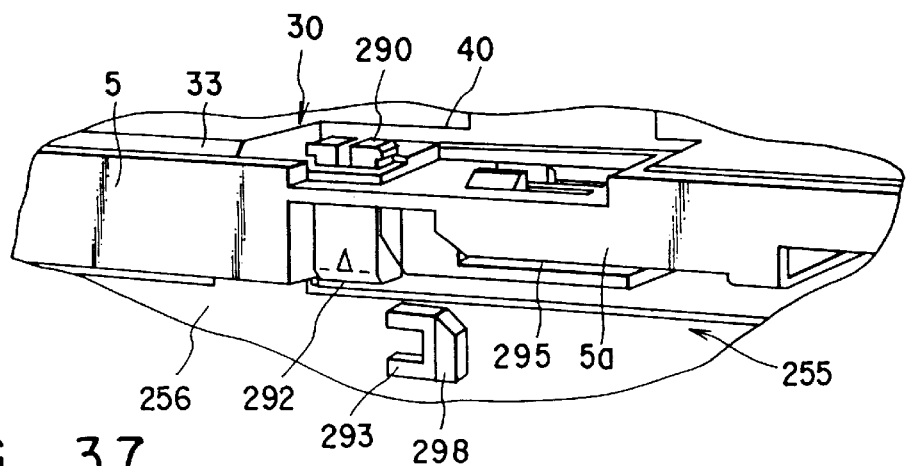
FIG. 37 is a perspective view showing the relationship between a pushing projection of the front cover and a stopper.

As is shown in FIG. 37, the stopper 290 has a pressing surface 292 exposed downward of the bottom wall 5a of lower housing 5. When the front cover 255 is rotated to the first position, the pressing surface 292 is opposed to the bottom wall portion 256 of front cover 255. The bottom wall portion 256 has a pressing projection 293. When the front cover 255 is rotated from the second position to the first position, the pressing projection 293 contacts the pressing surface 292 of stopper 290 and pushes up the stopper 290 from the unlocked position to the locked position. Accordingly, in the state in which the front cover 255 is held in the first position, the stopper 290 engages the engaging portion 216a of CD-ROM drive 190 or the engaging portion 243a of FDD 191, thereby locking the CD-ROM drive 190 or FDD 191 in the first section 38.

As is shown in FIGS. 37 and 38A to 38C, a slider 295 for pushing the front cover 255 to the locked position is attached to the front end portion of the bottom wall 5a of lower housing 5. The slider 295 is supported on the bottom wall 5a slidably between a first position where the slider 295 adjoins the stopper 290 on the right side of the stopper 290, and a second position where the slider 295 is located away from the stopper 290. The slider 295 is always urged to the first position by a return spring 296, and a distal end portion thereof is always adjoins or contacts the side face of the stopper 290.

The slider 295 has an inclined surface 297 at a lower portion of its distal end portion facing the stopper 290. The inclined surface 297 is gradually inclined upward as it extends towards the stopper 290. When the front cover 255 is rotated to the first position, the inclined surface 297 contacts a corner portion of the pressing projection 293. The corner portion of pressing projection 293 has a beveled surface 298. The beveled surface 298 is inclined in the same direction as the inclined surface 297 of slider 295. The beveled surface 298 slidably contacts the inclined surface 297.

When the front cover 255 is rotated from the second position to the first position, as shown in FIG. 38B, the beveled surface 298 of pressing projection 293 is put in contact with the inclined surface 297 of the slider 295. Thereby, the slider 295 is slid from the first position to the second position against the urging force of the return spring 296. When the front cover 255 has reached the first position, the first to third engaging projections 265a to 265c face the front end portion of the bottom wall 5a and engaging holes 266a and 266b, and the beveled surface 298 of pressing projection 293 passes over the inclined surface 297 of slider 295. Since the slider 295 is urged toward the first position by the return spring 296, the urging force is transmitted to the front cover 255 via the pressing projection 293, and the front cover 255 is forcibly slid from the unlocked position to the locked position. As a result, as shown in FIGS. 34A, 35A and 36A, the first engaging projection 265a engages the front end portion of the bottom wall 5a, and the second and third engaging projections 265b and 265c engage the engaging holes 266a and 266b in the frame 30. Thus, the front cover 255 is held in the first position.

As is shown in FIG. 23, an ejector 300 is disposed in the insertion hole 40 of the first section 38. The ejector 300 is used to discharge the CD-ROM drive 190 or FDD 191 from the first section 38. The ejector 300 has a slider 301 and an operation lever 302, as shown in FIGS. 39 to 41. The slider 301 has a flat plate shape, extending in the width direction of the first section 38. The slider 301 is supported on the bottom wall 33 of frame 30 by means of a pair of pins 303 and is slidable in the depth direction of the first section 38. The slider 301 has a pair of upwardly extending pushing portions 304a and 304b. When the CD-ROM drive 190 or FDD 191 is inserted into the first section 38, the pushing portions 304a and 304b face the rear faces of the engaging portions 216a and 216b of CD-ROM drive 190 or the engaging portions 243a and 243b of FDD 191.

The operation lever 302 is supported on the upper surface of the slider 301 by means of a pair of pins 305 and is slidable in the depth direction of the first section 38. A front end portion of the operation lever 302 projects forward of the slider 301. The front end portion of the operation lever 302 is provided with a downwardly bent finder hook portion 306. The finger hook portion 306 is located at the opening end of the insertion hole 40. In the state in which the front cover 255 is held in the first position, the front side of the finger hook portion 306 is covered by the front wall portion 257 of front cover 255.

Accordingly, if the front cover 255 is rotated to the second position, as shown in FIG. 40, the finger hook portion 306 of ejector 300 is exposed to the insertion hole 40 of first section 38. If the finger hook portion 306 is hooked by the finger and the operation lever 302 is pulled out, the slider 301 is drawn out accordingly. The pushing portions 304a and 304b of slider 301 push the engaging portions 216a and 216b of CD-ROM drive 190 or the engaging portions 243a and 243b of FDD 191 towards the insertion hole 40. Thereby, the CD-ROM drive 190 or FDD 191 is pushed out of the insertion hole 40, and the first relay connector 160 is disconnected from the interface connector 194 or 223.

Figure 47:
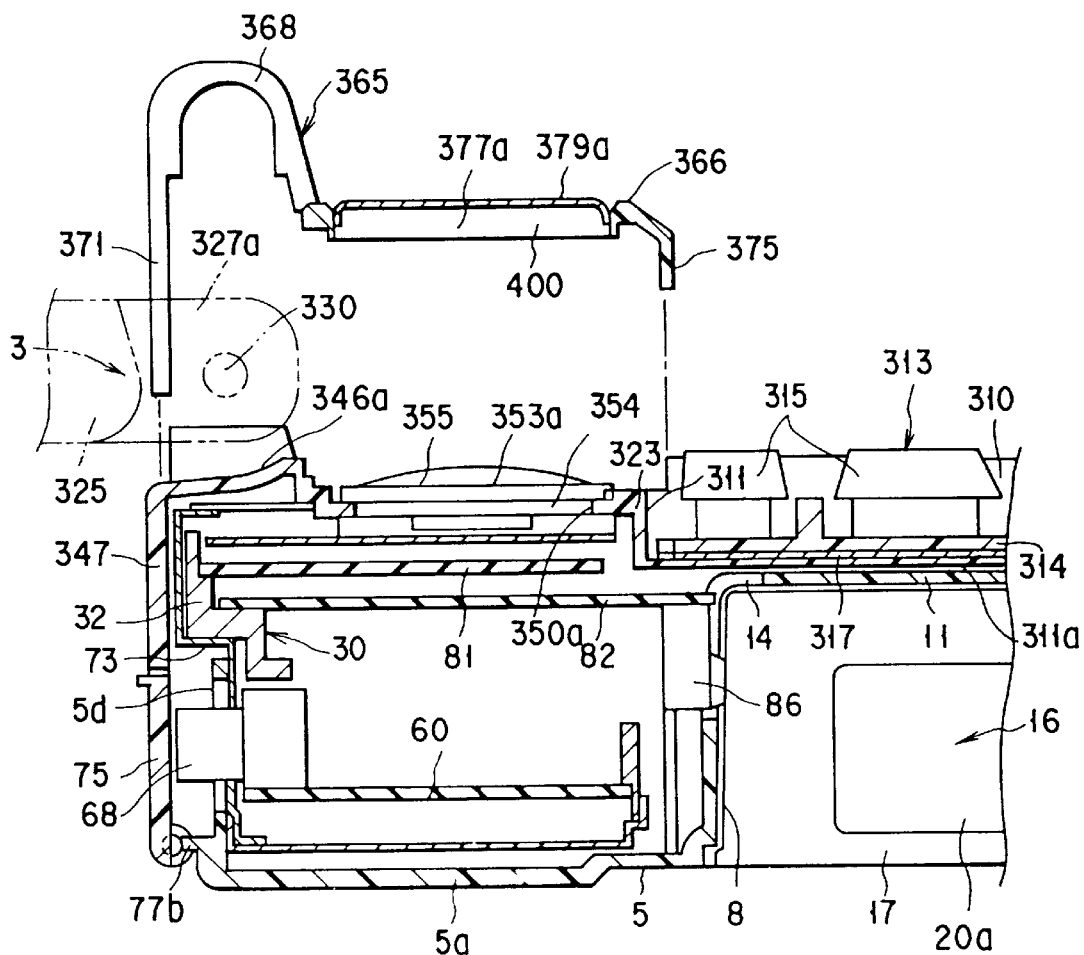
FIG. 47 is a cross-sectional view of the portable computer, showing the state in which the top cover is removed from the component attachment portion of the upper housing.

As is shown in FIGS. 30A and 44, the upper housing 6 of housing body 2 covers the upper side of the frame 30. A keyboard support section 310 is formed in a central region of the upper wall 6a of upper housing 6. The keyboard support section 310 comprises a rectangular recess extending over substantially the entire central region of the upper wall 6a. The keyboard support section 310, as shown in FIGS. 30A and 47, has a peripheral wall 311 extending downward from the upper wall 6a and a bottom wall 311a continuous with the lower end of the peripheral wall 311.

The bottom wall 311a is formed at corner portions of the keyboard support section 310. Most part of the keyboard support section 310 is open to the inside of the lower housing 5. A metallic shield plate 312 is attached to the inner surface of the upper wall 6a of upper housing 6, as shown in FIG. 30A. The shield plate 312 covers the bottom side of the keyboard support section 310.

A keyboard 313 serving as information input means is removably attached to the keyboard support section 310. The keyboard 313 comprises a support panel 314 of a synthetic resin, a number of keys 315, and a joystick 316 or a kind of pointing device. The support panel 314 has a rectangular plate shape with such a size as to be fittable in the keyboard support section 310. The keys 315 and joystick 316 are disposed on the upper surface of the support panel 314. The lower surface of the support panel 314 is covered by a metallic reinforcement plate 317.

The support panel 314 of keyboard 313 has a front edge portion and a rear edge portion both extending in the width direction of the housing body 2. The front edge portion and rear edge portion of support panel 314 are detachably hooked on the peripheral wall 311 of keyboard support section 310. Thus, the keyboard 313 is supported on the keyboard support section 310. In the state in which the keyboard 313 is attached to the keyboard support section 310, the reinforcement plate 317 is in contact with the shield plate 312. The contact between the reinforcement plate 317 and shield plate 312 prevents switching noise due to key operations from entering the inside of the housing body 2.

A front half portion of the upper wall 6a of upper housing 6 constitutes an armrest 320. Click switch buttons 321a and 321b for executing and canceling commands are disposed on a central portion of the armrest 320.

As is shown in FIGS. 44 to 46, a component attachment portion 323 is formed integral with the rear part of the upper housing 6 continuous with the keyboard support section 310. The component attachment portion 323 has a plate shape, extending in the width direction of upper housing 6. The width of the component attachment portion 323 is substantially equal to that of the upper housing 6. The component attachment portion 323 is situated above the board support portion 32 of frame 30. The first circuit board 81 and fourth circuit board 83 are located just below the component attachment portion 323. As is shown in FIGS. 17 and 44, a notch 323a formed at a rear end portion of the component attachment portion 323. The notch 323a is provided to avoid the motor fan 102. The motor fan 102 projects from the notch 323a.

Referring to FIGS. 42, 43A and 43B, the display unit 3 is supported by the upper housing 6. The display unit 3 comprises a display housing 325 of a flat box shape, and a color liquid crystal display (LCD) 326 contained in the display housing 325. The display housing 325 includes first and second leg portions 327a and 327b functioning as support portions. The leg portions 327a and 327b, as shown in FIGS. 45 and 46, are supported on the component attachment portion 323 by means of first and second hinge metal fixings 328 and 329. The first and second hinge metal fixings 328 and 329 are spaced apart in the width direction of the component attachment portion 323. The first hinge metal fixing 328, as shown in FIGS. 42 and 43A, comprises a hinge shaft 330, a first bracket 331 fixed to a first end portion of the hinge shaft 330, and a second bracket 332 rotatably coupled to a second end portion of the hinge shaft 330. The first end portion of the hinge shaft 330 penetrates a left-hand side face of the first leg portion 327a and enters the inside of the leg portion 327a. The first bracket 331 provided at the first end portion of the hinge shaft 330 is screwed down on the inner surface of leg portion 327a. The second bracket 332 provided at the second end portion of hinge shaft 330 is located at the left-hand end portion of the component attachment portion 323.

The second bracket 332 has a support stay 333 as integral portion. The support stay 333 extends below the component attachment portion 323 in the depth direction of the component attachment portion 323. The component attachment portion 323 has a pair of downwardly projecting boss portions 334a and 334b. The boss portions 334a and 334b face the support stay 333. The support stay 333 is fixed by means of screws 335 to the boss portions 334a and 334b. Thus, the left-hand end portion of the component attachment portion 323 is reinforced by the support stay 333.

Figure 48:
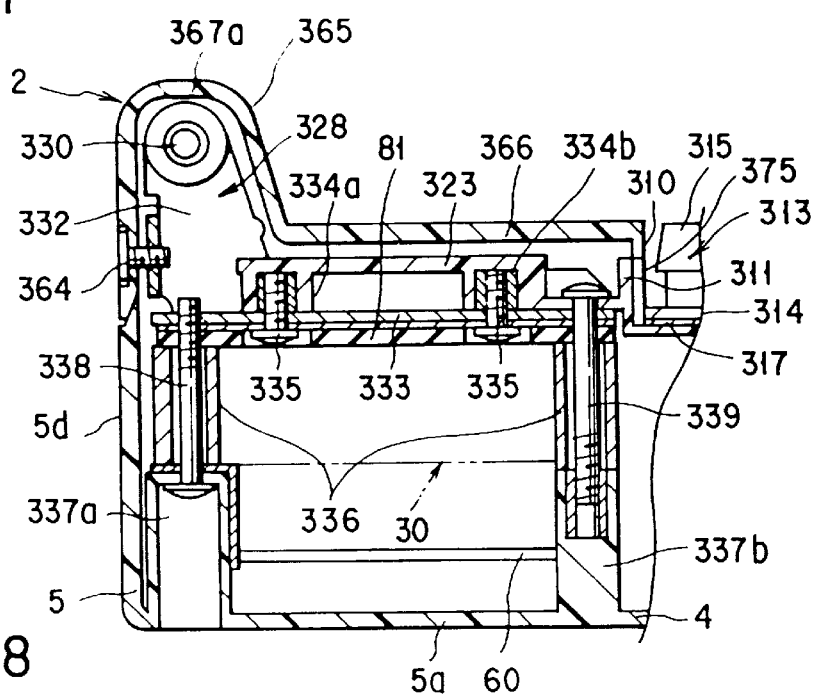
FIG. 48 is a cross-sectional view of a region corresponding to the component attachment portion of the housing body.

As is shown in FIG. 48, the support stay 333 is placed on the second circuit board 81. The board support portion 32 of frame 30, which supports the second circuit board 81, has a first hinge receiving portion 336 for receiving the second circuit board 81 and support stay 333. The first hinge receiving portion 336 faces the bottom wall 5a of lower housing 5. The bottom wall 5a has a pair of boss portions 337a and 337b for supporting the first hinge receiving portion 336. One of the boss portions, 337a, is a hollow cylindrical shape opening to the bottom wall 5a. A screw 338 is passed upward through the boss portion 337a. The screw 338 is passed through the first hinge receiving portion 336 and second circuit board 81 and is driven in the support stay 333. A screw 339 is driven into the other boss portion 337b from above the component attachment portion 323. Specifically, the screw 339 is driven into the boss portion 337b through the component attachment portion 323, support stay 333 and second circuit board 81. Thus, the component attachment portion 323, first hinge receiving portion 336 of frame 30, support stay 333 and lower housing 5 are stacked and coupled integrally, and the first hinge metal fixing 328 is received by the rigid frame 30.

As is shown in FIGS. 42 and 43B, the second hinge metal fixing 329 comprises a hinge shaft 340, a first bracket 341 fixed to a first end portion of the hinge shaft 340, and a second bracket 342 rotatably coupled to a second end portion of the hinge shaft 340. The first end portion of the hinge shaft 340 penetrates a right-hand side face of the second leg portion 327b and enters the inside of the leg portion 327b. The first bracket 341 provided at the first end portion of the hinge shaft 340 is screwed down on the inner surface of leg portion 327b. The second bracket 342 provided at the second end portion of hinge shaft 340 is screwed down on the right-hand end portion of the component attachment portion 323.

As is shown in FIG. 49, the second bracket 342 has a support stay 343 as integral portion. The support stay 343 extends below the right-hand end portion of component attachment portion 323 towards the keyboard support section 310. A distal end portion of the support stay 343 is located below the right-hand end portion of the keyboard support section 310. A boss portion 344 is provided on the lower surface of the keyboard support section 310. The boss portion 344 receives the distal end portion of support stay 343. The distal end portion of the support stay 343 is fixed to the boss portion 344 by means of a screw 345. Thus, the right-hand end portion of the component attachment portion 323 and the right-hand end portion of the keyboard support section 310 are reinforced by the support stay 343.

The support stay 343 is located at the right-hand end portion of the board support portion 32 of frame 30. The board support portion 32 has a second hinge receiving portion 380 for receiving the support stay 343. The second hinge receiving portion 380 faces the bottom wall 5a of lower housing 5. The bottom wall 5a has a pair of boss portions 381a and 381b for supporting the second hinge receiving portion 380. Each of the boss portions 381a and 381b has a hollow cylindrical shape, opening to the bottom wall 5a of lower housing 5 near the card insertion hole 118b. Screws 382 are inserted into the boss portions 381a and 381b from below. The screws 382 are penetrated through the second hinge receiving portion 380 and driven into the support stay 343. Accordingly, the second hinge metal fixing 329 is received by the rigid metal frame 30.

Thus, the display unit 3 is supported on the housing body 2 so as to be rotatable about the hinge shafts 330 and 340 among a first position where the display unit 3 covers the upper housing 6 and keyboard 313, a second position where the display unit 3 is erected in rear of the keyboard 313, and a third position where the display unit 3 is turned down substantially horizontal towards the rear of the housing body 2.

As is shown in FIGS. 42 to 47, the component attachment portion 323 has first and second cover portions 346a and 346b. The cover portions 346a and 346b are disposed on the rear end portion of the component attachment portion 323 at a distance from each other in the width direction of the upper housing 6. As is shown in FIGS. 45 and 47, the first cover portion 346a is situated below the first leg portion 327a of display housing 325. A downwardly extending extension wall 347 is integrally formed at a rear end portion of the first cover portion 346a. As is shown in FIG. 2, the extension wall 347 is continuous with the second connector cover 75 of lower housing 5. The second cover portion 346b is situated below the second leg portion 327b of display housing 325. A downwardly extending extension wall 348 is integrally formed at a rear end portion of the second cover portion 346b. The extension wall 348 is continuous with the first connector cover 74 of lower housing 5.

As is shown in FIGS. 44 to 47, first and second speaker attachment holes 350a and 350b and a dial attachment hole 351 are formed in the component attachment portion 323. The speaker attachment holes 350a and 350b are located near the first and second cover portions 346a and 346b and are spaced apart in the width direction of the component attachment portion 323. As is shown in FIG. 44, the speaker attachment holes 350a and 350b are arranged on both sides of a center line C extending in the depth direction of the housing body 2 through the center of the housing body 2 in the width direction. The first speaker attachment hole 350a is located on the left side of the center line C, and the second speaker attachment hole 350b is located on the right side of the center line C. The distance L1 between the first speaker attachment hole 350a and the center line C differs from the distance L2 between the second speaker attachment hole 350b and the center line C. In this embodiment, L1 is greater than L2. The dial attachment hole 351 is located between the speaker attachment holes 350a and 350b.

First and second speakers 353a and 353b are disposed as functional parts in the first and second speaker attachment holes 350a and 350b. As is clear from FIGS. 18 and 47, each of the speakers 353a and 353b has a disk-shaped speaker frame 354 for supporting a vibration plate (not shown), and a cover 355 for covering the vibration plate. An outer peripheral portion of the speaker frame 354 is detachably fitted in the speaker attachment hole 350a (350b) from the above side of the component attachment portion 323. Thus, the first and second speakers 353a and 353b are arranged asymmetrically with respect to the center line C of the housing body 2. The first speaker 353a located on the left side is farther from the center line C than the second speaker 353b located on the right side.

The first and second speakers 353a and 353b have lead lines 356, respectively. The lead lines 356 are led from the component attachment portion 323 into the housing body 2 and are connected to the second circuit board 81 via connectors (not shown) respectively.

As is shown in FIGS. 18 and 52, the dial attachment hole 351 faces the fourth circuit board 83. A rotary type volume switch 360 is mounted on the fourth circuit board 83. The volume switch 360 comprises a switch body 360b having a rotational shaft 360a, and a volume dial 361 coupled as functional element to the rotational shaft 360a. The rotational shaft 360a is erected in the thickness direction of the housing body 2 on the fourth circuit board 83. The rotational shaft 360a has an end face opposed to the dial attachment hole 351. An engaging groove 360c is formed in the end face. The engaging groove 360c has a T shape, as clearly shown in FIGS. 50 and 53, and includes a first groove portion 360d extending in the radial direction of the rotational shaft 360a through the center of the rotational shaft 360a, and a second groove portion 360e extending in a direction perpendicular to the first groove portion 360d. The first and second groove portions 360d and 360e are open to the peripheral surface of the rotational shaft 360a.

The volume dial 361 comprises a disk-like body 361a and a shaft portion 361b continuous with the body 361a. The body 361a has a greater outside diameter than the dial attachment hole 351. A flange portion 361c is formed on the outer peripheral surface of the body 361a so as to project radially outward. The shaft portion 361b has an engaging projection 361d to be removably engaged in the engaging groove 360c. The engaging projection 361d comprises a first projection portion 361e extending in the radial direction of the shaft portion 361b through the center of the shaft portion 361b, and a second projection portion 361f extending in a direction perpendicular to the first projection portion 361e. The first projection portion 361e is engaged in the first groove portion 360d, as shown in FIGS. 50 and 53. The width W1 of the first projection portion 361e is less than the width W2 of the first groove portion 360d. The second projection portion 361f is engaged in the second groove portion 360e. The width W3 of the second projection portion 361f is less than the width W4 of the second groove portion 360e. Accordingly, when the engaging projection 361d is engaged in the engaging groove 360c, a first gap 362 is created between the first projection portion 361e and the first groove portion 360d and a second gap 363 is created between the second projection portion 361f and the second groove portion 360e. The volume dial 361 is thus movable relative to the rotational shaft 360a in a range defined by the gaps 362 and 363. The volume dial 361 is situated on the component attachment portion 323.

As is shown in FIG. 44, the component attachment portion 323 is covered by a removable top cover 365 of a synthetic resin. The top cover 365 has a panel 366 facing the component attachment portion 323. The panel 366 has a flat, rectangular plate shape extending in the width direction of the upper housing 6. The panel 366 integrally comprises first and second hinge cover portions 367a and 367b and a central cover portion 368. The cover portions 367a, 367b and 368 are located at the rear end of the panel 366.

The first and second hinge cover portions 367a and 367b cover the hinge shafts 330 and 340 and second brackets 332 and 342 of the first and second hinge metal fixings 328 and 329. The hinge cover portions 367a and 367b are spaced apart in the width direction of the panel 366 and are projected upward of the panel 366. As is shown in FIGS. 13, 48 and 49, the first and second hinge cover portions 367a and 367b are fixed to the second brackets 332 and 342 of the first and second hinge metal fixings 328 and 329 by means of screws 364.

The central cover portion 368 covers a cable (not shown) for connecting the housing body 2 and display unit 3, and covers the motor fan 102. The central cover portion 368 is located between the first and second hinge cover portions 367a and 367b. The central cover portion 368 projects upward of the panel 366 and extends in the width direction of the panel 366. As is shown in FIG. 13, the central cover portion 368 is fixed to the board support portion 32 of frame 30 by means of a screw 364.

As is shown in FIG. 44, a first insertion hole 370a is defined between the first hinge cover portion 367a and the left-hand end portion of the central cover portion 368. A second insertion hole 370b is defined between the second hinge cover portion 367b and the right-hand end portion of the central cover portion 368. The first insertion hole 370a is associated with the first leg portion 327a of display unit 3. The first leg portion 327a is guided into the first insertion hole 370a. The first insertion hole 370a faces the first cover portion 346a of component attachment portion 323. The first cover portion 346a defines the bottom of the first insertion hole 370a.

The second insertion hole 370b is associated with the second leg portion 327b of display unit 3. The second leg portion 327b is guided into the second insertion hole 370b. The second insertion hole 370b faces the second cover portion 346b of component attachment portion 323. The second cover portion 346b defines the bottom of the second insertion hole 370b.

As is shown in FIGS. 2 and 17, the central cover portion 368 of top cover 365 has a rear wall 371 exposed to the rear side of the housing body 2. The rear wall 371 is continuous with the first to third connector covers 74 to 76 of the lower housing 5. Air exhaust ports 372 are formed in a central portion of the rear wall 371. The exhaust ports 372 face the motor fan 102. A cool air wind, which has cooled the TCP 90, is exhausted through the exhaust ports 372 to the outside of the housing body 2.

As is shown in FIGS. 44, 47 and 48, the panel 366 has a front edge portion continuous with the keyboard support section 310. The front edge portion of panel 366 extends in the width direction of the panel 366. This front edge portion is integrally provided with a downwardly extending engaging wall 375. The engaging wall 375 is located between the keyboard support section 310 and component attachment portion 323 and placed on the peripheral wall 311 of keyboard support section 310. A lower end portion of the engaging wall 375 is engaged with a rear edge portion of the support panel 314 of keyboard 313 and cooperates with the bottom wall 311a of keyboard support section 310, thereby clamping the support panel 314. Thus, the keyboard 313 is held on the keyboard support section 310.

As is shown in FIGS. 18 and 47, the panel 366 of top cover 365 includes first and second cover attachment portions 400 and 401 having sound producing holes 377a and 377b. The cover attachment portions 400 and 401 are spaced apart in the width direction of the panel 366. The holes 377a and 377b of the cover attachment portions 400 and 401 face the speakers 353a and 353b. First and second net-like speaker covers 379a and 379b are attached to the cover attachment portions 400 and 401. The speaker covers 379a and 379b cover the holes 377a and 377b and first and second speakers 353a and 353b. The speaker covers 379a and 379b have rectangular plate shapes greater than the opening shapes of the holes 377a and 377b, and extend in the width direction of the top cover 365. Accordingly, the speaker covers 379a and 379b cover not only the holes 377a and 377b but also the cover attachment portions 400 and 401 continuous with the holes 377a and 377b.

FIGS. 54A and 54B show the second speaker cover 379b representatively. The speaker cover 379b has one end provided with a first engaging portion 393a and the other end provided with a second engaging portion 393b. The first engaging portion 393a extends in parallel to the speaker cover 379b. The second engaging portion 393b extends downward from the speaker cover 379b. FIG. 54A shows the second cover attachment portion 401 representatively. The cover attachment portion 401 (400) has first and second engaging holes 401a and 401b spaced apart in the width direction of the panel 366. The hole 377b is located between the engaging holes 401a and 401b.

When the speaker cover 379b (379a) is attached to the cover attachment portion 401 (400), the first engaging portion 393a of the speaker cover 379b (379a) is inserted in the first engaging hole 401a from the upper side of the cover attachment portion 401 (400). Then, the second engaging portion 393b is inserted in the second engaging hole 401b from the upper side of the cover attachment portion 401 (400) and a distal end portion of the second engaging portion 393b is projected downward from the cover attachment portion 401 (400). The distal end portion of the second engaging portion 393b is then bent along the shape of the cover attachment portion 401 (400), as shown in FIG. 54B, and the second engaging portion 393b is hooked in the second engaging hole 401b. Thereby, the speaker covers 379a and 379b are supported on the panel 366, while covering the cover attachment portions 400 and 401.

As is shown in FIGS. 54A and 54B, a blind member 403 is interposed between the cover attachment portion 401 (400) and the speaker cover 379b (379a). The blind member 403 prevents the speaker 353b (353a) from being viewed through the speaker cover 379b (379a). The blind member 403 is formed of black felt in a rectangular shape with a size corresponding to the speaker cover 379b (379a). The blind member 403 is attached to the cover attachment portion 401 (400) by means of a double-sided adhesive tape 404.

As is shown in FIG. 1, the first and second speaker covers 379a and 379b are arranged on both sides of the center line C of the housing body 2. A distance L3 between the first speaker cover 379a and the center line C is equal to a distance L4 between the second speaker cover 379b and the center line C. The first and second speaker covers 379a and 379b are arranged symmetrical with respect to the center line C. As a result, although the first and second speakers 353a and 353b are actually arranged asymmetrical with respect to the center line C of the housing body 2, as described above, the first and second speakers 353a and 353b may be apparently viewed as being symmetrical with respect to the center line C.

The panel 366 of top cover 365, as shown in FIG. 44, has a circular dial lead-out hole 378. The dial lead-out hole 378 is located between the first and second cover attachment portions 400 and 401. As is shown in FIGS. 18 and 52, the dial lead-out hole 378 faces the dial attachment hole 351 in the component attachment portion 323. The dial lead-out hole 378 has a greater diameter greater than the body 361*a* of volume dial 361. Thus, the body 361*a* of volume dial 361 is exposed upward of the housing body 2 through the dial lead-out hole 378 so that the volume dial 361 may be operated by the fingertip. An annular gap 405 is provided between the body 361*a* and the opening edge portion of the dial lead-out hole 378.

The diameter of the flange portion 361*c* of volume dial 361 is greater than that of the dial lead-out hole 378. The flange portion 361*c* cover, from the inside of the top cover 365, the gap 405 between the body 361*a* and dial lead-out hole 378. The panel 366 of top cover 365 and the flange portion 361*c* overlap each other. The panel 366 cooperates with the component attachment portion 323 to clamp the flange portion 361*c*. Thereby, the volume switch 360 is prevented from being pulled out of the switch body 360*b*. As is shown in FIG. 52, the panel 366 of top cover 365 has a guide wall 406. The guide wall 406 has an annular shape and is coaxial with the dial lead-out hole 378. The guide wall 406 surrounds the flange portion 361*c* of volume dial 361. Thus, the guide wall 406 positions the volume dial 361 in its radial direction and rotational direction.

The volume dial 361 and the rotational shaft 360*a* of switch body 360*b* are coupled so as to be movable in the radial direction of the rotational shaft 360*a*, as described above. Thus, an alignment error between the volume dial 361 and rotational shaft 360*a* can be canceled by a coupling portion between the volume dial 361 and rotational shaft 360*a*. When the volume dial 361 is held by using the top cover 365, even if the dial lead-out hole 378 and switch body 360*b* are displaced relative to each other, no damaging force acts on the attachment portion of the switch body 360*b* on the fourth circuit board 83. Thus, destruction of the switch body 360*b* can be prevented.

As is shown in FIGS. 17 and 44, the panel 366 of top cover 365 has an icon attachment portion 384. The icon attachment portion 384 is formed of a rectangular recess extending in the width direction of the top cover 365. A second icon 385 is disposed in the icon attachment portion 384. The second icon 385 has a light-transmissive icon board 386 of a synthetic resin. The icon board 386 is adhered to the icon attachment portion 384. Three display marks 387 are linearly arranged on the icon board 386. The display marks 387 indicate the key control content by means of the keyboard 313.

The icon attachment portion 384 has through-holes 388 (only one shown) at positions associated with the display marks 387. The through-holes 388 face the component attachment portion 323 of upper housing 6. A light guide member 390 is supported on the component attachment portion 323. The light guide member 390 is formed of a transparent synthetic resin material and comprises three light guide portions 391 (only one shown) associated with the display marks 387. Each of the light guide portions 391 has a columnar shape. Each light guide portion 391 has an upper end portion engaged in the through-hole 388 and a lower end portion facing the second circuit board 81 located below the component attachment portion 323.

As is shown in FIGS. 8 and 17, three light emitting diodes (LEDs) 392 are mounted on the second circuit board 81. The LEDs 392 serve as light source for the second icon 385 and face the lower end portions of the light guide portions 391. Light radiated from the LEDs 392 is guided to the display marks 387 through the light guide portions 391, as indicated by an arrow in FIG. 17. Thus, the display mark 387 associated with the turned-on LED 392 is lighted to display the key control content by means of the keyboard 313.

In the state in which the display unit 3 is rotated to the third position, as shown in FIG. 44, the top cover 365 is put on the component attachment portion 323 of upper housing 6 from the upper side of the housing body 2. At this time, the first and second leg portions 327*a* and 327*b* of display unit 3 enter the first and second insertion holes 370*a* and 370*b* in the top cover 365, thereby covering the component attachment portion 323 of upper housing 6 and first and second hinge metal fixings 328 and 329. At the same time, the engaging wall 375 formed at the front end of the panel 366 enters the rear end region of the keyboard support section 310 and holds the rear end portion of the support panel 314 of keyboard 313. The top cover 165 is coupled to the board support portion 32 of frame 30 and the second brackets 332 and 342 of first and second hinge metal fixings 328 and 329 by means of the screws 364. Thus, the top cover 165 is held on the housing body 2 while covering the component attachment portion 322.

A description will now be given of the procedure for replacing the CD-ROM drive 190 with the floppy disk drive (FDD) 191, in the case where the CD-ROM drive 190 is mounted in the first section 38 of pack storage section 31 in the computer 1 having the above structure.

At first, as shown in FIG. 33B, the front cover 255 of housing body 2 is slid from the locked position to the unlocked position, and the first to third engaging projections 265*a* to 265*c* are disengaged from the bottom wall 5*a* of lower housing 5 and the engaging holes 266*a* and 266*b* in the frame 30.

Subsequently, as shown in FIGS. 3 and 10, the front cover 255 is rotated downward from the first position to the second position. Thereby, the insertion holes 40 and 41 of the pack storage section 31 are opened to the front side of the housing body 2, and the ejector 300 is exposed to the opening portion of insertion hole 40 of first section 38, as shown in FIG. 40. If the front cover 255 is rotated from the first position to the second position, the pressing projection 293 of front cover 255 is disengaged from the pressing surface 292 of the stopper 290, as shown in FIG. 38A. Thus, the raising of the stopper 290 is released and the stopper 290 is forcibly lowered to the unlocked position by the urging force of the return spring 291. The stopper 290 is pulled out of the first section 38 and disengaged from the engaging portion 216*a* of CD-ROM drive 190. Accordingly, the stopper 290 releases the CD-ROM drive 190.

The operation lever 302 of ejector 300 exposed to the insertion hole 40 is then pulled out, as shown in FIG. 40. In accordance with the movement of the operation lever 302, the slider 301 is drawn out and the pushing portions 304*a* and 304*b* of slider 301 push the engaging portions 216*a* and 216*b* of CD-ROM drive 190 toward the insertion hole 40. Consequently, the CD-ROM drive 190 is pushed out of the insertion hole 40 and the interface connector 194 is disconnected from the first relay connector 160. At last, the front end portion of the CD-ROM drive 190, which is projected from the insertion hole 40, is held by the fingertip and the CD-ROM drive 190 is pulled out of the first section 38.

After the CD-ROM drive 190 has been drawn out of the first section 38, the FDD 191 is inserted into the insertion hole 40 of first section 38 and the interface connector 223 of FDD 191 is connected to the first relay connector 160.

Then, the front cover 255 is rotated upward from the second position to the first position. The pressing projection 293 of front cover 255 contacts the pressing surface 292 of stopper 290 from below, as shown in FIG. 38B. The pressing projection 293 then pushes up the stopper 290 from the unlocked position to the locked position against the urging force of the return spring 291. As a result, the stopper 290 advances into the first section 38 and engages the engaging portion 243a of FDD 191.

When the pressing projection 293 of front cover 255 has contacted the stopper 290, the beveled surface 298 of the pressing projection 293 is simultaneously put in slidable contact with the inclined surface 297 of slider 295. Thereby, the slider 295 is forcibly slid from the first position to the second position against the urging force of the return spring 296. When the front cover 255 has reached the first position, the beveled surface 298 of pressing projection 293 has passed over the inclined surface 297 of slider 295 and comes into contact with the front end face of slider 295. Since the slider 295 is constantly urged to the first position by the return spring 296, the urging force of return spring 296 is transmitted to the front cover 255 via the pressing projection 293 and the front cover 255 is forcibly slid from the unlocked position to the locked position. By this sliding movement, the first engaging projection 265a is engaged with the front edge portion of the bottom wall 5a and the second and third engaging projections 265b and 265c are engaged in the engaging holes 266a and 266b in the frame 30. Thus, the front cover 255 is held in the first position. As a result, the front wall portion 257 of front cover 255 covers the hard disk drive (HDD) 250 contained in the second section 39. In addition, the opening portion 263 of front cover 255 faces the front side of the FDD 191. The floppy disk insertion hole 219 is exposed to the front side of the housing body 2 through the opening portion 263.

According to the computer 1 with the above structure, the CD-ROM drive 190 or FDD 191 is locked in and unlocked from the first section 38 in interlock with the rotational operation of the front cover 255. There is no need to perform a special operation for locking and unlocking the CD-ROM drive 190 or FDD 91. Thus, the CD-ROM drive 190 or FDD 191 can be easily replaced.

In order to rotate the front cover 255 from the first position to the second position, it is necessary to slide, in advance, the front cover 255 from the locked position to the unlocked position. Thus, the front cover 255 is opened by the two-stage operation, and the front cover 255 is prevented from being opened carelessly. Although the CD-ROM drive 190 or FDD 191 is locked and unlocked by using the front cover 255, the CD-ROM drive 190 or FDD 191 is prevented from being removed from the first section 38.

When the front cover 255 is rotated from the second position to the first position, the front cover 255 is automatically slid to the locked position by the slider 295. Accordingly, when the front cover 255 is closed, it should suffice to rotate the front cover 255. The operation of closing the front cover 255 is thus simplified.

According to the above structure, the ejector 300 for pushing out the CD-ROM drive 190 or FDD 191 from the first section 38 is not exposed to the insertion hole 40 of the first section 38 until the front cover 255 has been rotated to the second position. As long as the front cover 255 is closed, the ejector 300 cannot be operated. An intentional operation to rotate the front cover 255 to the second position is required to pull out the CD-ROM drive 190 or FDD 191 from the first section 38, and an erroneous operation of the ejector 300 can be prevented.

As has been described above, when the front cover 255 is rotated to the second position and the ejector 300 is exposed to the insertion hole 40, the stopper 290 has already released the locking of the CD-ROM drive 190 or FDD 191. Thus, the CD-ROM drive 190 or FDD 191 can easily be pushed out of the first section 38 by operating the ejector 300. In addition, when the ejector 300 is operated, the stopper 290 has already been disengaged from the engaging portion 216a of CD-ROM drive 190 or the engaging portion 243a of FDD 191. Accordingly, the stopper 290 does not interfere with the engaging portion 216a or 243a. No damaging force acts on the stopper 290, and destruction of the stopper 290 is prevented.

In the computer 1 having the above structure, the component attachment portion 323 extending in the width direction of upper housing 6 is formed at the rear portion of the upper housing 6. The first and second speakers 353a and 353b and the volume dial 361 of volume switch 360, which are replaced with relatively high frequency, are supported on the component attachment portion 323. The component attachment portion 323 is covered by the removable top cover 365.

If a need arises to replace at least one of the first and second speakers 353a and 353b, the screws 364 are loosened to unfix the top cover 365. The display unit 3 is then rotated to the third position, and the housing 325 of display unit 3 is turned to the rear side. In this state, the top cover 365 is pulled up and removed from the component attachment portion 323. Thereby, the component attachment portion 323 is widely opened to the upper side of the housing body 2, and the first and second speakers 353a and 353b as well as volume dial 361 are exposed to the outside of the housing body 2.

As has been described above, when at least one of the first and second speakers 353a and 353b is replaced, it suffices to remove the top cover 365. There is no need to separate the upper housing 6 from the lower housing 5. Thus, a time-consuming work such as disassembling the housing body 2 is not required. The work for replacing the speakers 353a and 353b is simplified.

If the top cover 365 is removed from the component attachment portion 323, the flange portion 361c of volume dial 361 is opened upward. The volume dial 361 can thus be pulled off upward from the shaft portion 360a of volume switch 360. Thus, the work for maintaining the switch body 360b can be easily performed.

The top cover 365 has the engaging wall 375 which cooperates with the bottom wall 311a of keyboard support section 310 in clamping the support panel 314 of keyboard 313, the keyboard 313 can be held by using the top cover 365. Accordingly, there is no need to provide a special member for holding the keyboard 313, and the number of parts of the computer 1 can be reduced. Moreover, if the top cover 365 is removed, the keyboard 313 is released. Thus, the keyboard 313 can be removed from the keyboard support section 310. Therefore, it is possible to easily perform not only the work for replacing the first and second speakers 353a and 353b, but also the work for replacing or maintaining the keyboard 313.

The component attachment portion 323 of upper housing 6 has first and second cover portions 346a and 346b for covering the leg portions 327a and 327b of display unit 3 from below. In the state in which the component attachment portion 323 is covered by the top cover 365, the first and second hinge metal fixings 328 and 329 can be covered by the first and second cover portions 346a and 346b and the hinge cover portions 367a and 367b of top cover 365. Thus, there is no need to provide an exclusive-use cover for covering the first and second hinge metal fixings 328 and 329 or a structure for supporting such an exclusive-use cover. Therefore, the structure of the housing body 2 can be simplified. Furthermore, since the first and second cover portions 346*a* and 346*b* are formed integral with the component attachment portion 323, the first and second cover portions 346*a* and 346*b* can be exactly positioned in relation to the first and second leg portions 327*a* and 327*b* and the top cover 365, and the external appearance of the housing body 2 is improved.

Besides, according to the above structure, the display unit 3 is supported on the upper housing 6 by means of the first and second hinge metal fixings 328 and 329. Thus, the display unit 3 along with the upper housing 6 can be removed from the lower housing 5. The housing body 2 can be disassembled, simultaneously with the removal of the display unit 3. The works for replacing and maintaining the display unit 3 are facilitated.

In the above embodiment, the component attachment portion is situated behind the keyboard. However, in the present invention, the component attachment portion may be situated in front of the keyboard, and the top cover covering the component attachment portion may be used as armrest.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable apparatus comprising:
   a housing body including a lower housing and an upper housing coupled to said lower housing, said upper housing including a keyboard support section and an upwardly facing component attachment portion arranged at the back of the keyboard support section;
   a keyboard mounted on said keyboard support section;
   a functional component supported on said component attachment portion, said functional component having a rotatable shaft and a disk-shaped operation dial removably coupled to said rotatable shaft, and said operation dial having an outer peripheral surface having a relatively-large-diameter-flange portion;
   a top cover removably supported on said housing body, said top cover having a panel that covers the component attachment portion, said panel including a circular through-hole through which the operation dial is passed and a guide wall situated around said through-hole and surrounding the flange portion, said panel overlaping with said flange portion in a circumference of said through-hole, and said panel and said component attachment portion sandwiching said flange portion;
   a display unit supported on said housing body and movable between a first position at which said display unit covers said keyboard and said top cover and a second position at which said display unit exposes said keyboard and said top cover.

* * * * *